(12) United States Patent
Nakano

(10) Patent No.: US 7,581,576 B2
(45) Date of Patent: Sep. 1, 2009

(54) AUTOMATIC AIR-FEEDING MECHANISM FOR PNEUMATIC TIRE

(76) Inventor: Takaji Nakano, 8, Tajii, Mihara-cho, Minamikawachi-gun, Osaka 587-0012 (JP)

( * ) Notice: Subject to any disclaimer, the term of this patent is extended or adjusted under 35 U.S.C. 154(b) by 715 days.

(21) Appl. No.: 10/548,180

(22) PCT Filed: Mar. 19, 2004

(86) PCT No.: PCT/JP2004/003792

§ 371 (c)(1),
(2), (4) Date: Sep. 2, 2005

(87) PCT Pub. No.: WO2004/087442

PCT Pub. Date: Oct. 14, 2004

(65) Prior Publication Data

US 2006/0169349 A1    Aug. 3, 2006

(30) Foreign Application Priority Data

Mar. 28, 2003  (JP) .............................. 2003-090079
Dec. 10, 2003  (JP) ....................... PCT/JP03/15820

(51) Int. Cl.
*B60C 23/10*  (2006.01)
*B60C 29/00*  (2006.01)
*F04B 17/06*  (2006.01)

(52) U.S. Cl. ..................... 152/421; 152/419; 417/233; 417/221

(58) Field of Classification Search ................. 417/233, 417/221; 141/38; 280/304.2; 152/419, 421
See application file for complete search history.

(56) References Cited

U.S. PATENT DOCUMENTS

| 575,613 | A | * | 1/1897 | Merton | ........................ 152/421 |
| 1,115,435 | A | * | 10/1914 | Jobes | .......................... 152/419 |
| 1,288,826 | A | * | 12/1918 | Cahill | .......................... 152/419 |
| 1,358,524 | A | * | 11/1920 | Cooper | ........................ 152/421 |

(Continued)

FOREIGN PATENT DOCUMENTS

CN    2205322 Y    8/1995

(Continued)

OTHER PUBLICATIONS

Chinese language and its English translation for corresponding Chinese application No. 200480008644.X lists the references above and provides comments on the relevancy of non-English language references.

*Primary Examiner*—Devon C Kramer
*Assistant Examiner*—Peter J Bertheaud
(74) *Attorney, Agent, or Firm*—Hogan & Hartson LLP

(57) ABSTRACT

To provide an automatic air-feeding mechanisms which can produce a large amount of compressed air with a small number of rotations of a wheel body and with a small force. The automatic air-feeding mechanisms has first and second compressed air producing sections 1a and 1b, and pneumatic tire compressed air supply passages 2a and 2b for introducing the compressed air produced in the compression air producing sections to a pneumatic tire. The first and second compressed air producing sections 1a and 1b are attached to a hub drum 102a of the hub 102 at positions 180° apart from each other. When the wheel body is rotated, the first and second compressed air producing sections 1a and 1b alternately produce compressed air.

12 Claims, 27 Drawing Sheets

U.S. PATENT DOCUMENTS

| | | | |
|---|---|---|---|
| 1,448,248 A * | 3/1923 | Anthony | 152/421 |
| 2,161,384 A * | 6/1939 | Rinfret | 152/418 |
| 2,415,618 A | 2/1947 | West | |
| 5,066,146 A * | 11/1991 | McDonner | 384/473 |
| 5,342,177 A * | 8/1994 | Cheng | 417/233 |
| 5,380,175 A * | 1/1995 | Amarume | 417/553 |
| 5,947,696 A | 9/1999 | Baumgarten | |
| 6,345,609 B1 * | 2/2002 | Djordjevic | 123/509 |

FOREIGN PATENT DOCUMENTS

| | | |
|---|---|---|
| CN | 2216008 Y | 12/1995 |
| JP | 39-002535 | 3/1939 |
| JP | 182436 | 9/1956 |
| JP | 61-066001 | 5/1986 |
| JP | 62-004617 | 1/1987 |
| JP | 01-172003 | 7/1989 |
| JP | 11-139118 | 5/1999 |
| JP | 11-264376 | 9/1999 |
| WO | WO 97/02961 | 1/1997 |
| WO | 0076793 A1 | 12/2000 |
| WO | WO 00/76793 A1 | 12/2000 |

* cited by examiner

AUTOMATIC AIR-FEEDING MECHANISM FOR PNEUMATIC TIRE

CROSS REFERENCE TO RELATED APPLICATIONS

The disclosure of Japanese Patent Application No. 2003-090079 (filed on Mar. 28, 2003) and International Application No. PCT/JP/2003/015820 (filed on Dec. 10, 2003) including the specification, claims, drawings and abstract are incorporated herein by reference in its entirety.

TECHNICAL FIELD

The present invention relates to an automatic air-feeding mechanism for a pneumatic tire which can produce compressed air and supply it to the pneumatic tire when a wheel body is rotated about an axle.

BACKGROUND ART

Pneumatic tires holding air are mounted on wheels of automobiles or bicycles. Even if air is pumped into such a pneumatic tire until the air pressure therein reaches a specific level, the air gradually escapes therefrom and the air pressure therein gradually decreases over time. When the air pressure is too low, it adversely affects the ride quality or handling. Thus, when the air pressure becomes much lower than the a specific level, air should be supplied into the pneumatic tire with an air supply device such an air pump.

However, a considerable force is required to operate an air pump to feed air into a pneumatic tire. Thus, it is difficult for a person without much strength to operate an air pump to feed air into a pneumatic tire.

DISCLOSURE OF THE INVENTION

The present invention has been made in view of the above circumstances, and it is, therefore, an object of the present invention to provide an automatic air-feeding mechanism for a pneumatic tire with which air can be automatically fed into a pneumatic tire by the rotation of the pneumatic tire about the axle without using an air pump or the like when the air pressure in the pneumatic tire becomes lower than a specific value.

Another object of the present invention is to provide an automatic air-feeding mechanism for a pneumatic tire having a compressed air producing section which rainwater or the like can hardly enter.

Another object of the present invention is to provide an automatic air-feeding mechanism for a pneumatic tire which can produce a large amount of compressed air with a small number of rotations of the wheel body and with a small force.

Another object of the present invention is to provide an automatic air-feeding mechanism for a pneumatic tire which can produce a sufficient amount of compressed air in a short travel distance so that it can supply compressed air to a pneumatic tire of a vehicle which is driven too short a distance to rotate a wheel a sufficient number of times during normal use such as a wheelchair.

Another object of the present invention is to provide an automatic air-feeding mechanism for a pneumatic tire which can produce a large amount of compressed air with a small number of rotations of the wheel body with a small force and which can supply compressed air to a pneumatic tire and a part of the vehicle other than the pneumatic tire when the vehicle is running.

Another object of the present invention is to provide an automatic air-feeding mechanism for a pneumatic tire which can reduce the resistance to the rotation of the wheel body about the axle.

The automatic air-feeding mechanism for a pneumatic tire according to the present invention is an automatic air-feeding mechanism for a pneumatic tire for automatically supplying air to a pneumatic tire mounted on a wheel body rotatable about an axle of a vehicle, which comprises:

a compressed air producing section for producing compressed air when the wheel body is rotated about the axle, in which the compressed air produced in the compressed air producing section is supplied to the pneumatic tire.

Although the features of this invention can be expressed as above in a broad sense, the constitution and content of this invention, as well as the object and features thereof, will be apparent by reference to the following disclosure taken in connection with the accompanying drawings.

BEST MODE FOR CARRYING OUT THE INVENTION

Figure 1:
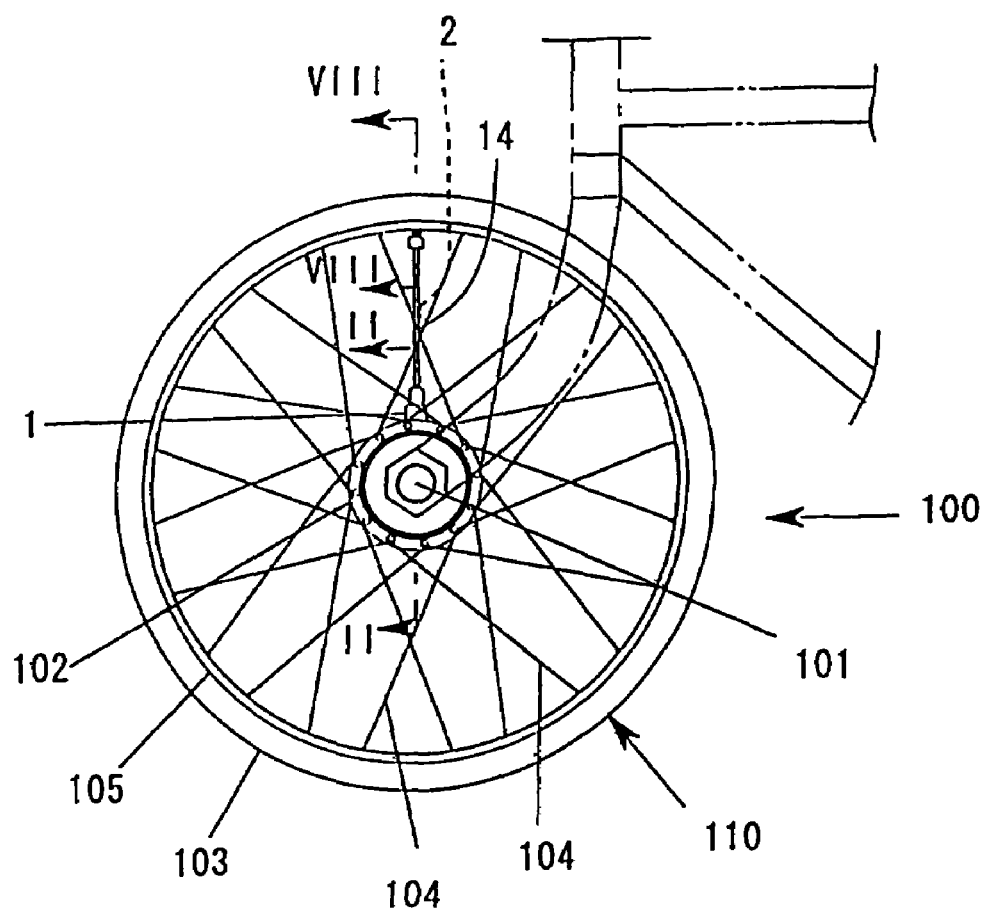
FIG. 1 is a side view of a wheel of a bicycle provided with an automatic air-feeding mechanism according to a first embodiment of the present invention.

Description will be hereinafter made of the embodiments of the present invention in detail with reference to the drawings. FIG. 1 is a side view of a wheel of a bicycle provided with an automatic air-feeding mechanism for a pneumatic tire according to a first embodiment of the present invention, FIG. 2 is an enlarged cross-sectional explanatory view taken along the line II-II in FIG. 1, and FIG. 3 is a cross-sectional explanatory view taken along the line III-III in FIG. 2.

In this embodiment, the automatic air-feeding mechanism for a pneumatic tire is provided on a front wheel 100 of a bicycle. The wheel 100 of the bicycle provided with the automatic air-feeding mechanism for a pneumatic tire has an axle 101 and a wheel body 110 rotatable about the axle 101.

Figure 2:
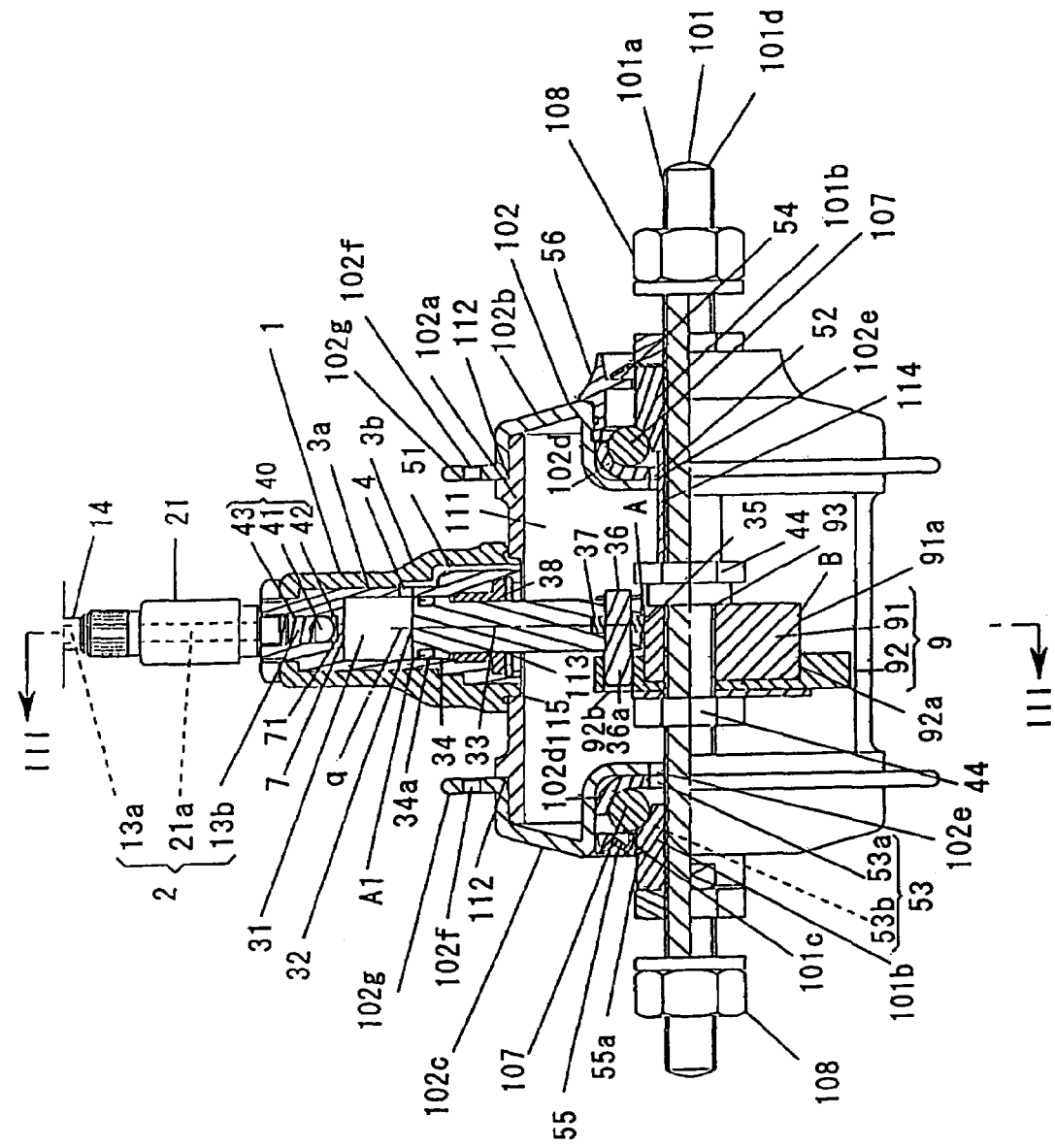
FIG. 2 is an enlarged cross-sectional explanatory view taken along the line II-II in FIG. 1.
Figure 3:
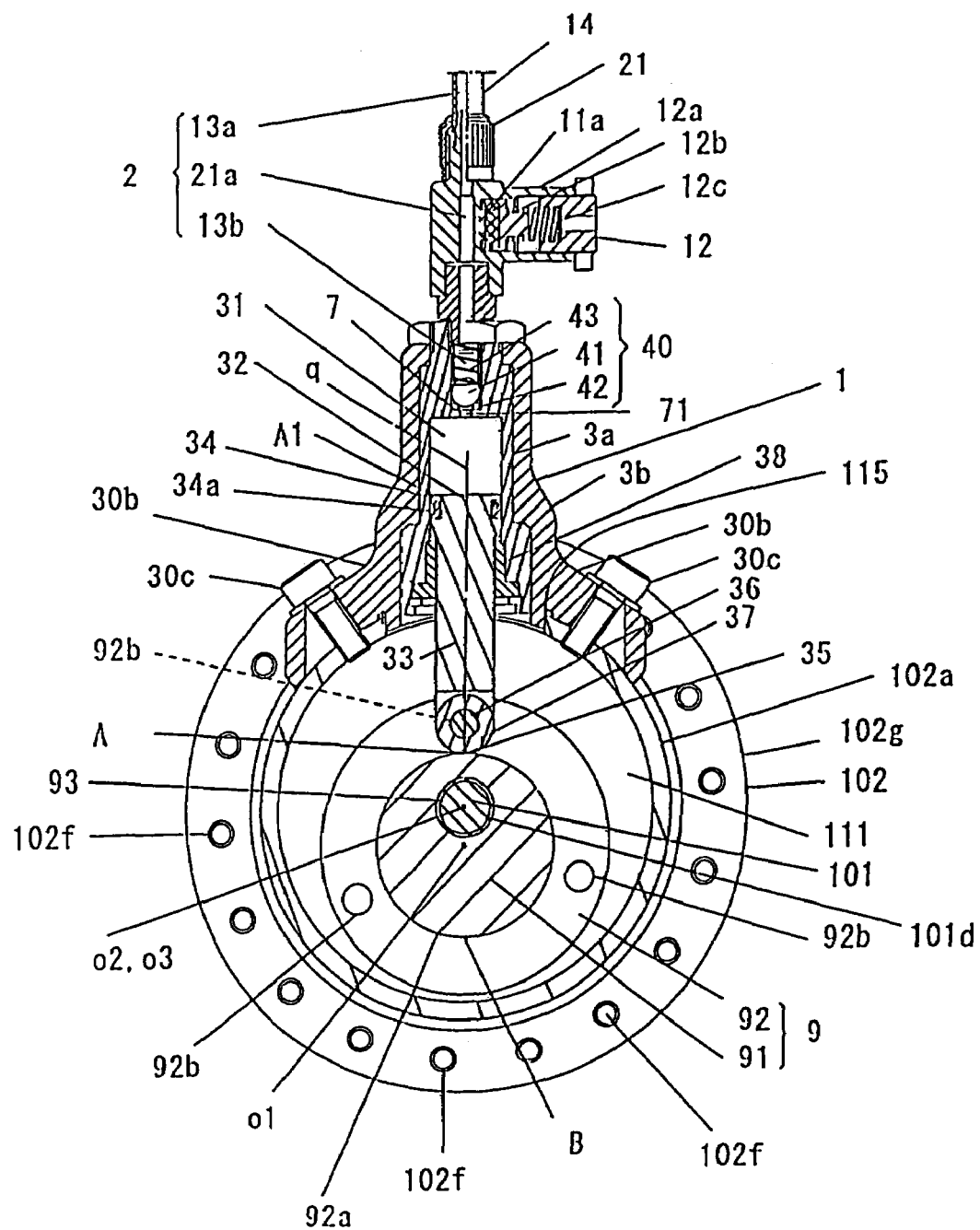
FIG. 3 is a cross-sectional explanatory view taken along the line III-III in FIG. 2.

As shown in FIG. 2, the axle 101 has an axle body 101d having threads 101a on its outer periphery, ball pushers 101b and 101b threaded on both right and left sides of the axle body 101d and secured thereto, and a pipe-like positioning member 114. The positioning member 114 will be described later.

As shown in FIG. 1, the wheel body 110 has a hub 102, a pneumatic tire 103 and the automatic air-feeding mechanism. As shown in FIG. 2, the hub 102 has a cylindrical hub drum 102a and right and left supporting parts 102b and 102c fixed to the right and left sides, respectively, of the hub drum 102a.

The supporting parts 102b and 102c are fitted on the outer periphery of the hub drum 102a and attached thereto in a non-rotatable manner. The right and left supporting parts 102b and 102c fixed to the right and left sides of the hub drum 102a define a partitioned space 111 separated from the exterior within the hub 102.

Ring-shaped waterproof packings 112 and 112 are interposed between the supporting parts 102b and 102c and the hub drum 102a so that water cannot enter the partitioned space 111 through gaps between the supporting parts 102b and 102c and the outer periphery of the hub drum 102a.

Each of the supporting parts 102b and 102c has a steel ball receiving part 102d extending radially inward therefrom for rotatably receiving steel balls, and a plurality of steel balls 107, . . . and 107 are rotatably received in each steel ball receiving part 102d. Axle holes 102e and 102e for receiving the axle 101 are formed radially inside the steel ball receiving parts 102d.

Figure 4:
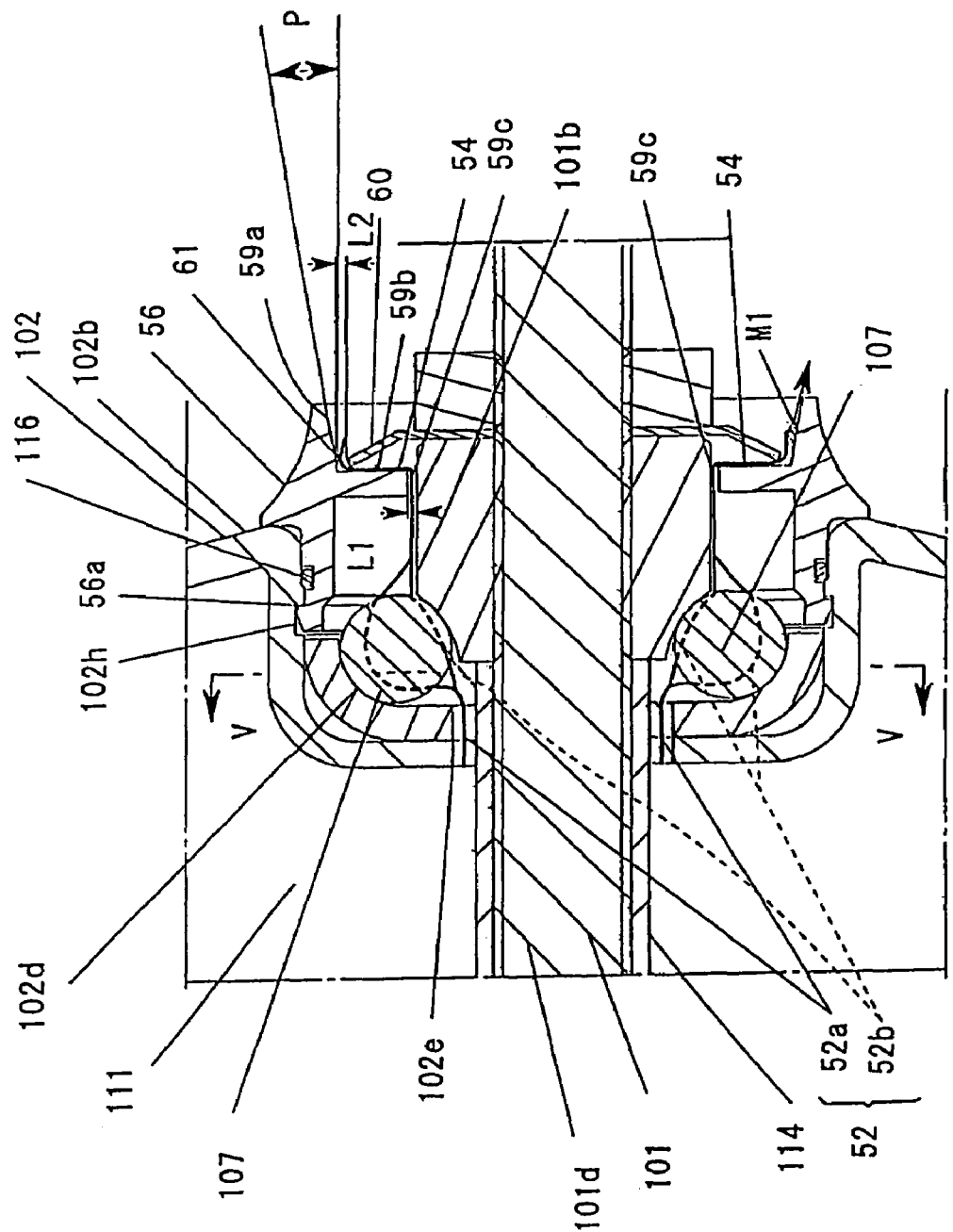
FIG. 4 is an enlarged cross-sectional explanatory view illustrating essential parts of second and third air passages.

As shown in FIG. 4, the axle 101 extends through the axle holes 102e, and the steel balls 107, . . . and 107 are rotatably disposed, together with grease (not shown), between the ball pushers 101b and 101b threaded on the axle body 101d and the steel ball receiving parts 102d, whereby the steel ball receiving parts 102d are rotatably supported on the axle body 101d via the steel balls 107, . . . and 107. The hub 102 is thereby rotatable about the axle 101.

As shown in FIG. 2 and FIG. 3, each of the supporting parts 102b and 102c has a flange 102g with a plurality of spoke holes 102f, . . . and 102f extending radially outward therefrom. The proximal ends of spokes 104 (shown in FIG. 1) are engaged in the spoke holes 102f, . . . and 102f of the flanges 102g. The distal ends of the spokes 104 are engaged with a rim 105 as shown in FIG. 1. The rim 105 is thereby fixed to the hub 102 and rotatable about the axle 101.

Figure 8:
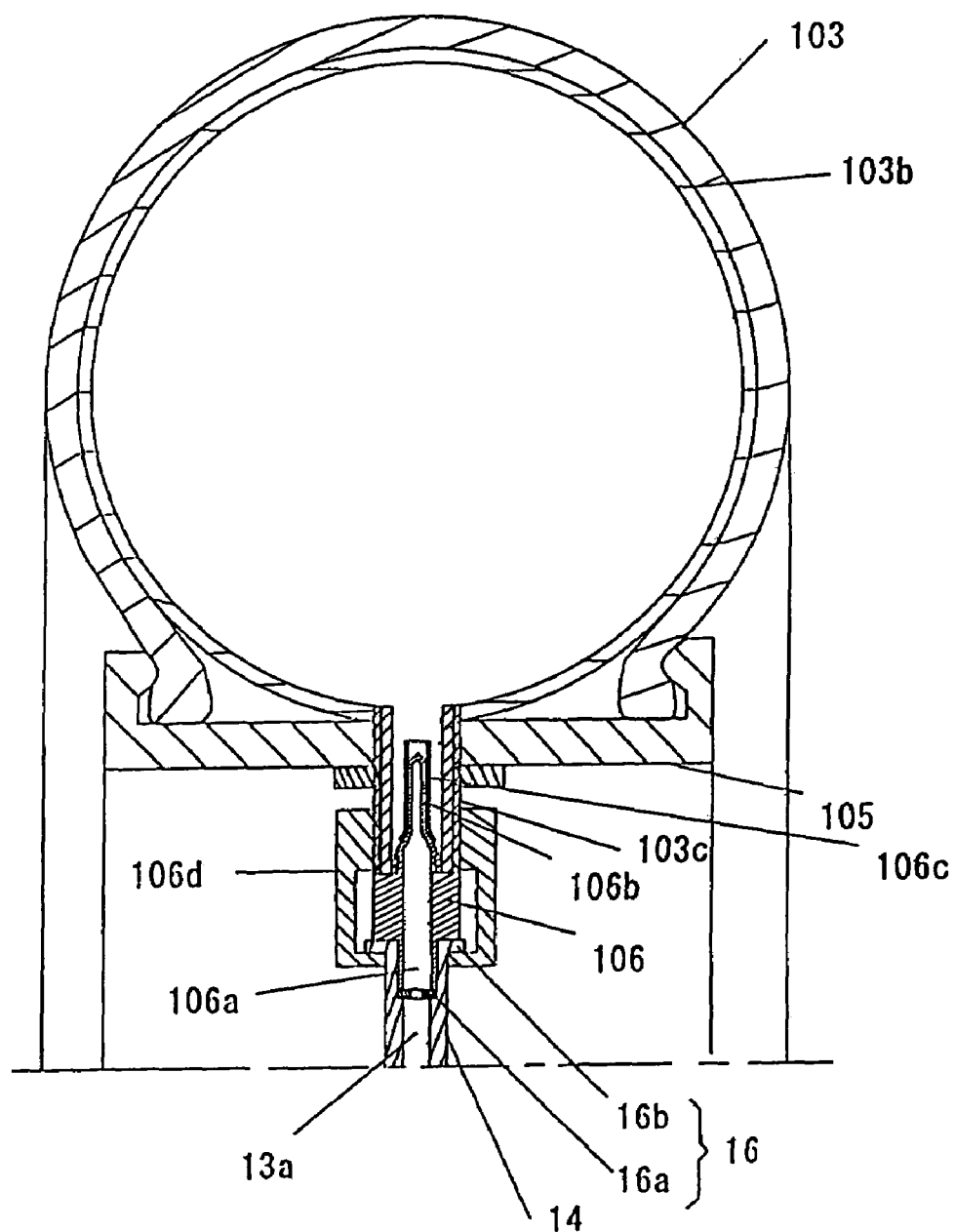
FIG. 8 is an enlarged cross-sectional explanatory view taken along the line VIII-VIII in FIG. 1.

The pneumatic tire 103 is removably engaged on the rim 105, so that the pneumatic tire 103 is rotatable together with the rim 105 about the axle 101. As shown in FIG. 8, an air tube 103b as an air holding part for holding air therein is provided in the pneumatic tire 103.

The air tube 103b has a valve 106 through which air is fed in and ejected. The valve 106 has a cylindrical shape, and has an air inlet 106a at the lower end as seen in the drawing and a valve hole 106b at the upper end as seen in the drawing. The valve hole 106b is closed by a cylindrical check valve 106c of a synthetic rubber fitted on the outer periphery of the valve 106.

The valve 106 is received in a cylindrical valve fitting 103c attached to the air tube 103b, and a valve fixing nut 106d threaded on the valve fitting 103c prevents the valve 106 from coming off. When air is fed through the air inlet 106a against the elasticity of the check valve 106c closing the valve hole 106b with an air pump or the like, the air forcibly opens check valve 106c and flows into the air tube 103b. After air has been fed into the air tube 103b, the check valve 106c closes the valve hole 106b because of its elasticity. The air in the air tube 103b is thereby prevented from escaping through the valve hole 106b.

The check valve 106c, the valve fitting 103c and the valve fixing nut 106d, which are the same as those of an ordinary air tube 103b for a bicycle wheel, are not limited to those as described above and may be modified as needed. The automatic air-feeding mechanism of the present invention does not necessarily require a valve 106 for a pneumatic tire 103 and applicable to a pneumatic tire 103 without a valve 106. When a valve is used, the valve is not limited to an English valve (Woods valve) as shown in FIG. 8. The valve may be an American valve (Schrader valve) or a French valve (Presta valve) when necessary.

The right and left sides of the axle 101 of the wheel 100 constituted as described above are secured to the body of a bicycle by nuts 108 and 108 (shown in FIG. 2). The wheel body 110 is thereby rotatable with respect to the body of the bicycle.

The automatic air-feeding mechanism will be next described. The automatic air-feeding mechanism of this embodiment has an air feeding section for producing compressed air and feeding it to the pneumatic tire. As shown in FIG. 2 and FIG. 3, the air feeding section has a compressed air producing section 1 for producing compressed air and a pneumatic tire compressed air supply passage 2 for supplying compressed air produced in the compressed air producing section 1 to the pneumatic tire 103.

The compressed air producing section 1 has a compression chamber 31 for compressing air therein, a piston member 32 as a compressing element for compressing the air in the compression chamber 31, an air intake port 4 for introducing outside air into the compression chamber 31, and waterproof mechanisms 51, 52, 54 and 55 for preventing water from entering the compression chamber 31 through the air intake port 4.

The compression chamber 31 is formed in an inner casing 3a having a circular cross-section. An outer casing 3b having a circular cross-section is fitted over the outer periphery of the inner casing 3a in a non-rotatable manner. The outer casing 3b has hub attaching parts 30b and 30b (shown in FIG. 3) at its proximal end. The hub attaching parts 30b and 30b are secured to the outer periphery of the hub drum 102a of the hub 102 by bolts 30c and 30c. The inner casing 3a is thereby attached to the outer periphery of the hub drum 102a of the hub 102 via the outer casing 3b and protruded outward from the outer periphery of the hub drum 102a of the hub 102.

A partition 7 is provided in the inner casing 3a attached to the hub 102 as described above. The interior of the inner casing 3a is partitioned into the compression chamber 31 on the lower side as seen in the drawings and a hereinafter described communication supply passage 13b of the pneumatic tire compressed air supply passage 2 on the upper side as seen in the drawings by the partition 7.

The piston member 32 for compressing the air in the compression chamber 31 constituted as described above has a rod-like piston rod 33 as an operation element, a cam contact part 35 in contact with a cam face 91a of a cam 9, which will be described later, and a cam retention part retained by the cam 9. The piston rod 33 is slidably inserted through a rod guide member 38 made of a synthetic rubber and having a cylindrical shape in the inner casing 3a, and the distal end of the piston rod 33, which is the upper end thereof as seen in FIG. 2, is located in the compression chamber 31. The piston rod 33 in this state is disposed radially outside the cam face 91a of the cam 9 such that the axis of the piston rod 33 and the axis of the compression chamber 31 generally coincide with each other. A sliding part 34 is provided at the distal end of the piston rod 33.

The sliding part 34 has a diameter generally the same as the inside diameter of the compression chamber 31 and is slidable along the inner wall of the compression chamber 31 in the axial direction of the compression chamber 31, in other words, a radial direction of the axle 101 and the cam 9. The sliding part 34 has a ring-shaped packing 34a made of a synthetic rubber.

The piston rod 33 extends through the rod guide member 38 in the compression chamber 31 and a piston introduction hole 115 formed through the hub drum 102a, and the proximal end of the piston rod 33, that is, the lower end thereof as seen in the drawings, is located in the partitioned space 111 in the hub 102. The cam contact part 35 and the cam retention part is provided at the proximal end of the piston rod 33.

In this embodiment, the cam contact part 35 is constituted of a part of the outer periphery of a rotatable roller 37 as shown in FIG. 2. More specifically, the roller 37 is partially protruded between the piston rod 33 and the cam face 91a of the cam 9 from the piston rod 33 toward the cam face 91a of the cam 9, and rotatably attached to the piston rod 33 by a retention pin 36. The outer periphery of that part of the roller 37 protruded toward the cam face 91a constitutes the cam contact part 35. In this embodiment, the cam contact part 35 is formed on an extension q of the axis of the piston rod 33.

In this embodiment, the cam retention part is constituted of a part of the retention pin 36 for supporting the roller 37. More specifically, the retention pin 36, which extends through a pin insertion hole formed through the piston rod 33 and a pin insertion hole formed through the roller 37, is protruded to the left from the piston rod 33 and attached to the piston rod 33. The protruded part 36a of the retention pin 36 constitutes the cam retention part retained by the cam 9.

The cam 9, around which the roller 37 travels, has a cam body 91 having the cam face 91a having a circular cross-section and in contact with the roller 37 on its outer periphery, and a piston retaining part 92 as an operation element retaining part for removably retaining the piston member 32. The piston retaining part 92 has a disk-like shape. The piston retaining part 92 has a cam body receiving hole 92a for rotatably receiving the cam body 91 at the center thereof. The cam body 91 is rotatably received in the cam body receiving hole 92a, whereby the piston retaining part 92 is located on the left side in the axial direction on the cam face 91a of the cam body 91.

The piston retaining part 92 has pin insertion holes 92b, ... and 92b for rotatably receiving the protruded part 36a of the retention pin 36 of the piston member 32 around the outer periphery of the cam body receiving hole 92a. The protruded part 36a of the retention pin 36 is removably inserted into one of the pin insertion holes 92b, ... and 92b. In this embodiment, three pin insertion holes 92b, ... and 92b are formed circumferentially spaced at approximately 120° on a circle about the axis of the cam body receiving hole 92a of the pin supporting member 92. The protruded part 36a of the retention pin 36 may be inserted into any one of the pin insertion holes 92b, ... and 92b.

The piston member 32 of the compressed air producing section 1 is removably retained by the cam 9 via the retention pin 36. Thus, in this embodiment, although there is not provided a piston rod urging coil spring for constantly pressing the roller 37 of the piston member 32 against the cam face 91a, since the piston member 32 is constituted of a positive motion cam retained by the cam 9, the roller 37 of the piston member 32 can be in constant contact with the cam face 91a and run on the cam face 91 when the hub 102 is rotated. The piston member 32 is not necessarily retained by the cam 9. A piston rod urging coil spring may be provided so that the piston member 32 can be pressed in contact with the cam face 91a by the coil spring.

The cam 9 has an axle insertion hole 93 for receiving the axle 101 as shown in FIG. 3. The center 02 of the axle insertion hole 93 is a specific distance away from the center O1 of the cam face 91a.

The axle 101 is inserted through the axle insertion hole 93, and the cam 9 is fixed to the axle 101 from both right and left sides thereof by cam fixing nuts 44 and 44 as shown in FIG. 2. The cam fixing nuts 44 is located at fixed positions with respect to the ball pushers 101b by the positioning member 114 provided on the axle 101. In this fixed state, the center O2 of the axle insertion hole 93 coincides with the center O3 of rotation of the hub 102 as shown in FIG. 3.

Thus, the position on the cam face 91a where the roller 37 of the compressed air producing section 1 is in contact with the cam face 91a in the state shown in FIG. 2 and FIG. 3 is a small-diameter point A, where the distance from the center O2 of the axle insertion hole 93 is smallest. As the circumferential distance from the small-diameter point A is greater, the distance from the center O2 of the axle insertion hole 93 is greater, and the distance is greatest at a large-diameter point B, which is the position 180° away from the small-diameter point A.

Figure 6:
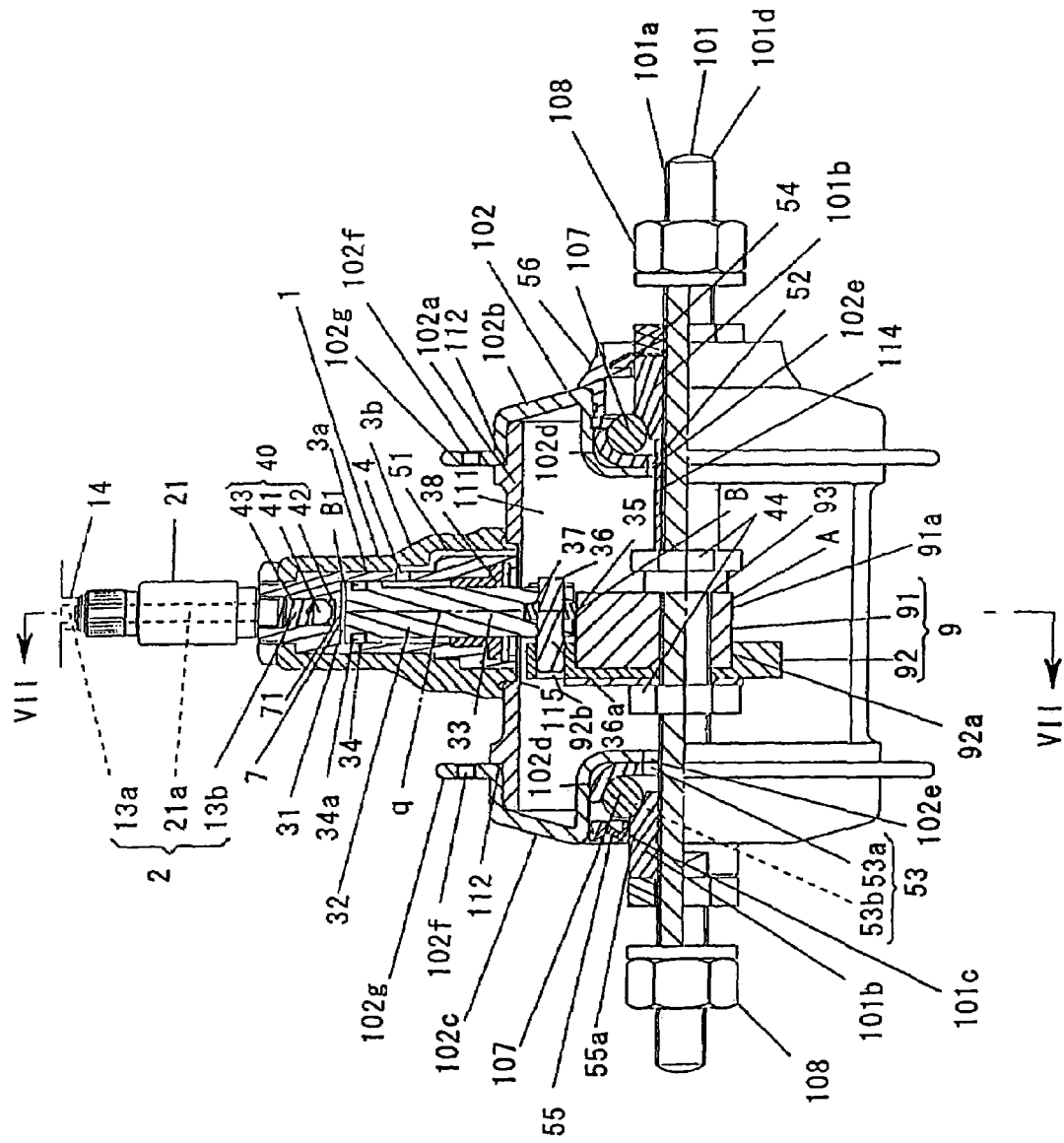
FIG. 6 is a cross-sectional explanatory view illustrating the state in which a sliding part of a compressed air producing section has been slid from the position shown in FIG. 2 to its uppermost position.
Figure 7:
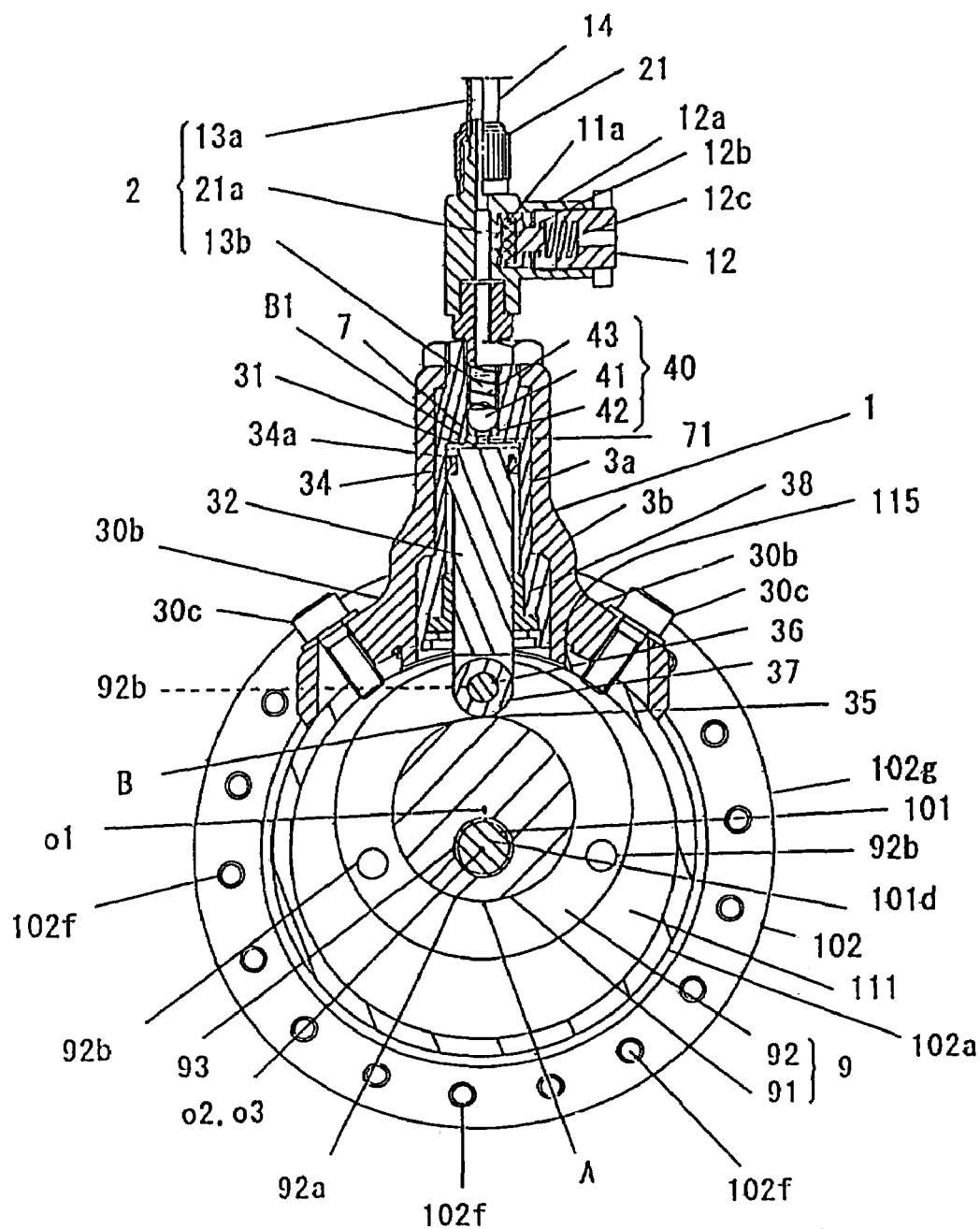
FIG. 7 is a cross-sectional explanatory view taken along the line VII-VII in FIG. 6.

When the roller 37 is at the small-diameter point A on the cam face 91a, the sliding part 34 of the piston rod 33 is at a lowermost position A1 in the compression chamber 31 and the capacity of the compression chamber 31 is maximum as shown in FIG. 2 and FIG. 3. When the roller 37 is at the large-diameter point B on the cam face 91a, the sliding part 34 of the piston rod 33 is at an uppermost position B1 in the compression chamber 31 and the capacity of the compression chamber 31 is minimum as shown in FIG. 6 and FIG. 7.

The air intake port 4 of the compressed air producing section 1 is provided to introduce air from outside into the compression chamber 31 as described before. In this embodiment, the air intake port 4 is formed in the vicinity of the lowermost position A1 in the movable range of the sliding part 34 of the piston rod 33, which is slidable in the compression chamber 31 between the lowermost position A1 and the uppermost position B1, and extends from the outer periphery of the inner casing 3a to the compression chamber 31 as shown in FIG. 2.

Since the air intake port 4 is formed in the vicinity of the lowermost position A1 in the movable range of the sliding part 34 in the compression chamber 31, when the sliding part 34 is slid from lowermost position A1 to the uppermost position B1, the air in the compression chamber 31 can be compressed without being allowed to escape through the air intake port 4 while the sliding part 34 is slid from a position just beyond the air intake port 4 to the uppermost position B1. Since the air intake port 4 is provided at the position described above, there is no need for a check valve for preventing air from escaping from the compression chamber 31 through the air intake port 4 when the sliding part 34 is slid to compress the air in the compression chamber 31. The automatic air-feeding mechanism is, therefore, simple in construction and hence can be produced at low costs.

When the air intake port 4 is provided in the vicinity of the lowermost position A1 in the movable range of the sliding part 34 in the compression chamber 31, a negative pressure is created in the compression chamber 31 when the sliding part 34 is slid from the uppermost position B1 toward the lowermost position A1 since air is not introduced into the compression chamber 31 until the sliding part 34 reaches the air intake port 4.

Thus, the resistance applied to the sliding part 34 when it is slid from the uppermost position B1 toward the lowermost position A1 is greater the resistance applied to the sliding part 34 when the intake port 4 is provided in the vicinity of the uppermost position B1 in the movable range of the sliding part 34 so that a negative pressure cannot be substantially created.

When the air intake port 4 is provided in the vicinity of the lowermost position A1 in the movable range of the sliding part 34 in the compression chamber 31, if the piston member 32 is not retained by the cam 9 and a piston rod urging coil spring as a compressing element urging spring for urging the piston rod 33 in the direction from the uppermost position B1 toward the lowermost position A1 is provided so that the sliding part 34 of the piston rod 33 can be slid from the uppermost position B1 to the lowermost position A1 by the urging force of the coil spring, it is necessary to use a coil spring having an urging force which is large enough to slide the sliding part 34 against the negative pressure in the compression chamber 31.

However, when a coil spring with such a large urging force is used, since the sliding part 34 has to be slid against the urging force of the coil spring when it is slid from the lowermost position A1 to the uppermost position B1, the resistance to the rotation of the hub 201 about the axle 101 is large. Thus, when the air intake port 4 is provided in the vicinity of the lowermost position A1 in the movable range of the sliding part 34 in the compression chamber 31, it is preferred that the piston member 32 is constituted of a positive motion cam retained by the cam 9 without using a piston rod urging coil spring since the resistance to the rotation of the hub 201 about the axle 101 can be small so that the hub 201 can be rotated smoothly.

The position of the air intake port 4 is not limited to the position described above. For example, the air intake port 4 may be provided in the vicinity of the uppermost position B1 in the movable range of the sliding part 34. In this case, however, a check valve has to be provided, which results in an increase in the number of steps in the production process and the cost. Thus, in view of the simplicity of the automatic air-feeding mechanism and the production costs, the air intake port 4 is preferably provided in the vicinity of the lowermost position A1 in the movable range of the sliding part 34 as in the above embodiment.

In this embodiment, the compressed air producing section 1 has a waterproof mechanism constituted of a first air passage 51, a right axle-gap air passage 52 as a second air passage extending from the first air passage 51, a third air passage 54 extending from the right axle-gap air passage 52, and a seal member 55.

The first air passage 51 connects the air intake port 4 in air flow communication with the partitioned space 111 and guides the air in the partitioned space 111 to the air intake port 4. In this embodiment, the first air passage 51 is constituted of a guide groove formed in the inner surface of the outer casing 3b and extending from the air intake port 4 to the partitioned space 111 of the hub 102.

Figure 5:
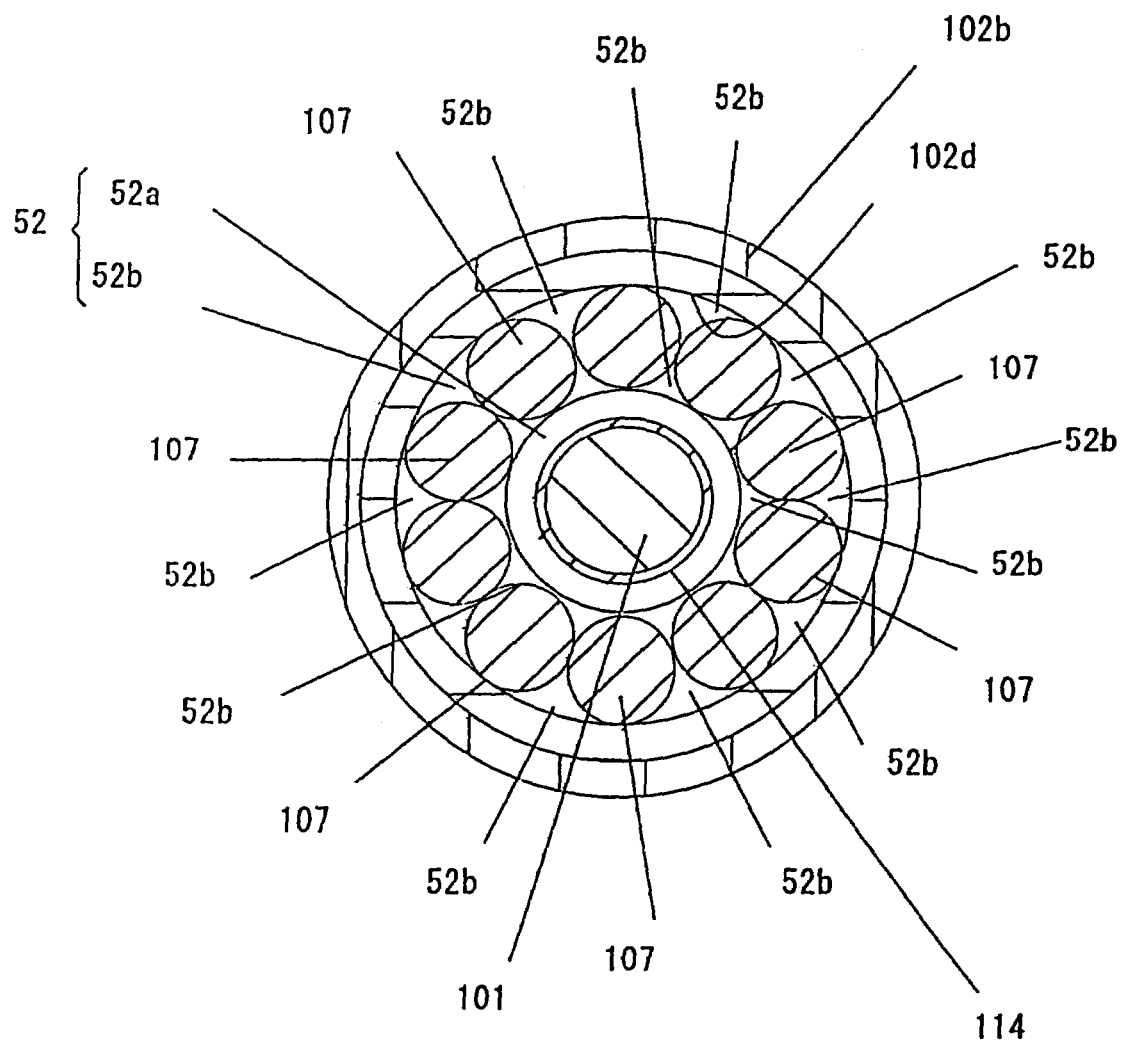
FIG. 5 is a cross-sectional view taken along the line V-V in FIG. 4.

The right axle-gap air passage 52 is a spatial passage formed through the right supporting part 102b and constituted of an axle gap 52a between the inner surface of the axle hole 102e of the right supporting part 102b of the hub 102 and the axle 101 extending through the axle hole 102e, and steel ball gaps 52b, . . . and 52b between the steel balls 107 and.107 disposed between the ball pusher 101b of the axle 101 and the steel ball receiving part 102d as shown in FIG. 4 and FIG. 5.

In this embodiment, a positioning member 114 is provided in the axle hole 102e, so that the axle gap 52a is defined between the inner surface of the axle hole 102e and the outer periphery of the positioning member 114.

The third air passage 54 is defined between the inner surface of a cylindrical member 56 and the outer periphery of the axle 101 and communicates the right axle-gap air passage 52 with the outside as shown in FIG. 4.

More specifically, the cylindrical member 56 is made of a synthetic resin and has an engaging projection 56a for attaching it to the right supporting part 102b on the outer periphery of the left end thereof as shown in FIG. 4.

The engaging projection 56a is fitted in an engaging groove 102h of the right supporting part 102b, whereby the cylindrical member 56 is attached to the right supporting part 102d of the hub 102.

A waterproof packing 116 is interposed between the outer periphery of the cylindrical member 56 and the right supporting part 102b so that water cannot enter the right axle-gap air passage 52 through a gap between the outer periphery of the cylindrical member 56 and the right supporting part 102b.

The axle 101 extends through the cylindrical member 56 attached to the right supporting part 102b of the hub 102 as described above, and the third air passage 54 communicating the right axle-gap air passage 52 with the outside is formed around the entire circumference of the axle 101 between the inner surface of the cylindrical member 56 and the axle 101. In this embodiment, the ball pusher 101b of the axle 101 is disposed inside the cylindrical member 56, and the third air passage 54 is defined between the outer periphery of the ball pusher 101b and the inner surface of the cylindrical member 56.

The third air passage 54 has a taper part 59a on the outside (right side in FIG. 4) defined by an inner surface of the cylindrical member 56, which is tapered such that the inside diameter gradually increases toward the outside on the right, and a small-diameter small-width part 59c inside the taper part 59a (on the left side in FIG. 4) defined by a closed part 59b extending radially inward from the taper part 59a and having a small radial width L1. In this embodiment, the taper part 59a has a taper angle P of 10°.

The third air passage 54 also has a large-diameter small-width part 61 defined by an inner surface of the cylindrical member 56 and a cover member 60 on the right side of the small-diameter small-width part 59c. The cover member 60, which has a disk-like shape with a diameter greater than that of the small-diameter small-width part 59c, is disposed radially inside the taper part 59a of the cylindrical member 56 and secured to the axle 101.

The large-diameter small-width part 61 having a radial width L2 which is generally the same as the width L1 of the small-diameter small-width part 59c and a diameter greater than that of the small-diameter small-width part 59c is thereby defined between the outer periphery of the cover member 60 and the taper part 59a of the cylindrical member 56. Thus, in this embodiment, the third air passage 54 has two small-width parts 59c and 61 with different diameters so that air can flow windingly because of the two small-width parts 59c and 61. In this embodiment, the width L1 of the small-diameter small-width part 59c and the width L2 of the large-diameter small width part 61 are both approximately 0.5 mm.

The seal member 55 seals a left axle-gap air passage 53 formed in the hub 102 from outside. The left right axle-gap air passage 53 is, as in the case of the right axle-gap air passage 52, a spatial passage constituted of an axle gap 53a between the inner surface of the axle hole 102e of the left supporting part 102c of the hub 102 and the axle 101 extending through the axle hole 102e, and steel ball gaps 53b between the steel balls 107 and 107 disposed between the ball pusher 101b and 101b of the axle 101 and the steel ball receiving part 102d as shown in FIG. 2.

The seal member 55 has a ring shape and made of a synthetic rubber as shown in FIG. 2. An fitting piece 55a formed on the inner periphery of the seal member 55 is fitted in a fitting groove 101c of the ball pusher 101b, whereby the seal member 55 is attached to the ball pusher 101b. The outer periphery of the seal member 55 attached to the ball pusher 101b as described above is in contact with the left supporting member 102c along its entire circumference. The seal member 55 thereby seals the left axle-gap air passage 53 from outside to prevent water from entering the left axle-gap air passage 53.

The pneumatic tire compressed air supply passage 2 of the automatic air-feeding mechanism will be next described. The pneumatic tire compressed air supply passage 2 is formed between the compressed air producing section 1 and the pneumatic tire 103, and has the communication supply passage 13b communicated with the compression chamber 31 of the compressed air producing section 1, a pneumatic tire feeding supply passage 13a connected to the air tube 103b of the pneumatic tire 103, and a connection supply passage 21a connecting the communication supply passage 13b and the pneumatic tire feeding supply passage 13a as shown in FIG. 2 and FIG. 3.

The communication supply passage 13b is defined by the partition 7 on the upper side in the compression chamber 31, as seen in FIG. 2, in the inner casing 3a. A through hole 71 is formed through the partition 7, and the compression chamber 31 is connected in air flow communication with the communication supply passage 13b through the through hole 71.

A check valve 40 is provided in the through hole 71. The check valve 40 is provided as means for preventing air from flowing in reverse from the pneumatic tire compressed air supply passage 2 to the compression chamber 31, and constituted of a ball valve 40 disposed on the side of the pneumatic tire compressed air supply passage 2 in this embodiment. The ball valve 40 has a ball 41, a ball receiving packing 42 having a ring shape and made of a synthetic rubber for receiving the ball 41, and a ball urging coil spring 43 as urging means for urging the ball 41 toward the ball receiving packing 42. The ball 41 is urged by the urging force of the ball urging coil spring 43 to close the through hole 71 from the side of the pneumatic tire compressed air supply passage 2.

The connection supply passage 21a is formed within a cylindrical connection pipe 21. The proximal end of the connection pipe 21 is fitted in the communication supply passage 13b of the inner casing 3a. The proximal end of the connection supply passage 21a is thereby connected in air flow communication with the communication supply passage 13b.

The connection pipe 21 has a pressure adjusting section 12 for controlling the air pressure in the pneumatic tire compressed air supply passage 2 as shown in FIG. 3. The pressure adjusting section 12 causes the pneumatic tire compressed air supply passage 2 to function as a constant pressure maintaining section for maintaining the air pressure at a constant level.

In this embodiment, the pressure adjusting section 12 has a cylindrical part 12a with an air discharge port 11a, a valve element 12b for opening and closing the air discharge port 11a, and a constant pressure valve urging coil spring 12c as constant pressure valve urging means for urging the valve element 12b.

The cylindrical part 12a is attached to the side wall of the connection pipe 21, and the air discharge port 11a of the cylindrical part 12a communicates the connection supply passage 21a with the outside so that compressed air in the connection supply passage 21a can be discharged to the outside through the air discharge port 11a.

The constant pressure valve urging coil spring 12c constantly urges the valve element 12b toward the connection supply passage 21a. The valve element 12b thereby closes the air discharge port 1a.

The pressure adjusting section 12 is not necessarily provided at the connection supply passage 21a and can be provided at any part of the pneumatic tire compressed air supply passage 2. Also, the pressure adjusting section 12 may be modified as needed. For example, the pressure adjusting section 12 may be constituted of a ball valve.

The pneumatic tire feeding supply passage 13a is formed in a connection pipe 14 having elasticity. The connection pipe 14 is attached to the distal end of the connection pipe 21 with its proximal end fitted over the connection pipe 21. The connection supply passage 21a is thereby connected in air flow communication with the pneumatic tire feeding supply passage 13a.

A pneumatic tire connecting part 16 is provide at the distal end of the connection pipe 14, which is the end opposite from the end attached to the connection pipe 21, and removably connected to the pneumatic tire 103 as shown in FIG. 8. The pneumatic tire connecting part 16 has a packing 16a, and a nut engaging piece 16b engageable with the valve fixing nut 106d of the air tube 103b. The nut engaging piece 16b is engaged with the valve fixing nut 106d with the packing 16a in contact with an end of the valve 106. The pneumatic tire feeding supply passage 13a is thereby connected in air flow communication with the air tube 103b.

The operation of the automatic air-feeding mechanism for a pneumatic tire of this embodiment will be described. The pneumatic tire 103 is rotated about the axle 101 from the state in which the sliding part 34 is in the lowermost position A1 in the compression chamber 31 in the compressed air producing section 1 and the sliding part 34 is in the uppermost position B1 in the compression chamber 31 in a second compressed air producing section 1b as shown in FIG. 2 and FIG. 3 by, for example, riding the bicycle. When the hub 102 is rotated, the roller 37 of the piston member 32 of the compressed air producing section 1 is rotated together with the hub 102 and runs on the cam face 91a of the cam 9 from the small-diameter point A toward the large-diameter point B.

Then, the piston member 32 is pressed by the cam 9 and kept pressed until the roller 37 of the piston member 32 reaches the large-diameter point B of the cam 9. At this time, the sliding part 34 is slid in the compression chamber 31 along the inner wall thereof from the lowermost position A1 to the uppermost position B1.

While the sliding part 34 is slid from the lowermost position A1 to the uppermost position B1, the air in the compression chamber 31 is compressed up to a certain compression ratio.

If an urging coil spring, for example, is used to press the piston rod 33 during the sliding of the sliding part 34 so that the proximal end of the piston rod 33 can be kept in contact with the cam face 91a of the cam 9, the piston rod 33 has to be slid against the urging force of the coil spring, causing a resistance to the rotation of the hub 102. In this embodiment, however, since the piston rod 33 is retained by the cam 9 via the retention pin 36 and such an urging coil spring is not used, the piston rod 33 can be smoothly slid with a small force. Thus, the resistance to the rotation of the hub 102 is small.

When a force in the tangential direction of the cam 9 which the piston rod 33 receives from the cam 9 is too large, the piston rod 33 presses the rod guide member 38 in the compression chamber 31 in one direction, making it difficult for the piston rod 33 to slide and causing wear of the rod guide member 38. As a result, the piston rod 33 is inclined with respect to the axial direction of the compression chamber 31, which makes it more difficult for the piston rod 33 to slide. In this embodiment, however, since the force components in the axial direction of the compression chamber 31 and a direction perpendicular thereto which the piston rod 33 receives from the cam 9 can be considerably small, the wear of the rod guide member 38 can be reduced. Thus, even when repeatedly used, the piston rod 33 can be constantly pressed and smoothly slid in the axial direction of the compression chamber 31.

Then, when the roller 37 of the piston member 32 of the compressed air producing section 1 reaches the large-diameter point B of the cam face 91a, the sliding part 34 of the piston rod 33 of the compressed air producing section 1 reaches the uppermost position B1 as shown in FIG. 6 and FIG. 7. By the movement of the sliding part 34, the air in the compression chamber 31 of the compressed air producing section 1 is compressed.

When the air in the compression chamber 31 of the compressed air producing section 1 is compressed as described above, the ball 41 of the check valve 40 is pushed by the pressure of the compressed air in the compression chamber 31. At this time, the ball 41 of the check valve 40 receives the pressure caused by the air pressure in the pneumatic tire compressed air supply passage 2 and the urging force of the ball urging coil spring 43. Thus, the pressure from the pneumatic tire compressed air supply passage 2 is smaller than the pressure from the compression chamber 31, the ball 41 of the check valve 40 is moved to the side of the pneumatic tire compressed air supply passage 2 to open the through hole 71. The compressed air in the compression chamber 31 is thereby fed into the pneumatic tire compressed air supply passage 2 through the through hole 71.

Then, when the sliding part 34 is moved in the compression chamber 31 from the uppermost position B1 to the lowermost position A1, the ball 41 of the check valve 40 closes the through hole 71. The air in the pneumatic tire compressed air supply passage 2 is thereby prevented from returning into the compression chamber 31.

When the air pressure in the pneumatic tire compressed air supply passage 2 filled with compressed air exceeds a specific level, the valve element 12b of the pressure adjusting section 12 is pushed to open the air discharge port 11a against the urging force of the constant pressure valve urging coil spring 12c by the air pressure in the pneumatic tire compressed air supply passage 2. The compressed air in the pneumatic tire compressed air supply passage 2 is thereby discharged to the outside through the air discharge port 11a. Then, when the air pressure in the pneumatic tire compressed air supply passage 2 becomes a specific level, the valve element 12b is pushed by the urging force of constant pressure valve urging coil spring 12c to close the air discharge port 11a.

The compressed air maintained at a specific pressure in the pneumatic tire compressed air supply passage 2 enters the valve 106 of the air tube 103b and pushes the check valve 106c closing the valve hole 106b from inside of the valve 106 as shown in FIG. 8. When the pressure on the check valve 106c from inside thereof caused by the air pressure in the pneumatic tire compressed air supply passage 2 is greater than the total of the elastic force of the check valve 106c and the pressure on the check valve 106c caused by the air pressure in the air tube 103b, the air in the pneumatic tire compressed air supply passage 2 forcibly opens the check valve 106c closing the valve hole 106b from inside and flows into the air tube 103b.

Then, when the pressure on the check valve 106c caused by the air pressure in the pneumatic tire compressed air supply passage 2 becomes equal to the total of the elastic force of the check valve 106c and the pressure on the check valve 106c caused by the air pressure in the air tube 103b, the air flow into the air tube 103b is stopped.

After that, when the air pressure in the air tube 103b is reduced over time and the total of the elastic force of the check valve 106c and the pressure on the check valve 106c caused by the air pressure in the air tube 103b becomes smaller than the pressure on the check valve 106c caused by the air pressure in the pneumatic tire compressed air supply passage 2, the check valve 106c closing the valve hole 106b is forcibly opened from inside by the air pressure in the pneumatic tire compressed air supply passage 2 and the air in the pneumatic tire compressed air supply passage 2 flows into the air tube 103b. The air pressure in the air tube 103b is thereby maintained constant.

When the connection pipe 14 comes off the connection tube 21 or the pneumatic tire 103, or when the connection pipe 14 is broken, the valve 106 of the pneumatic tire 103 can maintain the air pressure in the pneumatic tire 103. Although the cam 9 is fixed to the axle 101 and is not moved, and the piston rod 33 runs on the cam face 91a and changes the position, the position of the piston rod 33 is not changed and the position of the cam face 91a is changed in FIG. 6 and FIG. 7 for the convenience of explanation. This is the case in FIG. 12 and FIG. 13 described later.

When the hub 102 is further rotated, the piston member 32 is pulled by the cam 9 since the retention pin 36 is retained by the piston retaining part 92 of the cam 9. Thus, the roller 37 is kept in contact with the cam face 91a of the cam 9 and runs on the cam face 91a from the large-diameter point B toward the small-diameter point A. At this time, the cam 9 pulls the left side of the piston rod 33 of the piston member 32, which is at a distance from the extension q of the axis of the piston rod 33. However, when the sliding part 34 is slid from the uppermost position B1 to the lowermost position A1, the sliding part 34 can be slid by a force smaller than that required when the sliding part 34 is slid from the lowermost position A1 to the uppermost position B1 to compress air since compression of air is not conducted, and hence the piton rod 33 can be pulled smoothly.

By the running of the roller 37, the sliding part 34 is moved in the compression chamber 31 from the uppermost position B1 to the lowermost position A1 and returns to the position shown in FIG. 2 and FIG. 3.

When the sliding part 34 of the piston rod 33 passes the air intake port 4 during the slide from the uppermost position B1 to the lowermost position A1, air is introduced from the partitioned space 111 of the hub 102 into the compression chamber 31 through the first air passage 51 and the air intake port 4.

When the air in the partitioned space 111 flows into the first air passage 51, outside air is sucked into the partitioned space 111 through the right axle-gap air passage 52 as the second air passage 52 and the third air passage 54.

At this time, since the third air passage 54 has the taper part 59a, water Ml having entered the taper part 59a can be moved to the large-diameter side of the taper part 59a and discharged out of the third air passage 54 by a centrifugal force created by the rotation of the hub as shown in FIG. 4. Also, the water Ml having entered the taper part 59a can be moved outward on the taper part 59a and discharged out of the third air passage 54 by its own weight. In addition, since the two small-width parts 59c and 61 with different diameters of the third air passage 54 make it difficult for the water Ml, which is derived from rain or the like, to pass through the third air passage 54, it is difficult for the water M1 to enter the right axle-gap air passage 52 through the third air passage 54.

Even if water M1 derived from rain or the like enters the right axle-gap air passage 52 through the third air passage 54, it is difficult for the water M1 to pass through the right axle-gap air passage 52 because the steel balls 107, . . . and 107 and grease are disposed in the right axle-gap air passage 52. This makes it difficult for the water M1 to enter the partitioned space 111 of the hub 102 through the right axle-gap air passage 52.

Thus, only air and no water M1 is allowed to enter the partitioned space 111 through the second and third air passages 52 and 54. As a result, only air can be sucked into the compression chamber 31 from the partitioned space 111 through the first air passage 51, and rainwater or the like is prevented from entering the compression chamber 31 together with the air.

After that, when the hub 102 is rotated and the sliding part 34 of the piston member 32 is slid in the compression chamber 31 in the same manner as described above, the production of compressed air and introduction of outside air are alternately repeated in the compression chamber 31 and the produced compressed air is supplied into the pneumatic tire 103 as needed.

To remove the piston member 32 from the cam 9, the retention pin 36 is pulled to the right together with the piston rod 33 to remove it from the pin insertion hole 92b. The piston member 32 can be thereby removed from the cam 9, and the inner casing 3a defining the compression chamber 31 or the piston rod 33 can be easily removed from the hub 102. Since the parts can be easily disassembled and replaced, maintenance can be made easily.

Although the second air passage 52 is constituted of the right axle-gap air passage 52 and the third air passage 54 for communicating the right axle-gap air passage 52 with the outside is provided since the left axle-gap air passage 53 is sealed by the seal member 55 to isolate it from the outside in the above first embodiment, the present invention is not limited thereto and may be modified as needed. For example, the second air passage may be constituted of the right axle-gap air passage 52 and the left axle-gap air passage 53 without providing the seal member 55, and third air passages 54 for the right axle-gap air passage 52 and the left axle-gap air passage 53 may be provided. However, when a third air passage 54 as in the above embodiment is provided on both sides of the hub 102, the cost is increased. Thus, in order to make it difficult for water to enter the second air passage 54 and reduce the production costs, it is preferable to provide a third air passage 54 only on the right or left side of the hub 102 and a seal member 55 on the other side of the hub 102.

Although the third air passage 54 is formed by the cylindrical member 56 secured to the hub 102 and the cover member 60 secured to the axle 101 in the above first embodiment, the present invention is not limited thereto and may be modified as needed. For example, the third air passage 54 may be formed by only the cylindrical member 56 secured to the hub 102.

Although the second air passage is constituted of the right axle-gap air passage 52 formed in the hub 102 in the above first embodiment, modifications may be made as needed. For example, the second air passage may be constituted of through holes formed through the supporting parts 102b and 102c and extending from the partitioned space 111 to the outside instead of or in conjunction with the right axle-gap air passage 52. More specifically, the supporting parts 102b and 102c may be rotatably supported on the hub 102 via sealed bearings, and through holes formed through the radially outer parts of the sealed bearings for the supporting parts 102b and 102c and extending from the partitioned space 111 to the outside may be used as the second air passage.

Although the waterproof mechanism is constituted of the first air passage 51, the second air passage 52, the third air passage 54 and the seal member 55 in the above first embodiment, the waterproof mechanism may be constituted of a bore formed through the outer casing 3b for communicating the air intake port 4 of the inner casing 3b with the outside and a film covering the bore which passes air therethrough but prevents passage of fluid so that only air can be allowed to pass and rainwater or the like can be prevented from entering the bore from the outside of the outer casing 3b by the film.

Although the taper angle P of the taper part 59a of the cylindrical member 56 is 10° in the above first embodiment, the taper angle is not limited thereto and may be different as needed. Preferably, the taper angle P is in the range of approximately 5 to 15°. When the taper angle P is smaller than 5°, water cannot be smoothly moved toward the large-diameter side and discharged from the taper part 59a by a centrifugal force created by the rotation of the hub. Also, water cannot be smoothly moved toward the large-diameter side and discharged from the taper part 59a by its own weight. When the taper angle P is greater than 15°, falling rainwater or the like can easily enter the taper part 59a.

Although the widths L1 of the small-diameter small-width part 59c and the width L2 of the large-diameter small-width part 61 of the third air passage 54 are both approximately 0.5 mm in the above first embodiment, the widths L1 and L2 may be different as needed. Preferably, the widths L1 and L2 are in the range of approximately 0.1 to 1.5 mm. When the widths L1 and L2 are smaller than approximately 0.1 mm, a negative pressure is created in the partitioned space 111 of the hub 102 and water may be sucked into the partitioned chamber 111 together with air when the piton rod 33 is slid in the compression chamber 31 and air is sucked into the compression chamber 31 from the partitioned space 111. When the widths L1 and L2 are greater than approximately 1.5 mm, water can easily enter the partitioned space 111. As has been described above, the third air passage 54 is defined between the inner surface of the cylindrical member 56 secured to the hub 102 and the outer periphery of the axle 101 in this embodiment. Also, the third air passage 54 has the small-diameter small-width part 59c with a small radial width L1 formed by partially reducing the inside diameter of the cylindrical member 56. In addition, the third air passage 54 has the large-diameter small-width part 61 defined by the cover member 60 located inside the cylindrical member 56 and secured to the axle body 102d, and having a radial width L2 which is generally the same as that of the small-diameter small-width part 59c and a diameter greater than that of the small-diameter small-width part 59c. As described above, the third air passage 54 has at least two small-width parts 59c and 61 which are different in at least diameter so that air can flow windingly because of the two small-width parts 59c and 61. The radial widths L1 and L2 of the two small-width parts 59c and 61 are in the range of approximately 0.1 to 1.5 mm.

Figure 9:
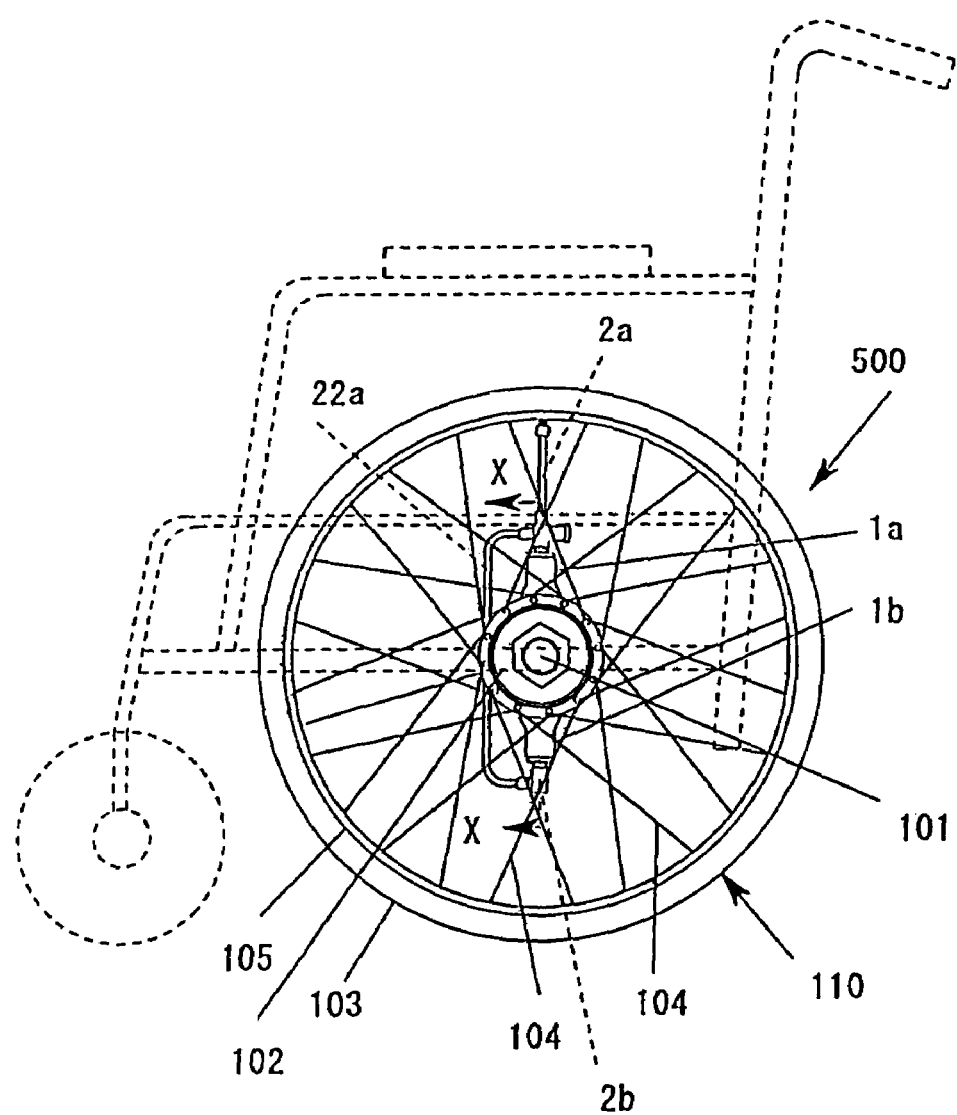
FIG. 9 is a side view of a wheel of a wheelchair provided with an automatic air-feeding mechanism according to a second embodiment of the present invention.
Figure 10:
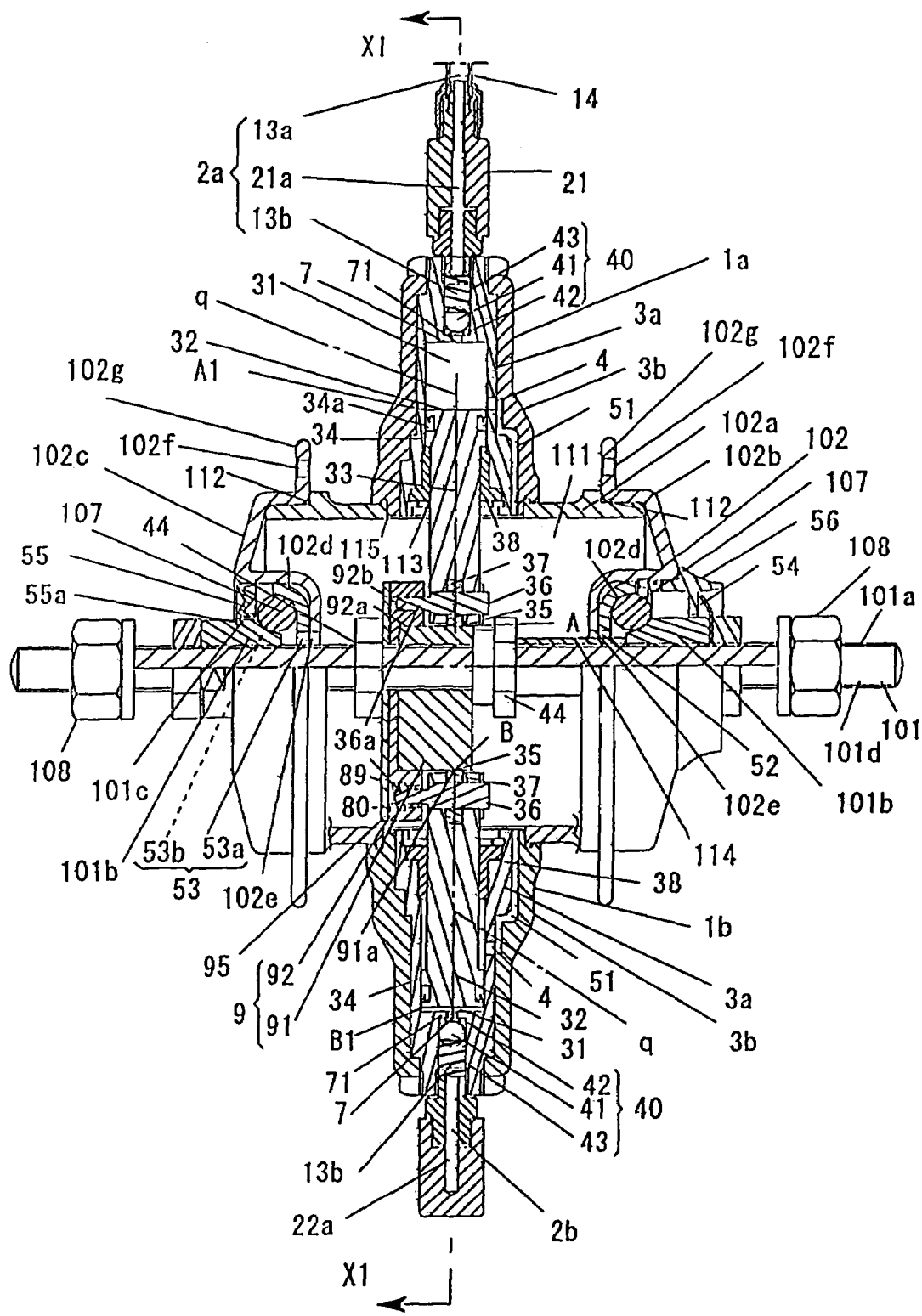
FIG. 10 is an enlarged cross-sectional explanatory view taken along the line X-X in FIG. 9.

Description will be next made of a second embodiment. FIG. 9 is a side view of a wheel of a wheelchair provided with an automatic air-feeding mechanism for a pneumatic tire according to the second embodiment, and FIG. 10 is an enlarged cross-sectional explanatory view taken along the line X-X in FIG. 1.

The automatic air-feeding mechanism of the second embodiment is provided on both a left wheel 500 and a right wheel (not shown) of a wheelchair to constitute an automatic air-feeding mechanism for pneumatic tires of a wheelchair. The left wheel 500 and the right wheel of the wheelchair provided with the automatic air-feeding mechanism for pneumatic tires of a wheelchair are the same in construction. Description will be made of the left wheel 500 and description of the right wheel will be omitted.

The left wheel 500 has an axle 101 and a wheel body 110. The axle 101 is the same in construction as the axle 101 in the first embodiment.

As shown in FIG. 9, the wheel body 110 has a hub 102, a pneumatic tire 103 and an automatic air-feeding mechanism. The hub 102 and the pneumatic tire 103 are the same in construction as the hub 102 and the pneumatic tire 103 in the first embodiment.

The automatic air-feeding mechanism has a plurality of compressed air producing sections 1a and 1b, and pneumatic tire compressed air supply passages 2a and 2b for introducing compressed air produced in the compressed air producing sections 1a and 1b to the pneumatic tire.

Figure 11:
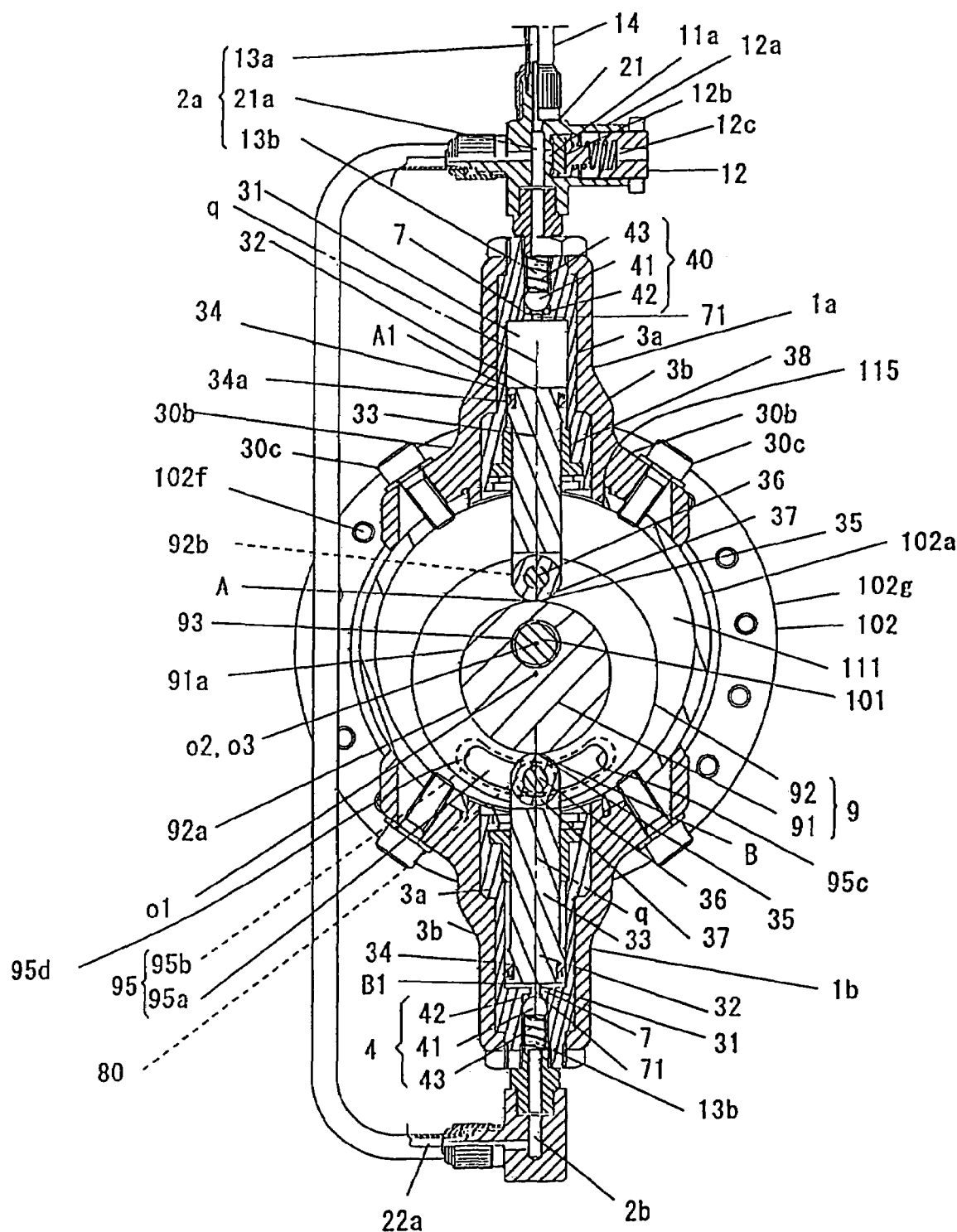
FIG. 11 is a cross-sectional explanatory view taken along the line XI-XI in FIG. 10.

In this embodiment, the compressed air producing sections are a first compressed air producing section 1a shown on the upper part in FIG. 10 and FIG. 11 and a second compressed air producing section 1b shown on the lower part in FIG. 10 and FIG. 11.

The first and second compressed air producing sections 1a and 1b are the same in construction as the compressed air producing sections 1 of the first embodiment. The first and second compressed air producing sections 1a and 1b are spaced 180° apart from each other around the hub drum 102a and secured to the outer periphery of a hub drum 102a by bolts 30c and 30c.

The first and second compressed air producing sections 1a and 1b have piston members 32 and 32, which are retained by a disk-shaped piston retaining part 92 of a cam 9 via retention pins 36 and 36 attached to the piston members 32 and 32 as in the case of the piston member 32 of the first embodiment.

Figure 13A:
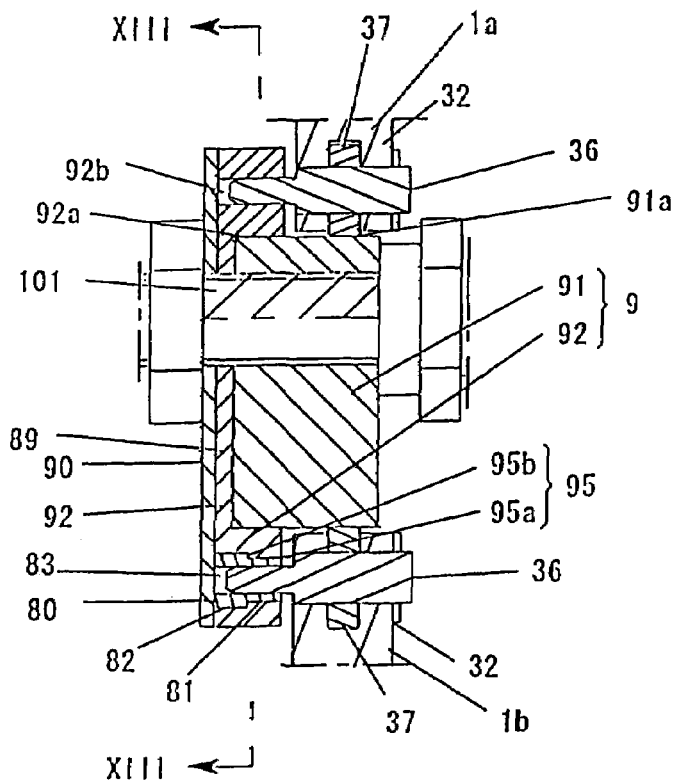
FIG. 13(A) is a partial enlarged cross-sectional view of a cam.
Figure 13B:
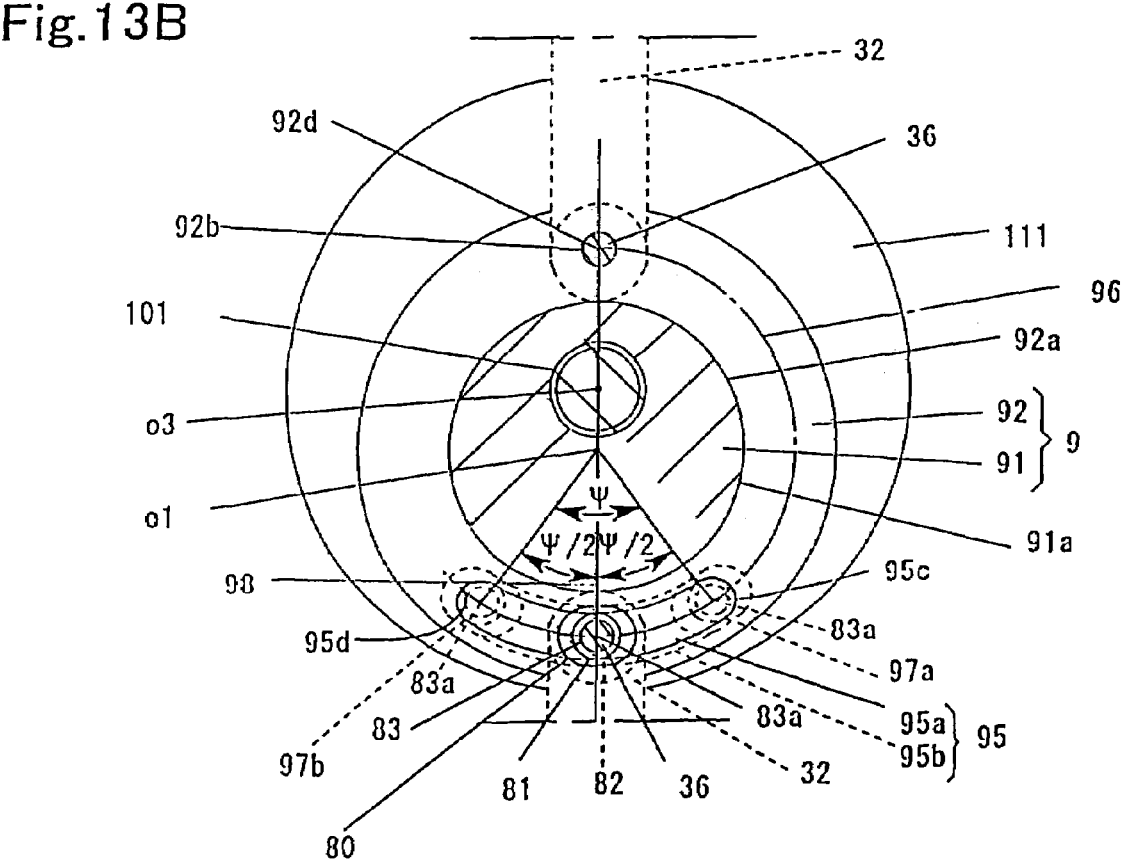
FIG. 13(B) is a cross-sectional view taken along the line XIII-XIII in FIG. 13(A)

In the second embodiment, the piston retaining part 92 of the cam 9 has a retention body 89, a slider 80 slidable along the retention body 89, and a supporting member 90 for slidably supporting the slider 80 as shown in FIG. 13A and FIG. 13B.

Figure 12A:
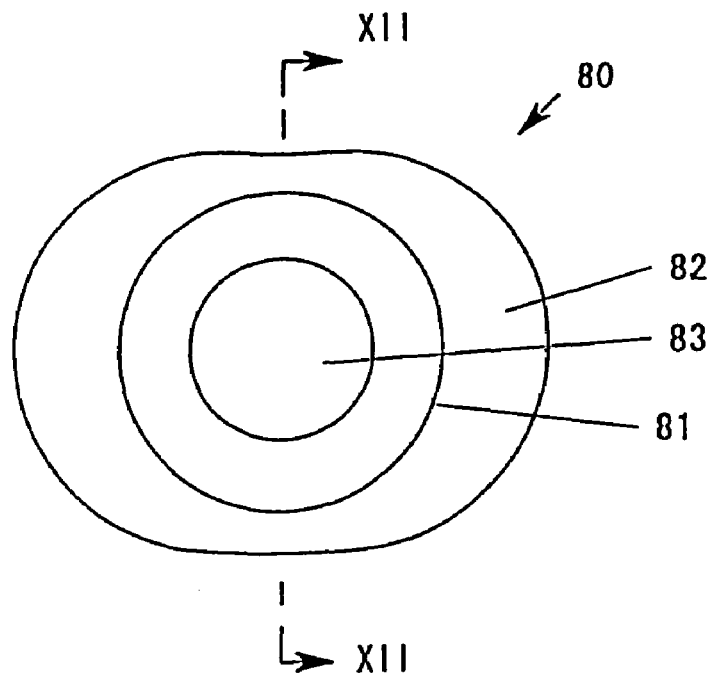
FIG. 12(A) is a front view of a slider.
Figure 12B:
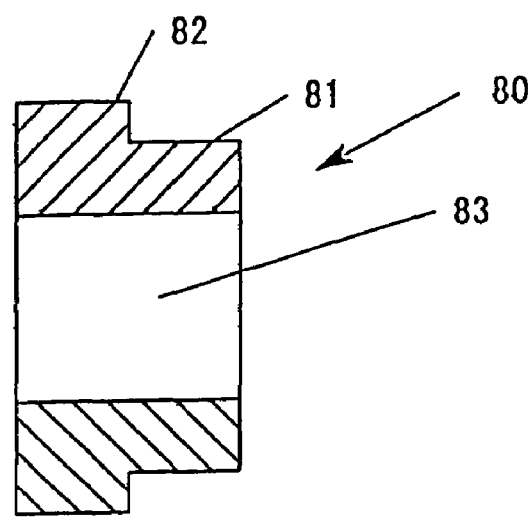
FIG. 12 (B) is a cross-sectional view taken along the line XII-XII in FIG. 12(A)

The slider 80 has a cylindrical shape as shown in FIG. 12A and FIG. 12B. The inner periphery of the slider 80 defines a retention pin insertion hole 83 for receiving the retention pin 36. The slider 80 has a cylindrical part 81 and a flange 82 with a diameter larger than that of the cylindrical part 81 on the outer periphery thereof.

The retention body 89 has a first pin insertion hole 92b and a second pin insertion hole 95 formed on a circle 96 about the axis of the cam body receiving hole 92a, which coincides with the center O1 of the cam face 91a, as shown in FIG. 13A and FIG. 13B.

The first pin insertion hole 92b is a circular hole as in the case of the pin insertion hole 92b of the first embodiment. The retention pin 36 of the piston member 32 of the first compressed air producing section 1a is rotatably inserted in the first pin insertion hole 92b.

The second pin insertion hole 95 has a sliding groove 95a as an arcuate slit with a specific length in the circumferential direction of the circle 96 and a seat part 95b formed around the sliding groove 95a and extending to a specific width and a specific length from the left side of the piston retaining part 92.

The cylindrical part 81 of the slider 80 is received in the sliding groove 95a of the second pin insertion hole 95, and the slider 80 is slidably received in the second pin insertion hole 95 with the flange 82 in contact with the seat part 95b.

The slider 80 received in the second pin insertion hole 95 as described above is movable in the second pin insertion hole 95 between a start position 97a where the cylindrical part 81 abuts against a first end 95c of the sliding groove 95a and an end position 97b where the cylindrical part 81 abuts against a second end 95d of the sliding groove 95a.

The position of the second pin insertion hole 95 receiving the slider 80 as described above with respect to the first pin insertion hole 92b and the length of the sliding groove 95a of the second pin insertion hole 95 is determined as follows in this embodiment.

A line extended from the axis 92d of the first pin insertion hole 92b through the center O1 of the cam face 91a until it crosses to the circle 96 as shown in FIG. 13B is defined as a reference line 98. The second pin insertion hole 95 is formed such that the axis 83a of the retention pin insertion hole 83 of the slider 80 is rotatable from the intersection of the reference line 98 and the circle 96 in both clockwise and counterclockwise directions through angles $\Psi/2$ and $\Psi/2$ of approximately 36° about the center O1 of the cam face 91a to the start position 97a and the end position 97b of the slider 80.

The supporting member 90 functions as slider inclination preventing means for preventing the slider 80 from being inclined with respect to the axial direction of the axle 101 when it is slid and has a disk-like shape as shown in FIG. 13A. The supporting member 90 covers the slider 80 received in the second pin insertion hole 95 from the side of the seat part 95b thereof and attached to the axle 101. The flange 82 of the slider 80 is thereby kept in contact with the seat part 95b when the slider 80 is slid in the second pin insertion hole 95. Thus, the axis of the retention pin insertion hole 83 of the slider 80 can be kept in generally parallel to the axis of the axle 101 and is not inclined with respect to the axial direction of the axle 101 when the slider 80 is slid in the second pin insertion hole 95.

The retention pin 36 of the piston member 32 of the second compressed air producing section 1b is inserted in the retention pin insertion hole 83 of the slider 80 received in the second pin insertion hole 95 as described above. The retention pin 36 is thereby movable, together with the slider 80, in the second pin insertion hole 95 in the circumferential direction of the cam face 91a through an angle $\Psi$ of approximately 72° about the center O1 of the cam face 91a.

Since the first and second compressed air producing sections 1a and 1b are positioned as described above, when the roller 37 of the piston member 32 of the first compressed air producing section 1a is in contact with the small-diameter point A of the cam face 91a and the sliding part 34 of the piston rod 33 is in the lowermost position A1 in the compression chamber 31 in the first compressed air producing section 1a, the retention pin 36 of the piston member 32 of the second compressed air producing section 1b is located generally in the middle of the second pin insertion hole 95, the roller 37 of the piston member 32 of the second compressed air producing section 1b is in contact with the large-diameter point B of the cam face 91a, and the sliding part 34 of the piston rod 33 is in the uppermost position B1 in the compression chamber 31 in the second compressed air producing section 1b as shown in FIG. 10 and FIG. 11.

The pneumatic tire compressed air supply passages 2a and 2b will be next described. The pneumatic tire compressed air supply passages of the second embodiment are constituted of the first pneumatic tire compressed air supply passage 2a formed between the first compressed air producing section 1a and the pneumatic tire 103 and the second pneumatic tire compressed air supply passage 2b formed between the second compressed air producing section 1b and the pneumatic tire 103.

The first pneumatic tire compressed air supply passage 2a, which is the same in construction as the pneumatic tire compressed air supply passage 2 of the first embodiment, has a communication supply passage 13b communicated with the compression chamber 31 of the first compressed air producing section 1a, a pneumatic tire feeding supply passage 13a, and a connection supply passage 21a connecting the communication supply passage 13b and the pneumatic tire feeding supply passage 13a.

The second pneumatic tire compressed air supply passage 2b has, as in the case of the first pneumatic tire compressed air supply passage 2a, a communication supply passage 13b, a pneumatic tire feeding supply passage, and a connection supply passage. The communication supply passage 13b of the second pneumatic tire compressed air supply passage 2b is, however, connected to the connection supply passage 21a of the first pneumatic tire compressed air supply passage 2a via a connection passage 22a. That is, the second pneumatic tire compressed air supply passage 2b is connected to the pneumatic tire feeding supply passage 13a of the first pneumatic tire compressed air supply passage 2a and the pneumatic tire 103 via the connection supply passage 21a. Thus, in this embodiment, the connection supply passage 21a and the pneumatic tire feeding supply passage 13a of the first pneumatic tire compressed air supply passage 2a serve also as the connection supply passage and the pneumatic tire feeding supply passage, respectively, of the second pneumatic tire compressed air supply passage 2b.

The operation of the automatic air-feeding mechanism for a pneumatic tire of a wheelchair according to the second embodiment will be described. The pneumatic tire 103 is rotated about the axle 101 from the state in which the sliding part 34 is in the lowermost position A1 in the compression chamber 31 in the first compressed air producing section 1a and the sliding part 34 is in the uppermost position B1 in the compression chamber 31 in the second compressed air producing section 1b as shown in FIG. 10 and FIG. 11, by, for example, pushing the wheelchair. Then, the hub 102 is rotated, and the roller 37 of the piston member 32 of the first compressed air producing section 1a runs on the cam face 91a of the cam 9 from the small-diameter point A toward the large-diameter point B and the roller 37 of the piston member 32 of the second compressed air producing section 1b runs on the cam face 91a of the cam 9 from the large-diameter point B toward the small-diameter point A.

Figure 14:
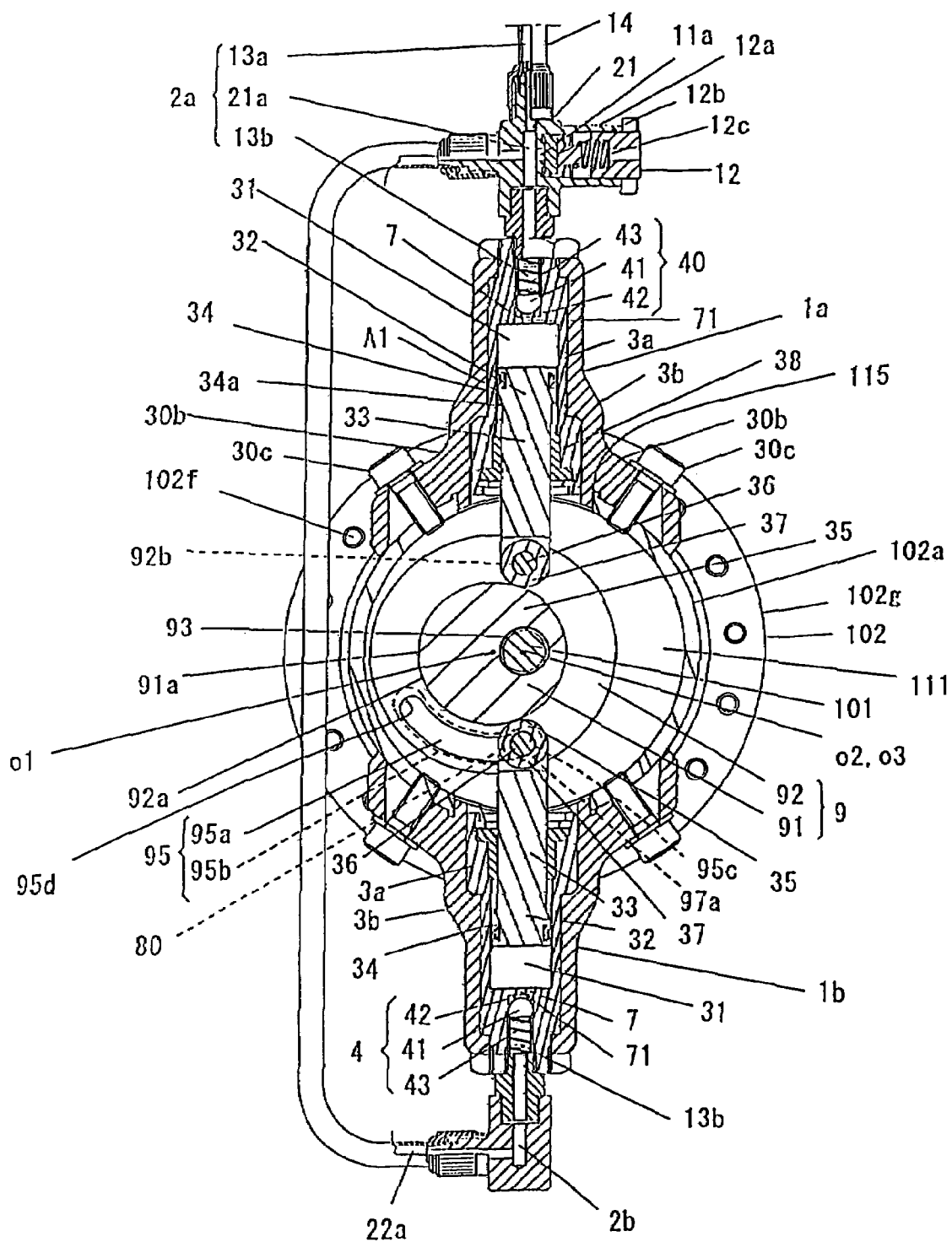
FIG. 14 is a cross-sectional explanatory view showing the state in which a slider of a first compressed air producing section is being slid toward its uppermost position and a slider of a second compressed air producing section is being slid toward its lowermost position from the positions shown in FIG. 11.

At this time, the retention pin 36 of the piston member 32 of the second compressed air producing section 1b is moved together with the slider 80 in the second pin insertion hole 95 toward the first end 95c of sliding groove 95a of the second pin insertion hole 95 until the slider 80 reaches the start position 97a and the cylindrical part 81 abuts against the first end 95c as shown in FIG. 14.

If the retention pin 36 is directly received in the second pin insertion hole 95 so that it can be slid in the second pin insertion hole 95 without the slider 80 and if the piston member 32 is rotatably received in the compression chamber 31 in the second compressed air producing section 1b, when a resistance is applied to the retention pin 36 when it is sliding in the second pin insertion hole 95, the retention pin 36 may not be slid further in the second pin insertion hole 95 and the piston member 32 may be rotated via the retention pin 36 in the compression chamber 31 to incline the axial direction of the retention pin 36 with respect to the axial direction of the axle 101. When the axial direction of the retention pin 36 is inclined with respect to the axial direction of the axle 101, the axis of the roller 37 running on the cam face 91a of the cam 9 may be inclined to the extent that the roller 37 cannot run on the cam face smoothly or the retention pin 36 may get out of the second pin insertion hole 95. Then, the piston member 32 cannot be slid in the compression chamber 31 smoothly.

In this embodiment, however, since the retention pin 36 is moved together with the slider 80 slidable in the second pin insertion hole 95, the retention pin 36 can be smoothly slid in the second pin insertion hole 95. Thus, even if the piston member 32 is rotatably received in the compression chamber 31 in the second compressed air producing section 1b, the retention pin 36 can be smoothly slid in the second pin insertion hole 95 together with the slider 80, and the piston member 32 can be slid in the compression chamber 31 smoothly.

Figure 15:
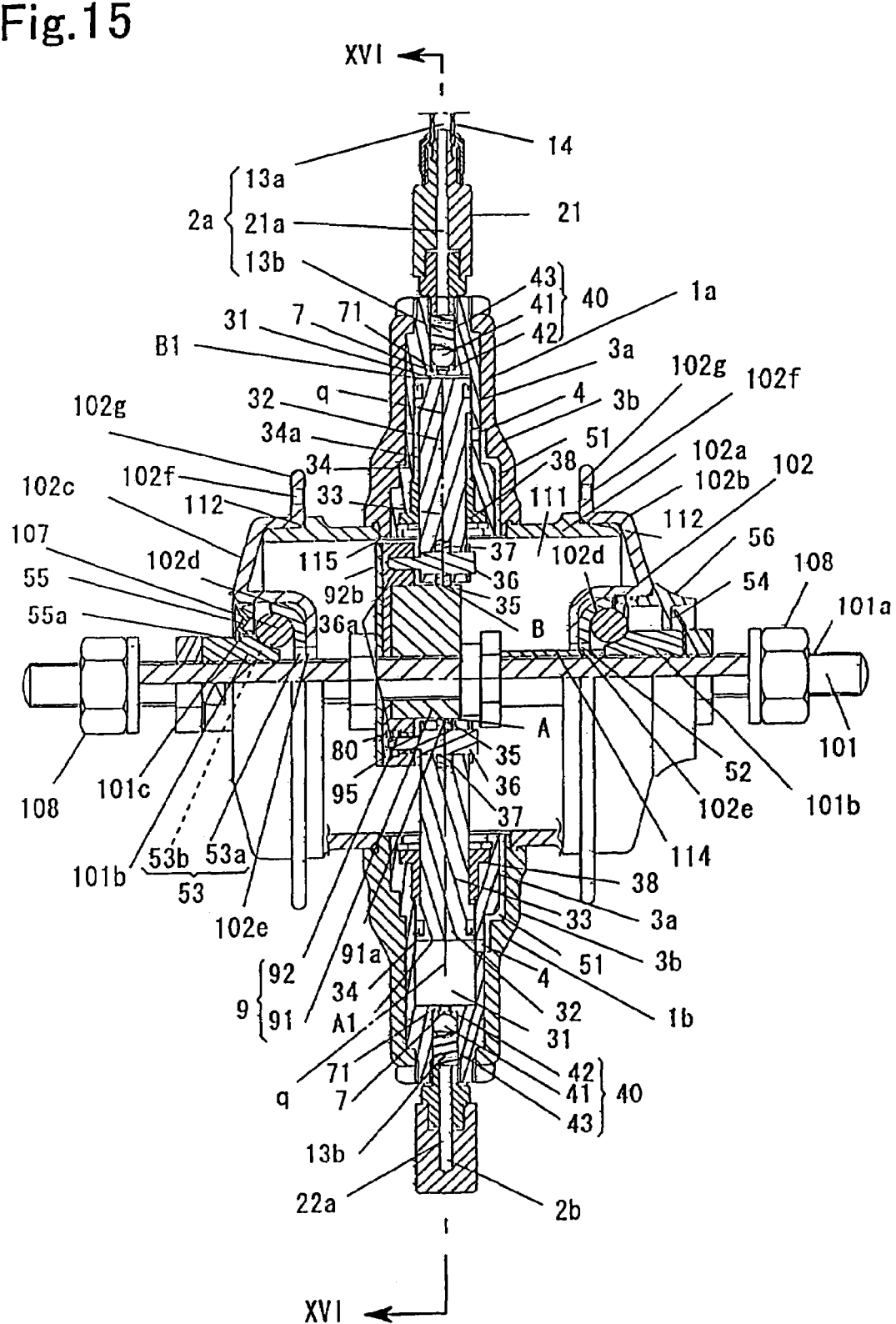
FIG. 15 is a cross-sectional explanatory view showing the state in which the slider of the first compressed air producing section has been slid to its uppermost position and the slider of the second compressed air producing section has been slid to its lowermost position from the positions shown in FIG. 14.

When the roller 37 runs further, the piston member 32 of the first compressed air producing section 1a is pressed by the cam 9 and kept pressed until the roller 37 of the piston member 32 reaches the large-diameter point B of the cam 9. At this time, the sliding part 34 is slid in the compression chamber 31 along the inner wall thereof from the lowermost position A1 to the uppermost position B1 as shown in FIG. 15 and FIG. 16.

While the sliding part 34 is slid from the lowermost position A1 to the uppermost position B1, the air in the compression chamber 31 is compressed up to a certain compression ratio.

The compressed air produced in the first compressed air producing section 1a is, as in the case of the first embodiment, is fed from the communication supply passage 13b to the connection supply passage 21a and introduced from the connection supply passage 21a through the pneumatic tire feeding supply passage 13a into the pneumatic tire 103 as needed.

Figure 16:
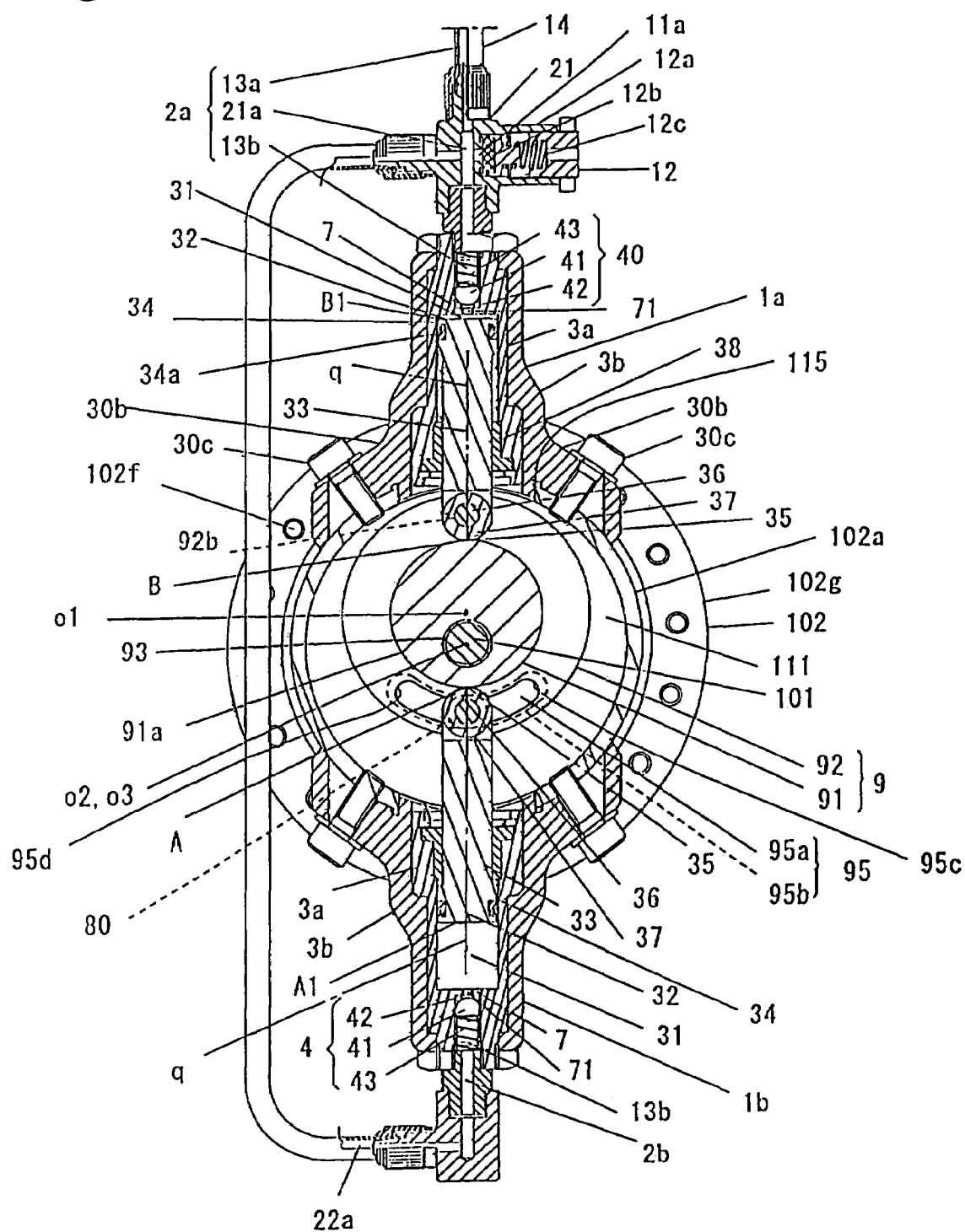
FIG. 16 is a cross-sectional view taken along the line XVI-XVI in FIG. 15.

At the same time, the retention pin 36 of the piston member 32 of the second compressed air producing section 1b is moved together with the slider 80 from the start position 97a shown in FIG. 14 to almost the middle of the sliding groove 95a of the second pin insertion hole 95 as shown in FIG. 16. When the retention pin 36 is moved as described above, the sliding part 34 of the piston rod 33 of the second compressed air producing section 1b is pulled by the cam 9 to slide in the compression chamber 31 along the inner wall thereof from the uppermost position B1 toward the lowermost position A1.

The roller 37 of the piston member 32 of the second compressed air producing section 1b reaches the small-diameter point A of the cam face 91a and the sliding part 34 of the piston rod 33 reaches the lowermost position A1 in the second compressed air producing section 1b when the roller 37 of the piston member 32 of the first compressed air producing section 1a reaches the large-diameter point B of the cam face 91a as shown in FIG. 15 and FIG. 16.

When the sliding part 34 of the piston rod 33 of the second compressed air producing section 1b is moved from the uppermost position B1 to the lowermost position A1, the cam 9 pulls left side of the piston rod 33 of the piston member 32, which is at a distance from the extension q of the axis of the piston rod 33, since the retention pin 36 of the piston member 32 is retained by the piston retaining part 92 of the cam 9. However, when the sliding part 34 is slid from the uppermost position B1 to the lowermost position A1, the sliding part 34 can be slid by a force smaller than that required when the sliding part 34 is slid from the lowermost position A1 to the uppermost position B1 to compress air since compression of air is not conducted and hence the piton rod 33 can be pulled smoothly.

When the sliding part 34 of the piston rod 33 passes the air intake port 4 in the second compressed air producing section 1b, air is introduced from the partitioned space 111 of the hub 102 into the compression chamber 31 through the first air passage 51 and the air intake port 4. Since the second air passage 52 and the third air passage 54 prevent water from entering the partitioned space 111 of the hub 102, only air can enter the partitioned space 111.

Figure 17:
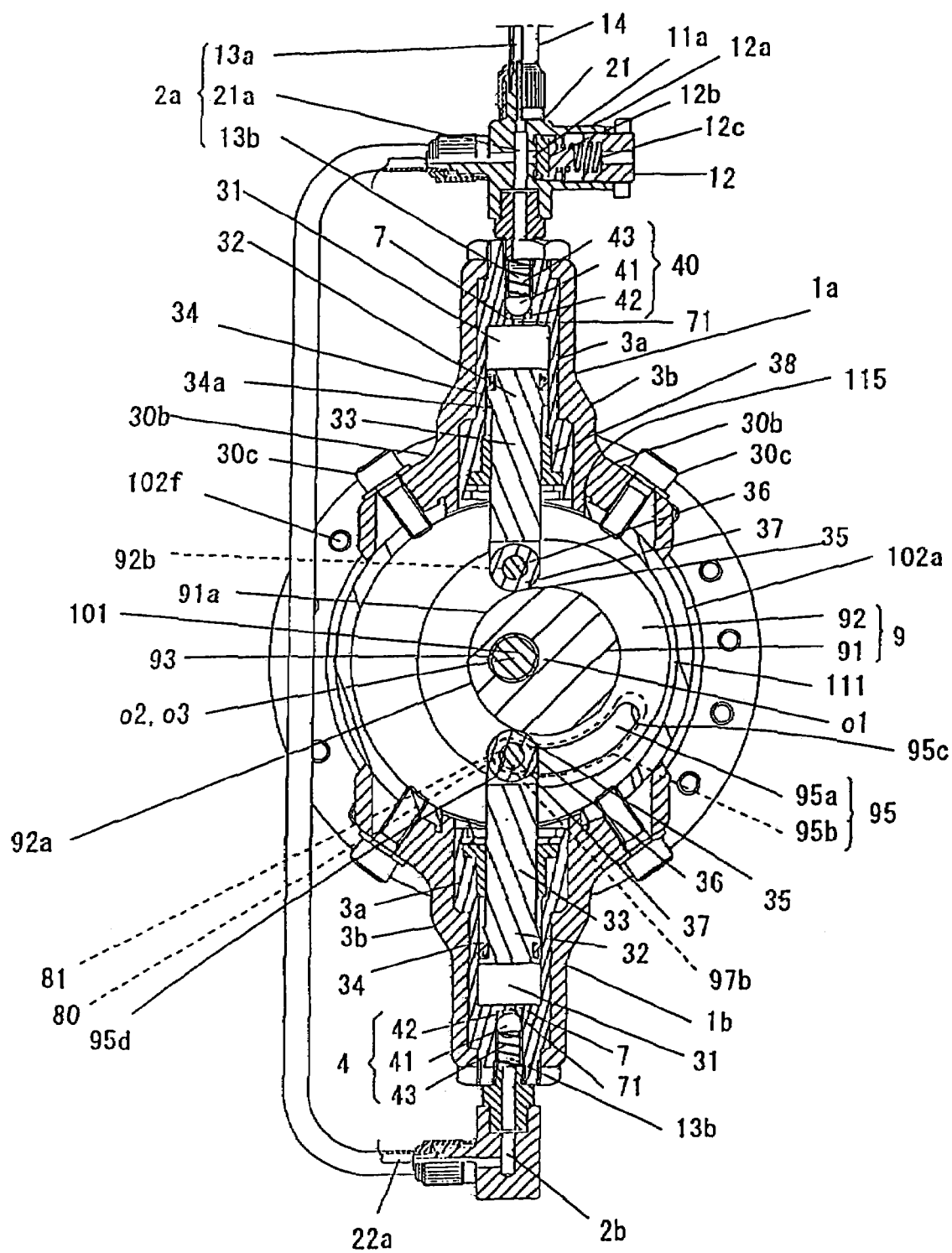
FIG. 17 is a cross-sectional explanatory view showing the state in which the slider of the first compressed air producing section is being slid toward its lowermost position and the slider of the second compressed air producing section is being slid to its uppermost position from the positions shown in FIG. 16.

When the hub 102 is further rotated from the state shown in FIG. 16, the piston member 32 of the first compressed air producing section 1a is pulled by the cam 9 via the retention pin 36 and the roller 37 runs on the cam face 91a from the large-diameter point B toward the small-diameter point A as shown in FIG. 17. The sliding part 34 is thereby moved from the uppermost position B1 toward the lowermost position A1 in the first compressed air producing section 1a (see FIG. 11).

The retention pin 36 of the piston member 32 of the second compressed air producing section 1b is moved together with the slider 80 in the second pin insertion hole 95 toward the second end 95d of the sliding groove 95a until the slider reaches the end position 97b and the cylindrical part 81 abuts against the second end 95d. At this time, the roller 37 of the piston member 32 runs on the cam face 91a from the small-diameter point A to the large-diameter point B and the roller 37 of the piston member 32 is pressed by the cam face 91. Then, the sliding part 34 is moved in the compression chamber 31 from the lowermost position A1 to the uppermost position B1 (see FIG. 11). By the movement of the sliding part 34, the air in the compression chamber 31 is compressed up to a certain compression ratio.

The compressed air produced in the second compressed air producing section 1b is fed into the connection supply passage 21a of the first pneumatic tire compressed air supply passage 2a through the pneumatic tire feeding supply passage 13b of the second pneumatic tire compressed air supply passage 2b and the connection passage 22a. The compressed air fed into the connection supply passage 21a of the first compressed air passage 1b is introduced into the pneumatic tire 103 through the pneumatic tire feeding supply passage 13a as in the case of the compressed air from the first compressed air producing section 1a.

After that, when the hub 102 is rotated, the first compressed air producing section 1a and the second compressed air producing section 1b alternately produce compressed air and supply the compressed air into the pneumatic tire 103 as needed.

As described above, whenever the wheel body is rotated, the first and second compressed air producing section 1a and 1b can alternately produce compressed air and supply the compressed air into the pneumatic tire 103. Thus, compressed air can be produced with almost the same force as that required to produce compressed air with one compressed air producing section 1 as in the first embodiment, and compressed air can be produced in an amount twice the amount of compressed air which can be produced by one compressed air producing section 1 as in the first embodiment. Therefore, when the wheelchair is driven normally, a sufficient amount of air to increase the air pressure in the pneumatic tire 103 to a required level can be compressed within a short period of time after the start of running even if the number of rotations of the wheel is still low. In addition, the resistance to the travel of the wheelchair is not increased. Thus, this embodiment is suitable for a wheelchair.

Although the first and second pneumatic tire compressed air supply passages 2a and 2b are connected via the connection passage 22a in the second embodiment, the first and second pneumatic tire compressed air supply passages 2a and 2b may be separately formed and connected to the pneumatic tire 103 so that compressed air can be supplied to the pneumatic tire 103 separately through the first and second pneumatic tire compressed air supply passages 2a and 2b.

Description will be next made of an automatic air-feeding mechanism according to a third embodiment with reference to FIG. 18 to FIG. 22. The automatic air-feeding mechanism according to the third embodiment is provided on a bicycle for supplying air to a pneumatic tire on a wheel and for supplying air to a saddle as a part of the bicycle other than the pneumatic tire to provide the seat with good cushion.

The automatic air-feeding mechanism according to the third embodiment has two compressed air producing sections, that is, first and second compressed air producing section 10a and 10b as in the case of the automatic air-feeding mechanism according to the second embodiment, and compressed air supply passages 20a and 300.

Figure 18:
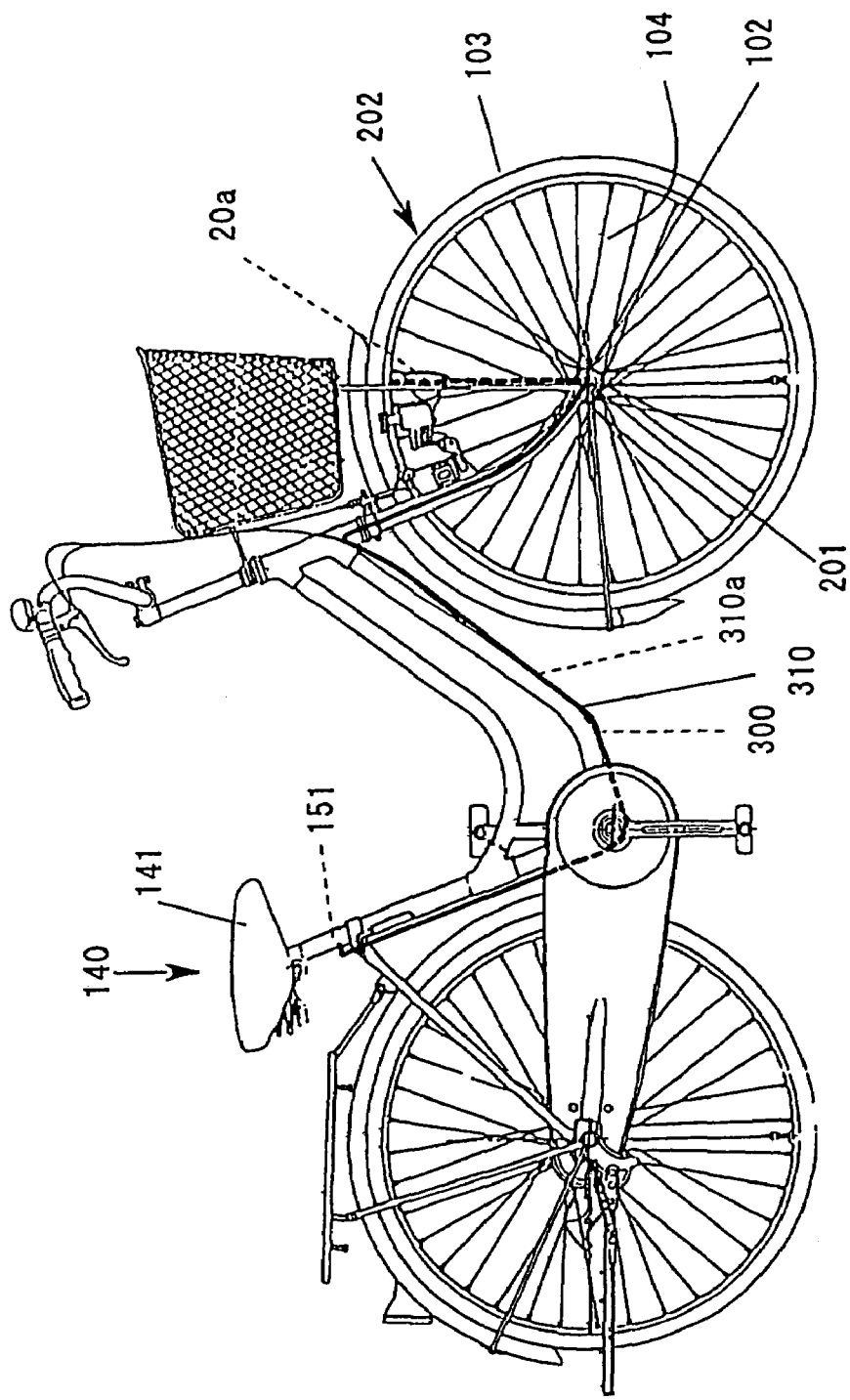
FIG. 18 is a side view of a bicycle provided with an automatic air-feeding mechanism according to a third embodiment of the present invention.

The first and second compressed air producing sections 10a and 10b, which are the same in construction as the compressed air producing section of the first embodiment, are attached to a front wheel 202 of a bicycle. The front wheel 202 of the bicycle has, as in the case of the wheel of a bicycle in the first embodiment, an axle 201 and a wheel body having a hub 102 rotatably supported by the axle 201 and a pneumatic tire 103 as shown in FIG. 18.

Figure 19:
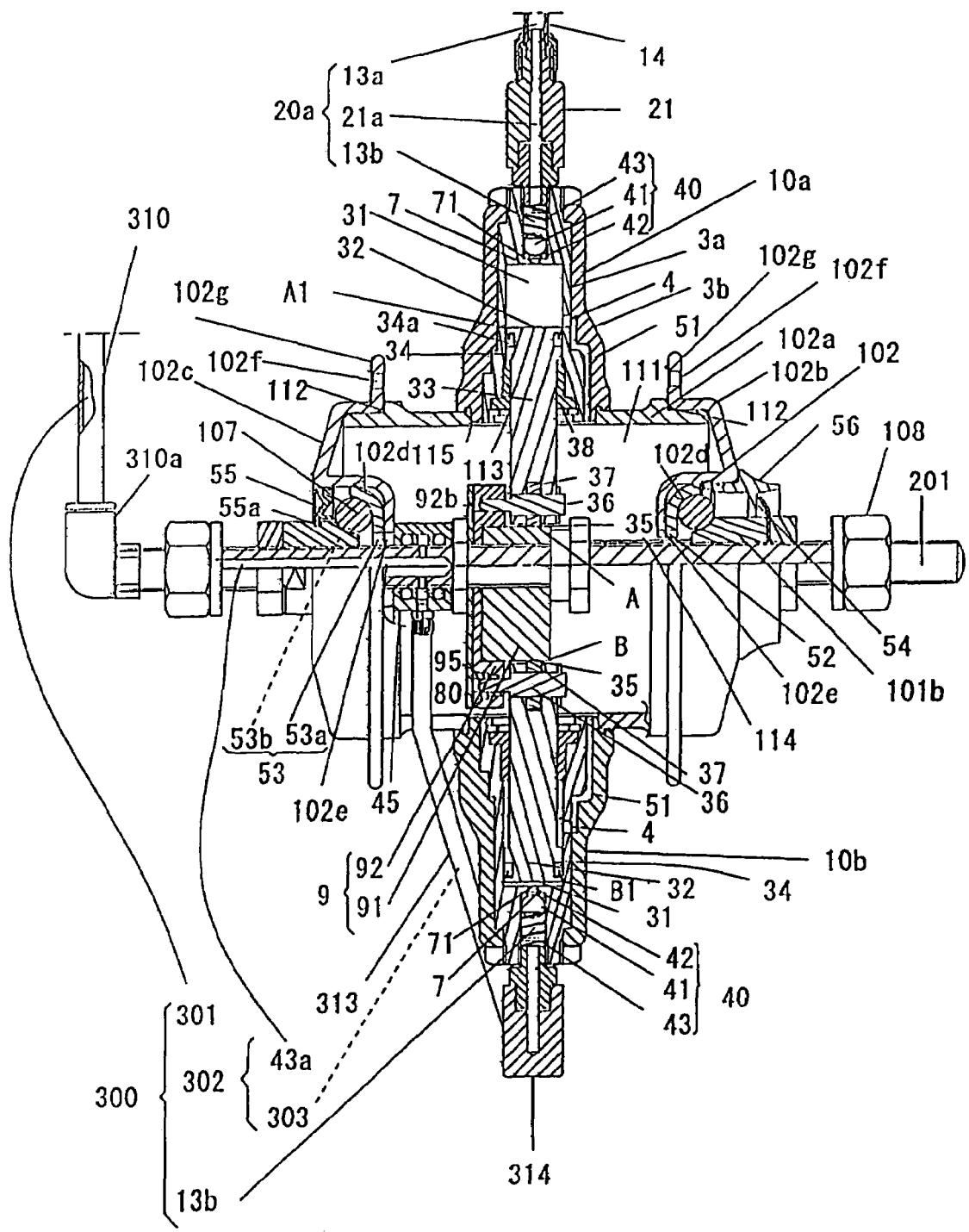
FIG. 19 is an enlarged cross-sectional explanatory view of an essential part of the automatic air-feeding mechanism according to the third embodiment.
Figure 21:
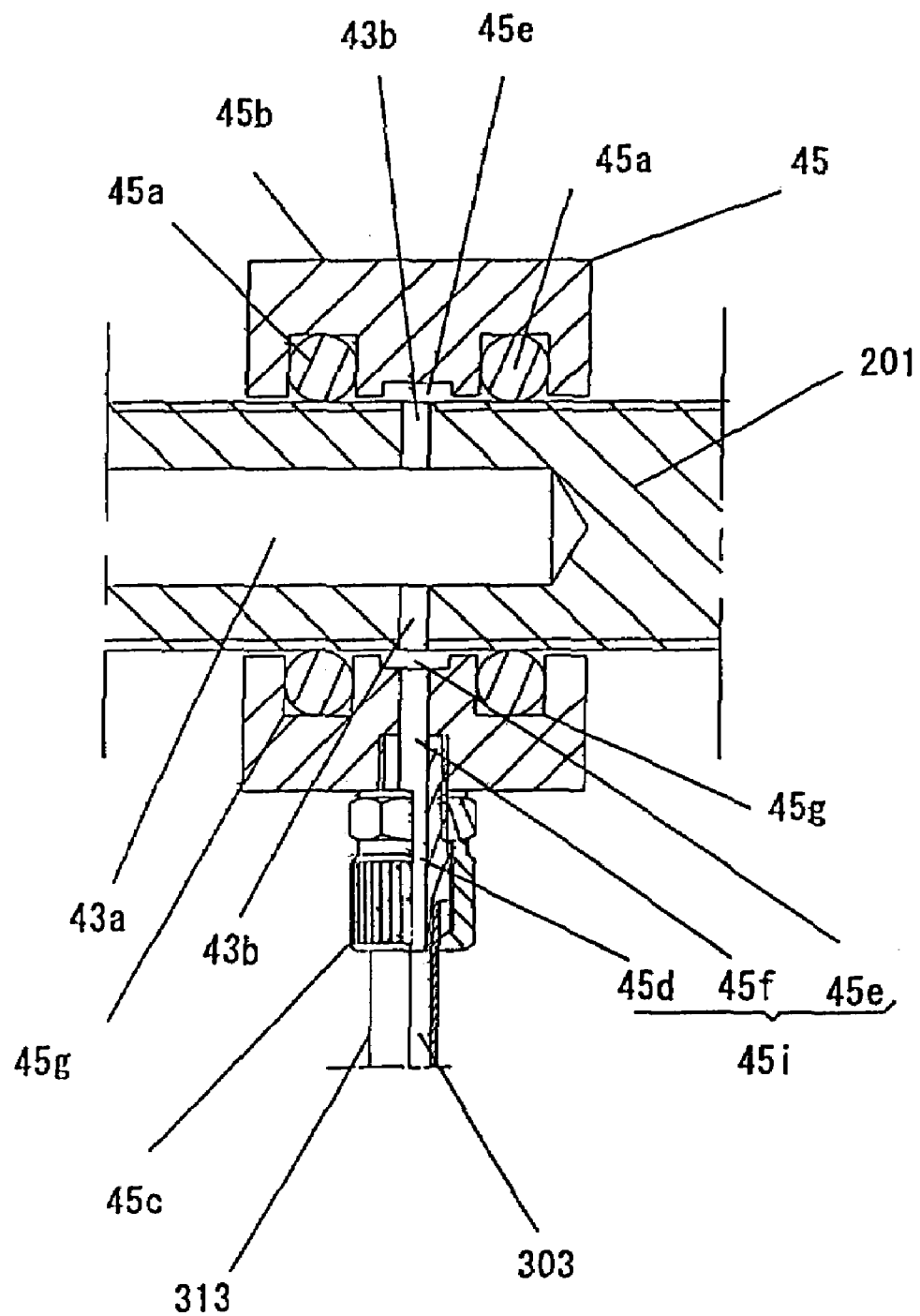
FIG. 21 is a horizontal cross-sectional explanatory view of the rotary connection member.

In the third embodiment, the axle 201 has an axial hole 43a as shown in FIG. 19. The axial hole 43a extends in the axle 201 along the axis thereof from the left end to a point slightly on the left of the center thereof. That is, the axial hole 43a extends from the outside of the hub 102 attached to the axle 201 to the inside thereof. The bottom of the axial hole 43a extended into the hub 202 is communicated with the outside of the axle 201 via through holes 43b and 43b extending from the axial hole 43a to the outer periphery of the axle 201 as shown in FIG. 21.

The hub 102 of the wheel body and the pneumatic tire 103 are generally the same in construction as the hub 102 and the pneumatic tire 103 of the first embodiment.

The automatic air-feeding mechanism has a pneumatic tire compressed air supply passage 20a for introducing compressed air produced in the first compressed air producing section 10a to the pneumatic tire 103 and an another part compressed air supply passage 300 for introducing compressed air produced in the second compressed air producing section 10b to a saddle 140 of the bicycle. The pneumatic tire compressed air supply passage 20a is the same in construction as the pneumatic tire compressed air supply passage 2 of the first embodiment.

The another part compressed air supply passage 300 has a communication supply passage 13b (shown in FIG. 19) communicated with the compression chamber 31 of the second compressed air producing section 10b, a saddle feeding supply passage 301 connected to an air holding part 151 (shown in FIG. 22) of the saddle 140 of the bicycle, and a connection supply passage 302 connecting the communication supply passage 13b and the saddle feeding supply passage 301.

The connection supply passage 302 has the axial hole 43a in the axle 201 and a connection passage 303 connecting the axial hole 43a and the communication supply passage 13b as shown in FIG. 19. The connection passage 303 is defined in a connection pipe 313. The connection pipe 313 is connected to the axial hole 43a in the axle 201 via a rotary connection member 45.

Figure 20:
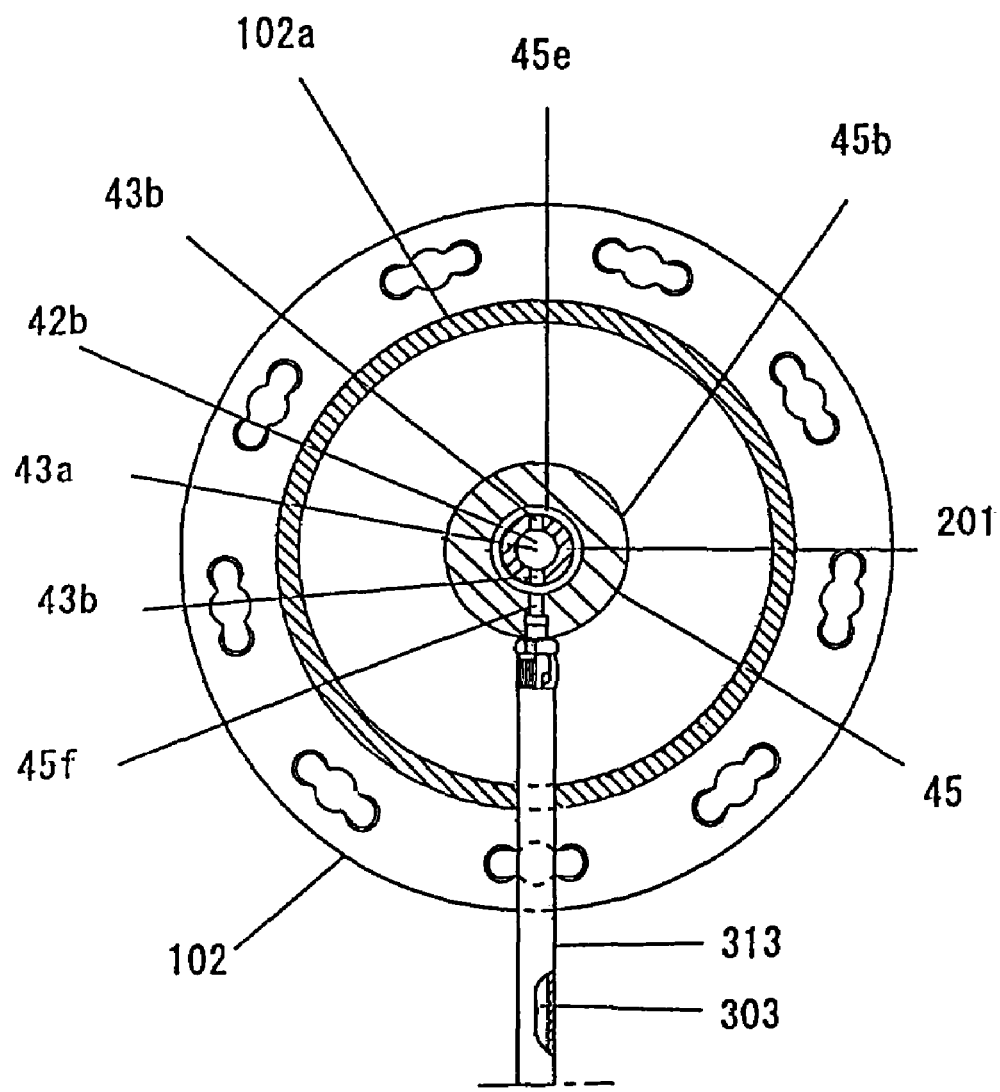
FIG. 20 is a vertical cross-sectional explanatory view of a rotary connection member.

The rotary connection member 45 has two rings 45a and 45a made of a synthetic rubber and a ring-shaped rotor 45b as shown in FIG. 20 and FIG. 21.

The two rings 45a and 45a are fixed to the outer periphery of the axle 201 on both sides of the through holes 43b and 43b.

The rotor 45b has a pipe coupler 45c to which the connection pipe 313 can be removably connected on its outer periphery. The pipe coupler 45c has a cylindrical shape and defines a pipe connection hole 45d therethrough.

An air reserving part 45e is circumferentially formed in the inner surface of the rotor 45b as shown in FIG. 20. The air reserving part 45e is communicated with the pipe connection hole 45d of the pipe coupler 45c via a bore 45f extending from the pipe connection hole 45d to the air reserving part 45e. The air reserving part 45e, the pipe connection hole 45d and the bore 45f constitutes a connection hole 45i for connecting the connection passage 303 of the connection pipe 313 in air flow communication with the axial hole 43a.

The rotor 45b has ring receiving parts 45g and 45g for rotatably receiving the rings 45a and 45a on both right and left sides of the air reserving part 45e. The rings 45a and 45a are rotatably received in the ring receiving parts 45g and 45g, and the rotor 45b is thereby rotatable about the axle 201 with the air reserving part 45e communicated with the axial hole 43a in the axle 201.

The connection pipe 313 is connected to the pipe coupler 45c of the rotor 45b constituted as described above, whereby the connection pipe 313 and the axle 201 are rotatably connected via the rotor 45b. By the connection, the connection passage 303 formed in the connection pipe 313 and the axial hole 43a formed in the axle 201 of the wheel 202 is communicated with each other.

The connection pipe 313 is attached to the inner casing 3a via a coupler 314 as shown in FIG. 19, whereby the connection passage 303 formed in the connection pipe 313 is connected in air flow communication with the communication supply passage 13b defined in the inner casing 3a by the partition 7.

The coupler 314 has a pressure adjusting section for controlling the air pressure in the another part compressed air supply passage 300, although not shown. The pressure adjusting section is the same in construction as the pressure adjusting section 12 of the first embodiment.

The saddle feeding supply passage 301 of the another part compressed air supply passage 300 is formed in a pipe member 310. The proximal end of the pipe member 310 defining the saddle feeding supply passage 301 therein is connected to the axle 201 of the wheel 202 via a coupler 310a. The saddle feeding supply passage 301 is thereby connected in air flow communication with the axial hole 43a in the axle 201.

The distal end of the pipe member 310 is connected to the saddle 140 of the bicycle.

Figure 22:
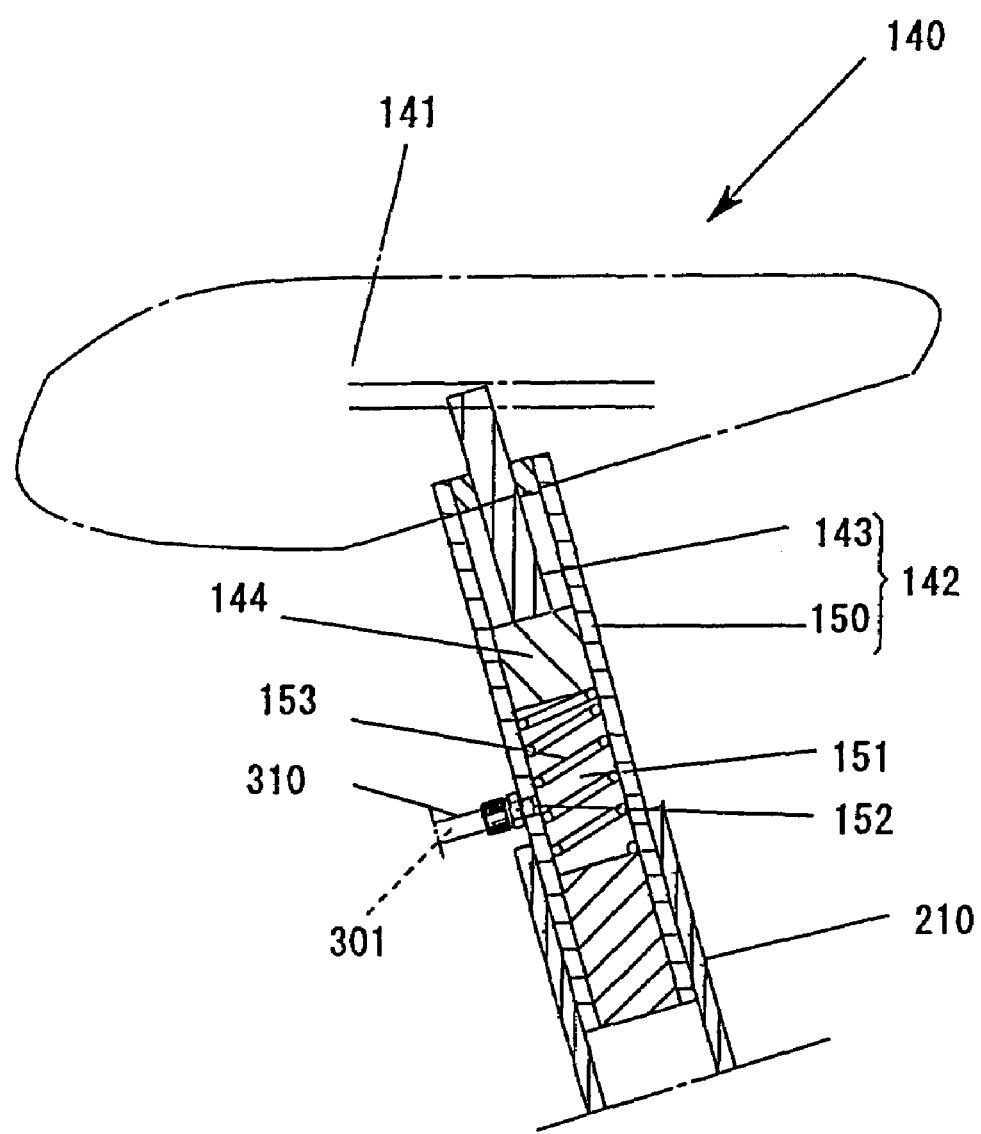
FIG. 22 is an enlarged cross-sectional view of a part of a saddle of a bicycle provided with the air-feeding mechanism according to the third embodiment.

In this embodiment, the saddle 140, to which the pipe member 310 is connected, has a seat 141 for the rider to sit on and a seat supporting part 142 for supporting the seat 141 as shown in FIG. 22. The seat supporting part 142 has a seat supporting piece 143 for supporting the seat 141 and a seat mounting part 150 to which the seat supporting piece 143 is attached for vertical movement.

The seat mounting part 150 has an air holding part 151 for holding air therein. The air holding part 151 has an air inlet 152 through which air is fed in and ejected. The pipe member 310 is connected to the air inlet 152. The saddle feeding supply passage 301 is thereby connected in air flow communication with the air holding part 151.

A lower part of the seat mounting part 150 is inserted into and secured to a vertical pipe 210 of the bicycle. The seat mounting part 150 is not necessarily formed separately from the vertical pipe 210 and may be formed as a part of the vertical pipe 210.

An upper part of the seat supporting piece 143 is secured to the seat 141. The seat supporting piece 143 has an air pressing part 144 for pressing the air in the air holding part 151 downward at its lower end. The air pressing part 144 is disposed in the air holding part 151 of the seat mounting part 150 and vertically slidable along the inner wall of the air holding part 151.

In this embodiment, a coil spring 153 as a pressing part urging member for urging the air pressing part 144 upward is disposed in the air holding part 151 as shown in FIG. 22 so that it can assist the air pressing part 144 having been slid down in the air holding part 151 to be returned upward by the pressure of compressed air.

When a person sits on the seat 141 constituted as described above and a downward force is applied to the air pressing part 144, the air pressing part 144 is moved downward together with the seat 141 and compresses the air in the air holding part 151.

When the force applied to the air pressing part 144 is reduced, the seat 141 is returned upward by the pressure of compressed air in the air holding part 151. The seat 141 can thereby have good cushion and can absorb shocks on the seat 141 to ensure a comfortable ride.

The operation of the automatic air-feeding mechanism for a bicycle according to the third embodiment will be described.

The wheel body is rotated about the axle 201 from the state in which the sliding part 34 is in the lowermost position A1 in the compression chamber 31 in the first compressed air producing section 10a and the sliding part 34 is in the uppermost position B1 in the compression chamber 31 in the second compressed air producing section 10b as shown in FIG. 19 by, for example, riding the bicycle. Then, the hub 102 is rotated, and the roller 37 of the piston member 32 of the first compressed air producing section 10a runs on the cam face 91a of the cam 9 and the roller 37 of the piston member 32 of the second compressed air producing section 1b runs on the cam face 91 of the cam 9.

At this time, the sliding part 34 of the piston rod 33 is slid in the compression chamber 31 from the lowermost position A1 to the uppermost position B1 in the first compressed air producing section 10a, as in the first compressed air producing section la of the first embodiment, and the air in the compression chamber 31 is compressed up to a certain compression ratio. The compressed air is fed into air tube 103b of the pneumatic tire 103 through the pneumatic tire compressed air supply passage 20a as needed. When the roller 37 runs further, the sliding part 34 of the piston rod 33 is slid in the compression chamber 31 from the uppermost position B1 toward the lowermost position A1. Then, when the sliding part 34 passes the air intake port 4, air is introduced into the compression chamber 31. At this time, air is introduced from the partitioned space 111 of the hub 102 into the compression chamber 31 through the first air passage 51 and the air intake port 4. Also, air is introduced into the partitioned space 111 from the outside of the hub 102 through the second and third air passages 52 and 54. Thus, also in the third embodiment, rainwater or the like can be prevented from entering the compression chamber 31.

In the second compressed air producing section 10b, the sliding part 34 of the piston rod 33 is slid in the compression chamber 31 from the uppermost position B1 to the lowermost position Al when the sliding part 34 of the piston rod 33 of the first compressed air producing section 10a is slid from the lowermost position A1 to the uppermost position B1. When the sliding part 34 passes the air intake port 4, air is introduced into the compression chamber 31. Also at this time, rainwater or the like can be prevented from entering the compression chamber 31.

When the sliding part 34 of the piston rod 33 is slid in the compression chamber 31 from the uppermost position B1 to the lowermost position A1 in the first compressed air producing section 10a, the sliding part 34 of the piston rod 33 is slid in the compression chamber 31 from the lowermost position A1 to the uppermost position B1 to compress the air in the compression chamber 31 up to a certain compression ratio in the second compressed air producing section 10b.

The air compressed in the second compressed air producing section 10b is fed from the compression chamber 31 to the communication supply passage 13b and then fed from the communication supply passage 13b to the saddle feeding supply passage 301 through the connection passage 303 and the axial hole 43a in the axle 201. The compressed air is then fed from the saddle feeding supply passage 301 to the air holding part 151 of the saddle 140. Since the connection passage 303 and the axial hole 43a are rotatably connected via the connection hole 45i of the rotary connection member 45, the connection passage 303 and the axial hole 43a are kept communicated with each other even when the bicycle runs and the wheel body is rotated. Thus, when the bicycle is ridden, compressed air is produced in the second compressed air producing section 10b and the produced compressed air can be fed from the wheel 202 to the saddle 140 of the bicycle.

The interior of the air holding part 151 can be thereby maintained at the same air pressure as in the another part compressed air supply passage 300, and, when the air pressure in the air holding part 151 becomes lower than a predetermined level, compressed air can be sequentially produced in the second compressed air producing section 10b and introduced into the air holding part 151 as long as the bicycle is running.

Although the air pressing part 144 presses the air holding part 151 to compress the air in the air holding part 151 in the third embodiment, the present invention is not limited thereto and may be modified as needed. For example, the air holding part 151 may be provided as a part of the seat 141 so that, when the rider sits on the seat 141, the air holding part 151 can receive the load and provide the seat 141 with good cushion.

When the seat pressing part 144 is provided, the air holding part 151 and the air pressing part 144 are not necessarily provided in the seat mounting part 150 and in the saddle 140, respectively, as in the above embodiment and modifications may be made as needed. For example, the air holding part 151 and the air pressing part 144 may be provided in the seat supporting piece 143 and the seat mounting part 150, respectively.

A check valve may be provide in the air holding part 151 to prevent air from flowing in reverse from the air holding part 151 to the saddle feeding supply passage 301.

Although the automatic air-feeding mechanism is provided on the front wheel 202 in the third embodiment, modifications may be made as needed. For example, the automatic air-feeding mechanism may be may be provided on the rear wheel.

Figure 23:
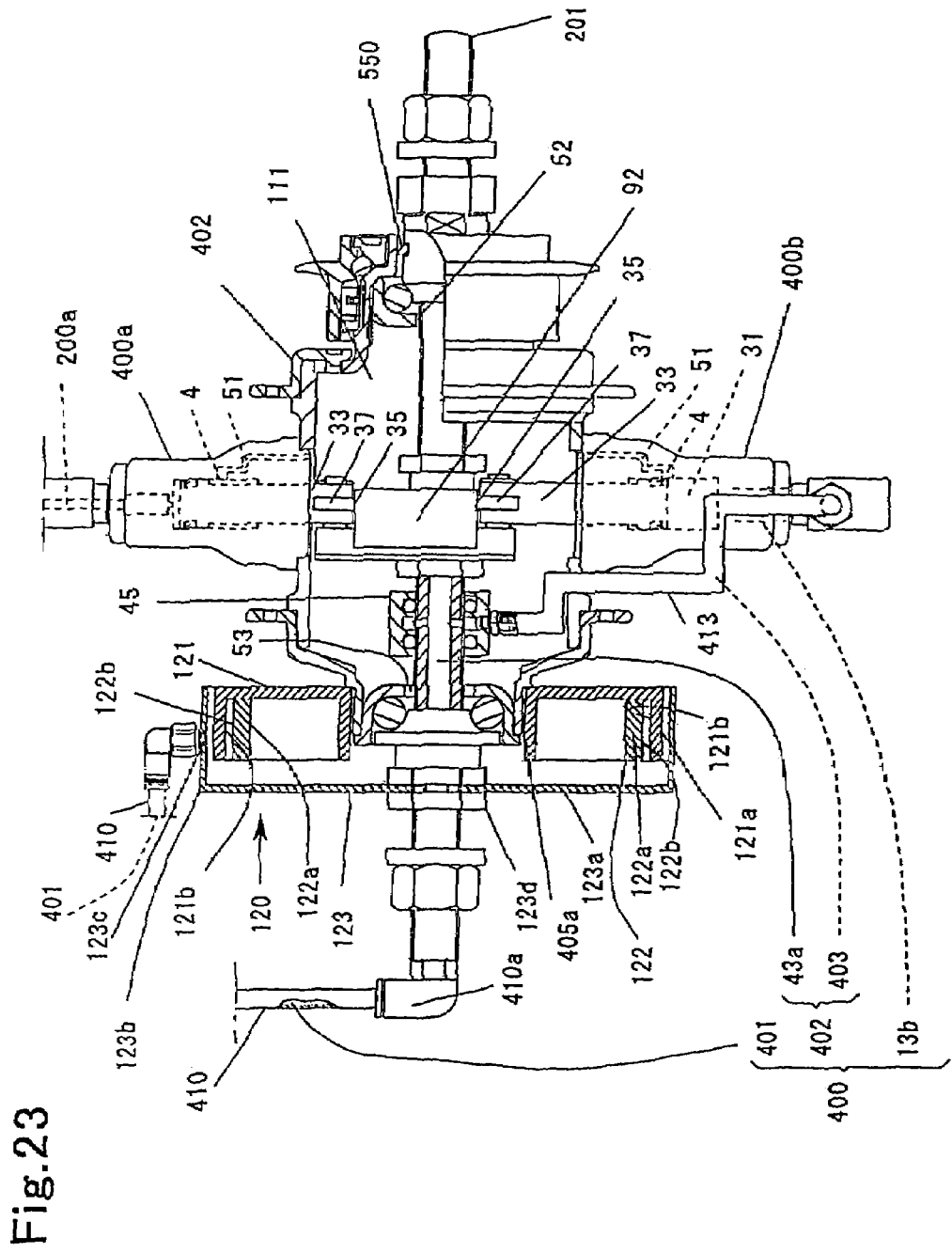
FIG. 23 is an explanatory view of an automatic air-feeding mechanism according to a fourth embodiment of the present invention.
Figure 24:
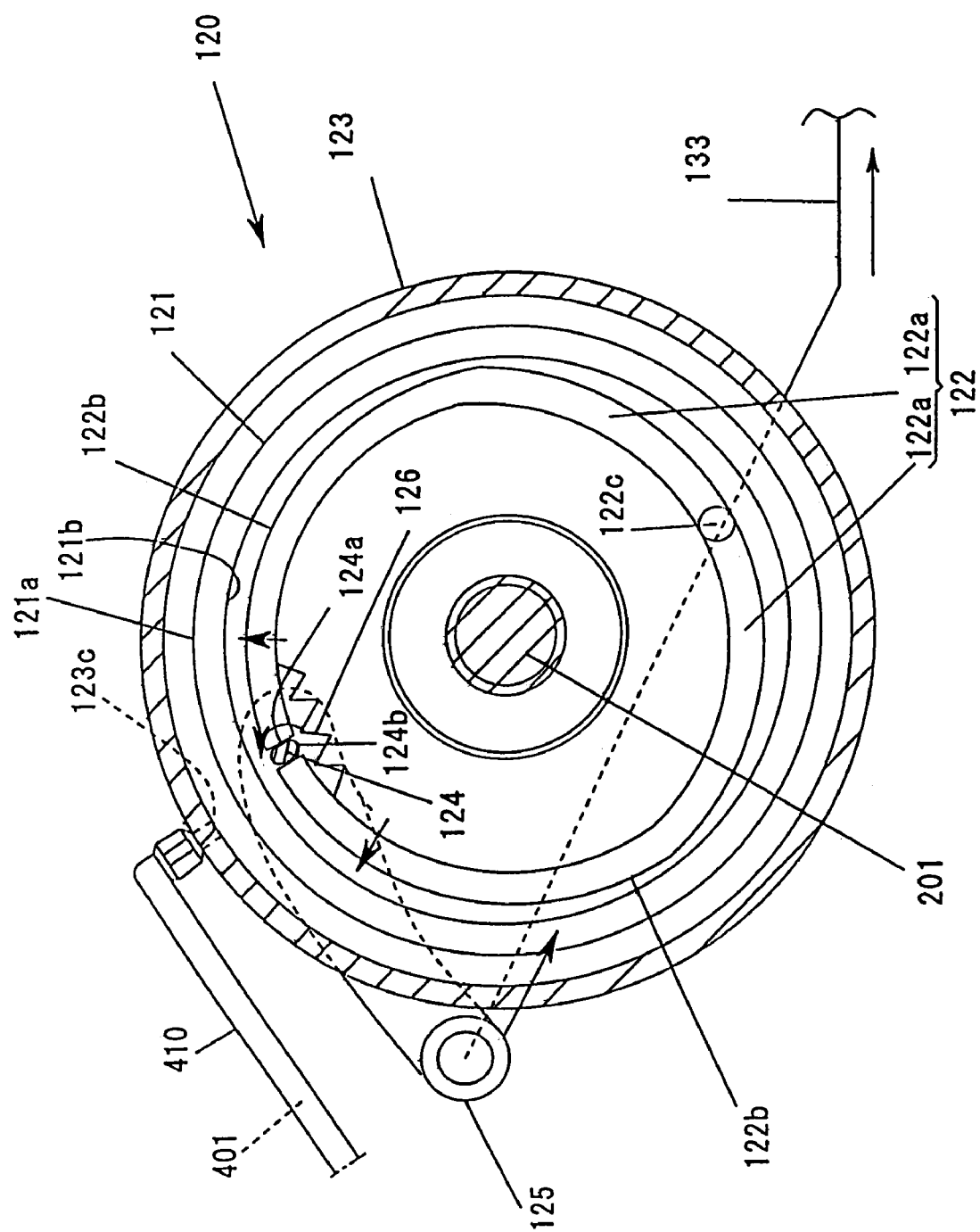
FIG. 24 is an enlarged cross-sectional explanatory view of a brake device of a bicycle provided with an automatic air-feeding mechanism according to the fourth embodiment of the present invention.
Figure 25:
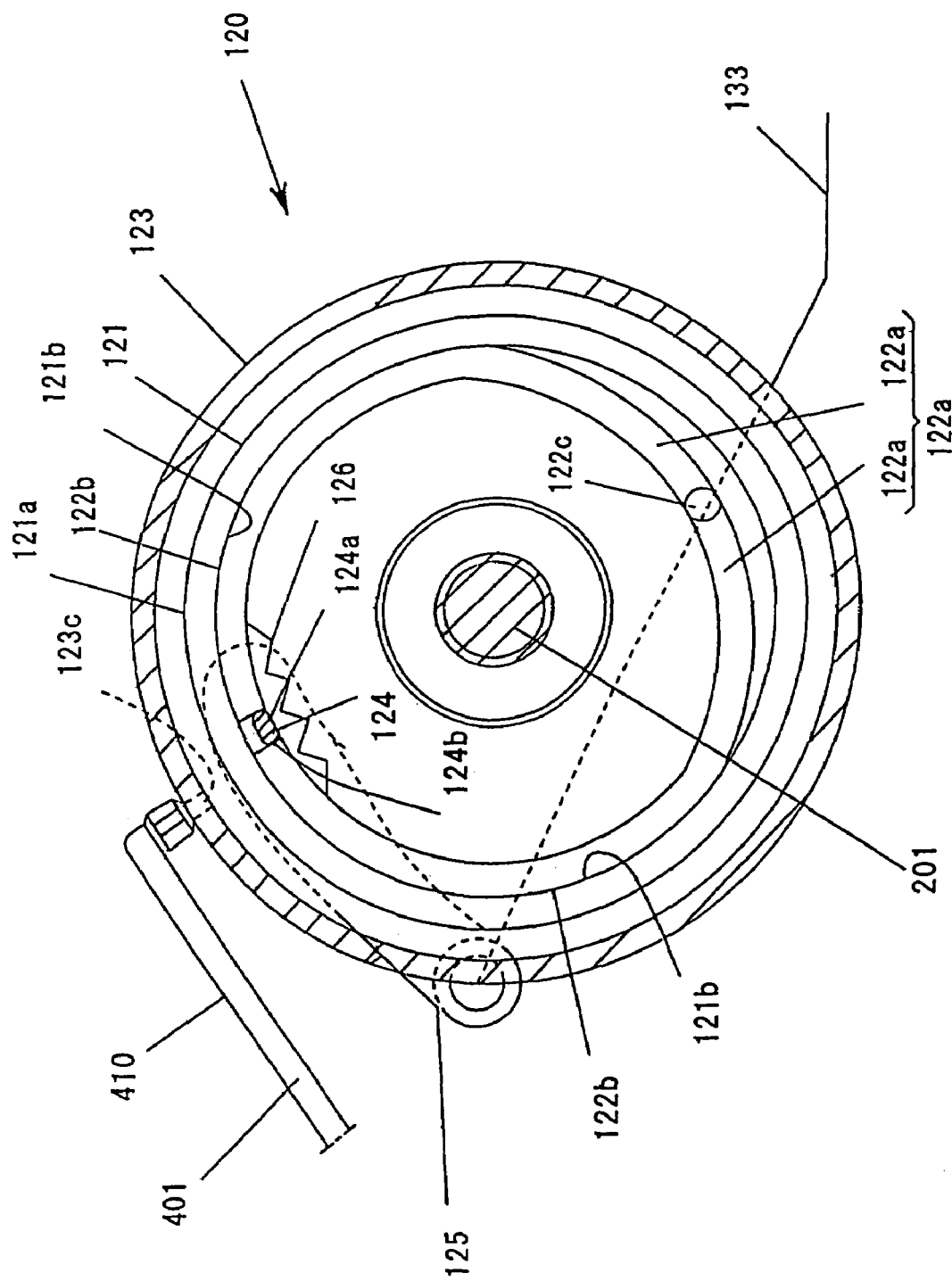
FIG. 25 is an enlarged cross-sectional explanatory view showing the state in which a brake wire has been operated to bring a brake shoe into contact with a drum from the state shown in FIG. 24.

Description will be next made of an automatic air-feeding mechanism according to a fourth embodiment with reference to FIG. 23 to FIG. 25. The automatic air-feeding mechanism according to the fourth embodiment is provided on a bicycle as a vehicle for supplying air to a pneumatic tire on a wheel and for supplying air to a brake device as a part of the bicycle other than the pneumatic tire to prevent overheating of the brake device.

The automatic air-feeding mechanism according to the fourth embodiment has, as in the case of the automatic air-feeding mechanism according to the third embodiment, two compressed air producing sections, that is, first and second compressed air producing sections 400a and 400b, and compressed air supply passages 200a and 400.

The first and second compressed air producing sections 400a and 400b are attached to the rear wheel of the bicycle as a vehicle. The axle 201 of the rear wheel and the pneumatic tire (not shown) on the wheel body are generally the same in construction as the axle 201 and the pneumatic tire 103 of the third embodiment.

Each of the first and second compressed air producing sections 400a and 400b has a first air passage 51 communicating an air intake port 4 with a partitioned space 111 of a hub 402 of the rear wheel, and a second air passage extending from the first air passage 51. In the fourth embodiment, however, the right side of the right axle-gap air passage 52 of the hub 402 of the rear wheel is generally sealed from the outside by a ring-shaped seal member 550, and the left axle-gap air passage 53 of the hub 402 of the rear wheel constitutes the second air passage so that outside air can be introduced into the partitioned space 111 through the left axle-gap air passage 53.

Except that, the first and second compressed air producing sections 400*a* and 400*b* are the same in construction as the first compressed air producing sections 10*a* of the third embodiment.

In the fourth embodiment, the automatic air-feeding mechanism has a pneumatic tire compressed air supply passage 200*a* for introducing compressed air produced in the first compressed air producing section 400*a* to the pneumatic tire 103 and an another part compressed air supply passage 400 for introducing compressed air produced in the second compressed air producing section 400*b* to a brake device of the bicycle. The pneumatic tire compressed air supply passage 200*a* is the same in construction as the pneumatic tire compressed air supply passage 2 of the first embodiment.

In the fourth embodiment, the another part compressed air supply passage 400 has a communication supply passage 13*b* communicated with the compression chamber 31 of the second compressed air producing section 400*b*, a brake feeding supply passage 401 connected to a hereinafter described brake device 120 of the bicycle, and a connection supply passage 402 connecting the communication supply passage 13*b* and the brake feeding supply passage 401. The communication supply passage 13*b* is the same in construction as the communication supply passage 13*b* of the third embodiment.

The connection supply passage 402 of the another part compressed air supply passage 400 is the same in construction as the connection supply passage 302 of the third embodiment. More specifically, the connection supply passage 402 of the another part compressed air supply passage 400 has an axial hole 43*a* formed in the axle 201 and a connection passage 403 connecting the axial hole 43*a* and the communication supply passage 13*b*. The connection passage 403 is defined in a connection pipe 413. The connection pipe 413 is rotatably connected to the axle 201 via a rotary connection member 45, whereby the connection passage 403 of the connection pipe 413 is rotatably connected in air flow communication with the axial hole 43*a* in the axle 201.

The brake feeding supply passage 401 is defined in a pipe member 410. The proximal end of the pipe member 410 is connected to the axle 201 of the rear wheel via a coupler 410*a*. The brake feeding supply passage 401 is thereby connected in air communication with the axial hole 43*a* in the axle 201.

The distal end of the pipe member 410 is connected to the brake device 120 for the rear wheel of the bicycle.

The brake device 120 for the rear wheel will be described briefly. The brake device 120 is an internal expanding brake 120 in this embodiment. The internal expanding brake 120 has a drum 121 as a member to be braked, a brake shoe 122 as a braking member, and a cover 123 for covering the drum 121 and the brake shoe 122 as shown in FIG. 23.

The drum 121 has a cylindrical part 121*a*, and a lining contact part 121*b* inside the cylindrical part 121*a*. The drum 121 is attached to a drum attaching screw 405*a* of the hub 402 of the rear wheel and thereby secured to the hub 402 of the rear wheel. The lining contact part 121*b* is thereby rotatable together with the hub 402 of the rear wheel.

The cover 123 has a disk part 123*a* and a cylindrical part 123*b* extending from the peripheral edge of the disk part 123*a*. A pipe connection port 123*c* is formed through the cylindrical part 123*b*, and the brake feeding supply passage 401 is connected to the pipe connection port 123*c*. The axle 201 extends through the cover 123, and the cover 123 is fixed to the axle 201 by a cover fixing nut 123*d*. The drum 121 is thereby covered with the cylindrical part 123*b* of the cover 123 from the outer peripheral side thereof.

The brake shoe 122 has a pair of shoe pieces 122*a* and 122*a* with an arcuate shape as shown in FIG. 24. The shoe pieces 122*a* and 122*a* have linings 122*b* and 122*b* made of a synthetic rubber on their outer side. The shoe pieces 122*a* and 122*a* are located inside the drum 121 and rotatably supported on the cover 123 by a fixing bolt 122*c* extending through the proximal ends of the shoe pieces 122*a* and 122*a*. The distal ends of the shoe pieces 122*a* and 122*a* are thereby rotatable about their proximal ends. A shoe operating cam 124 for rotating the shoe pieces 122*a* and 122*a* is located between the distal ends of the shoe pieces 122*a* and 122*a*.

The shoe operating cam 124 has a small-diameter part 124*a* and a large-diameter part 124*b* with a diameter larger than that of the small-diameter part 124*a*. The shoe operating cam 124 is connected to an arm member 125 for moving the shoe operating cam 124, and attached to the cover 123 for rotation together with the arm member 125.

The arm member 125 is connected to a brake lever (not shown) via a brake wire 133. When the brake lever is operated, the arm member 125 is moved to rotate the shoe operating cam 124 as shown in FIG. 25.

When the shoe operating cam 124 is rotated, the large-diameter part 124*b* of the shoe operating cam 124 presses the distal ends of the shoe pieces 122*a* and 122*a*. Then, the linings 122*b* and 122*b* of the shoe pieces 122*a* and 122*a* are pressed against the lining contact part 121*b* of the drum 121 to stop the rotation of the drum 121.

When the brake lever is released, the shoe pieces 122*a* and 122*a* are returned to the original positions by the urging force of a coil spring 126 connecting the shoe pieces 122*a* and 122*a*, and the linings 122*b* and 122*b* are separated from the lining contact part 121*b* of the drum 121.

The distal end of the pipe member 410 is connected to the pipe connection port 123*c* of the cover 123 of the internal expanding brake 120 constituted as describe above.

The operation of the automatic air-feeding mechanism for a bicycle according to the fourth embodiment will be described.

The wheel body is rotated about the axle 201 also in the fourth embodiment as in the case of the third embodiment by, for example, riding the bicycle. Then, the first and second compressed air producing sections 400*a* and 400*b* alternately compress air. The air compressed in the first compressed air producing section 400*a* is introduced into the air tube of the pneumatic tire through the pneumatic tire feeding supply passage 200*a* as needed.

The air compressed in the second compressed air producing section 400*b* is fed to the brake feeding supply passage 401 through the communication supply passage 13*b*, the connection passage 403 and the axial hole 43*a* in the axle 201. Then, the compressed air reaches the pipe connection port 123*c* of the brake device 120 through the brake feeding supply passage 401 and is blown from the pipe connection port 123*c* onto the drum 121. Air can be thereby constantly blown onto the drum 121 to reduce generation of heat caused by friction between the drum 121 and the linings 122*b* and 122*b* when the bicycle is ridden. Even if the brake device 120 is heated by direct sunlight in summer days, for example, the brake device 120 can be cooled when the bicycle is ridden. Thus, problems caused by overheating of the brake device 120 can be avoided.

The automatic air-feeding mechanisms constituted as described above according to the above embodiments of the present invention can be understood as follows.

An automatic air-feeding mechanism according to one embodiment has a plurality of compressed air producing sections which produce compressed air when the wheel body is rotated about the axle, each one of the compressed air producing sections having a compression chamber for compressing air therein, an air intake port for introducing outside air into the compression chamber, and a waterproof mechanism for preventing water from entering the compression chamber through the air intake port.

The automatic air-feeding mechanism of the embodiment also has a pneumatic tire compressed air supply passage for supplying the compressed air produced in a compressed air producing section to a pneumatic tire, and an another part compressed air supply passage for supplying the compressed air produced in a compressed air producing section to a part other than the pneumatic tire. The another part compressed air supply passage is used to supply the compressed air produced in the compressed air producing section to a brake device of the bicycle.

The brake device has a member to be braked rotatable together with a pneumatic tire and a braking member movable into contact with the member to be braked to stop the rotation of the member to be braked.

Alternatively, the another part compressed air supply passage is used to supply the compressed air produced in a compressed air producing section to the saddle of the bicycle.

The saddle has a seat for the rider to sit on, and an air holding part containing air for receiving a load on the seat to provide the seat with good cushion.

The saddle also has a seat supporting part for supporting the seat for vertical movement. The air holding part is formed in the seat supporting part, which has an air pressing part which can press the air in the air holding part. When a downward load is applied to the seat, the air pressing part presses the air in the air holding part. Then, the air in the air holding part is compressed and the seat is moved downward to provide the seat with good cushion.

The another part compressed air supply passage has a communication supply passage communicated with the compression chamber of the compressed air producing section and an another part feeding supply passage connected to the saddle or brake device of the bicycle as another part, and a connection supply passage connecting the communication supply passage and the another part feeding supply passage. The connection supply passage has an axial hole formed axially in the axle and connected to the another part feeding supply passage, and a connection passage connecting the axial hole and the communication supply passage. The connection passage and the axial hole are rotatably connected via a connection hole rotatably connected to the axial hole.

The compressed air produced in the compressed air producing section, which is rotated together with the wheel body when the bicycle is running, can be thereby fed from the connection passage to the connection supply passage via the axial hole and then from the connection supply passage to another part of the bicycle such as the saddle or brake device.

An automatic air-feeding mechanism according to one embodiment has n number of compressed air producing sections (n is an integer greater than 1), each of which has a compression chamber, and a compressing element for compressing the air in the compression chamber. Each of the compressing elements has a first end slidably received in the compression chamber and a second end retained by a cam mounted on the axle. When the wheel body is rotated about the axle, the compressing elements follow the cam and are slid in the compression chambers to compress the air in the compression chambers. The cam has a cam body having a cam face in contact with the compressing elements on its outer periphery, and an operation element retaining part located on one side of the cam face of the cam body for rotation with respect to the cam body, and the second ends of at least (n-1) number of the compressing elements are retained by the operation element retaining part for movement in the circumferential direction of the operation element retaining part.

The compressing elements can be thereby rotated about the axis of the axle with the second ends thereof retained by the operation element retaining part and kept in contact with the cam face of the cam. Thus, since the second ends of all the compressing elements can be retained by one operation element retaining part, the automatic air-feeding mechanism can be simple in construction and hence can be produced at low costs.

The operation element retaining part has a retention body, sliders attached to the retention body for sliding movement in the circumferential direction of the retention body, and slider inclination preventing means for preventing the sliders from being inclined with respect to the axial direction of the retention body when they are slid. The sliders retain the second ends of the compressing elements so that the compressing elements can be slid in the circumferential direction of the cam face $91a$ together with the sliders.

Retention pins, for example, attached to the compressing elements can be thereby moved together with the sliders in the circumferential direction of the retention body. If the retention pins are directly received in pin insertion holes without the sliders and if the piston members are rotatably received in the compression chambers, when a resistance is applied to the retention pins when they are being slid in the pin insertion holes, the retention pins cannot be slid further and the piston members may be rotated in the compression chambers to incline the axial direction of the retention pins with respect to the axial direction of the axle. When the axial directions of the retention pins are inclined with respect to the axial direction of the axle, the axis of rollers running on the cam face of the cam may be inclined to the extent that the rollers cannot run on the cam face smoothly or the retention pins may get out of the pin insertion holes. Then, the piston members cannot be slid in the compression chambers smoothly. However, when the retention pins are moved together with the sliders in the circumferential direction of the retention body as in this embodiment, the piston members are prevented from being inclined and can be always moved smoothly even if the piston members are rotatably received in the compression chambers.

Although an example having one compressed air producing section and an example having two compressed air producing sections are described in the above embodiments, modifications may be made as needed. For example, more than two compressed air producing sections may be provided.

In the second, third and fourth embodiments having two compressed air producing sections, the second pin insertion hole 95 has an arcuate slit-like sliding groove 95*a* so that the rollers 37 and 37 of the first and second compressed air producing sections 1*a* and 1*b* can constantly run on the cam face 91*a* of the cam 9 with the retention pins 36 and 36 of the first and second compressed air producing sections 1*a* and 1*b* retained by one piston retaining part 92. The present invention is, however, not limited thereto and may be modified as needed.

For example, when the retention pin 36 of the first compressed air producing section 1*a* is retained by a first piston retaining part and the retention pin 36 of the second compressed air producing section 1b is retained by a second piston retaining part, the first and second pin insertion holes 92b and 95 may be circular holes.

When the retention pins 36 and 36 of the first and second compressed air producing section 1a and 1b are retained by one piston retaining part 92, the shapes and so on of the first and second pin insertion holes 92b and 95 are not limited to those shown in FIG. 13B and may be different as long as the rollers 37 and 37 of the first and second compressed air producing sections 1a and 1b can constantly run on the cam face 91a of the cam 9 with the retention pins 36 and 36 of the first and second compressed air producing sections 1a and 1b retained by the piston retaining part 92. The detail will be described below.

The plurality of compressed air producing sections are attached to the hub such that the piston members thereof can be slid in directions toward and away from the axle when the wheel body is rotated about the axle. The cam has a cam body provided with a cam face having a circular cross-section and in contact with the piston members on its outer periphery, and a piston retaining part as an operation element retaining part located on one side of the cam face of the cam for rotation with respect to the cam body. The cam body is attached to the axle with the center of the cam face offset from the axis of the axle. The piston retaining part has a plurality of pin insertion holes for retaining the retention pins of the compressed air producing sections. Two of the pin insertion holes are formed such that the two retention pins retained in the two pin insertion holes can be relatively moved in the circumferential direction of the cam face through at least an angle of $4 \sin^{-1}\{e/r \cdot \sin(\theta/2)\}$ in total about the center of the cam face, wherein r represents the effective radius of the cam body, e represents the amount of offset from the axis of the axle to the center of the cam face of the cam body, and $\theta$ represents the angle formed by the sliding directions of the two piston members. The effective radius is the distance from the center of the cam face to the axes of the retention pins for retaining the rollers of the piston members.

Figure 27:
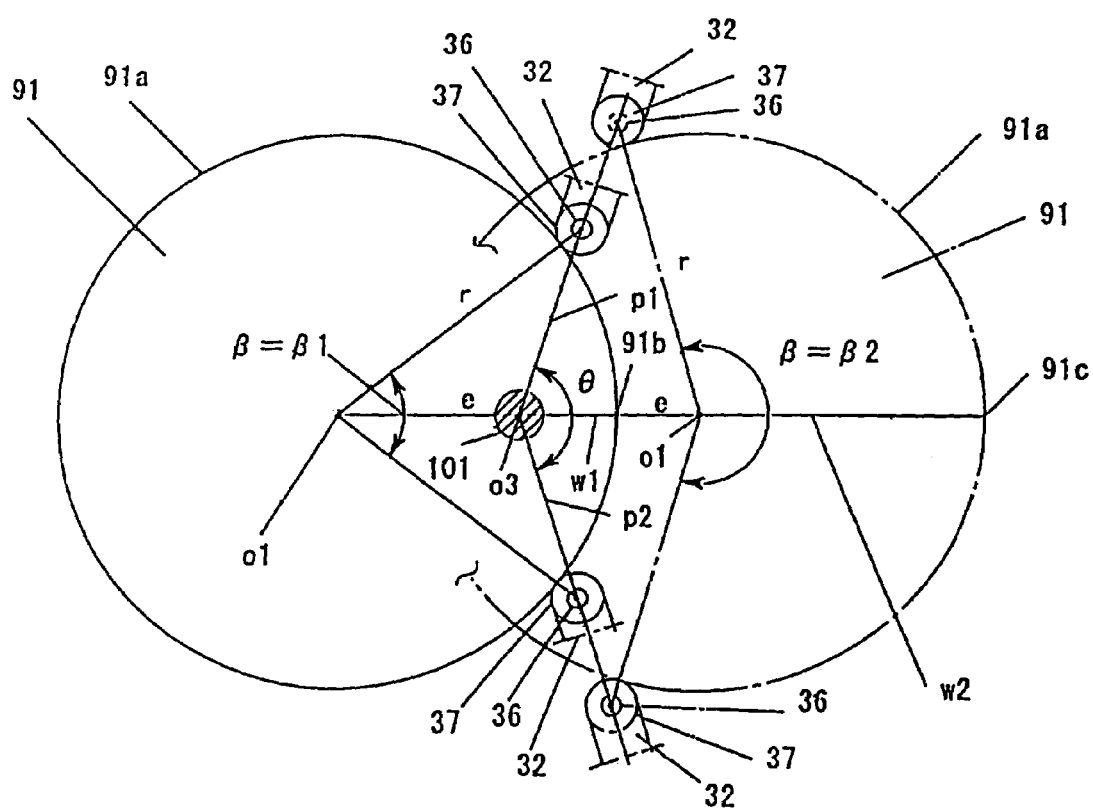
FIG. 27 is an explanatory view illustrating the calculation of the distance which a retention pin of a piston member has to be moved with respect to a piston retaining part when a hub is rotated.

For example, as shown in FIG. 27, two piston members 32 and 32 can be slid in directions toward and away from the axle 101, and the angle formed by the sliding directions p1 and p2 of the piston members 32 and 32 and the effective radius of the cam body 91 are defined as $\theta$ and e, respectively. The angle formed by the line connecting the center O1 of the cam face 91a and the axis of the retention pin 36 of one of the piston members 32 and the line connecting the center O1 of the cam face 91a and the axis of the retention pin 36 of the other piston member 32 is defined as $\beta$. In FIG. 27, the piston members 32 and 32 are not rotated and the cam body 91 is rotated about the axis O3 of the axle 101 as a center O3 of rotation for convenience of explanation.

Then, as shown in FIG. 27, when a shortest radius line w1 connecting the shortest point 91b where the distance from the center O3 of rotation to the cam face 91a is minimum and the rotation center O3 comes to a position where it divides the angle $\theta$ into two equal angles, the angle $\beta$ has a minimum value $\beta$1.

When the cam body 91 is rotated by 180° from the above state (to a position indicated by dot-dash lines in FIG. 27) and a longest radius line w2 connecting the longest point 91c where the distance from the center O3 of rotation to the cam face 91a is maximum and the rotation center O3 comes to a position where it divides the angle $\theta$ into two equal angles, the angle $\beta$ has a maximum value $\beta$2.

Thus, when the two piston members 32 and 32 are retained by one piston retaining part 92 via retention pins 36 and 36, it is necessary that the retention pins 36 and 36 can be moved with respect to the piston retaining part by the difference between the maximum angle $\beta$2 and the minimum angle $\beta$1 when the piston members 32 are rotated with respect to the cam body 91.

That is, the pin insertion hole 95 has to be formed such that the retention pins 36 and 36 can be relatively moved with respect to the piston retaining part 92 within an angle range of ($\beta$2−$\beta$1)=angle $\Psi$ (see FIG. 13).

As can be understood from FIG. 27, $(\beta1)/2 = \theta/2 - \sin^{-1}\{(e/r) \cdot \sin(\pi - \theta/2)\}$ and $(\beta2)/2 = \theta/2 + \sin^{-1}\{(e/r) \cdot \sin(\theta/2)\}$. Thus, $\beta2 - \beta1 = 4 \sin^{-1}\{(e/r) \cdot \sin(\theta/2)\}$.

As described above, when retention pins 36 and 36 of a plurality of compressed air producing sections 1a and 1b are retained by one piston retaining part 92, the first and second pin insertion holes 92b and 95 have to be formed such that the two retention pins 36 and 36 can be relatively moved through at least an angle of $4 \sin^{-1}\{(e/r) \cdot \sin(\theta/2)\}$ in total about the center O1 of the cam face 91a. When only the second pin insertion hole 95 has a sliding groove 95a in which the retention pin 36 can be slid, for example, as shown in FIG. 13B, the sliding groove 95a of the second pin insertion hole 95 has to extend through an angle $\Psi$ of $4 \sin^{-1}\{(e/r) \cdot \sin(\theta/2)\}$ or greater. In the embodiment shown in FIG. 13B, $\theta$ is approximately 180°, e is approximately 2.2 mm and r is approximately 14.2 mm. Thus, the angle $\Psi$ is approximately 72°.

Figure 26:
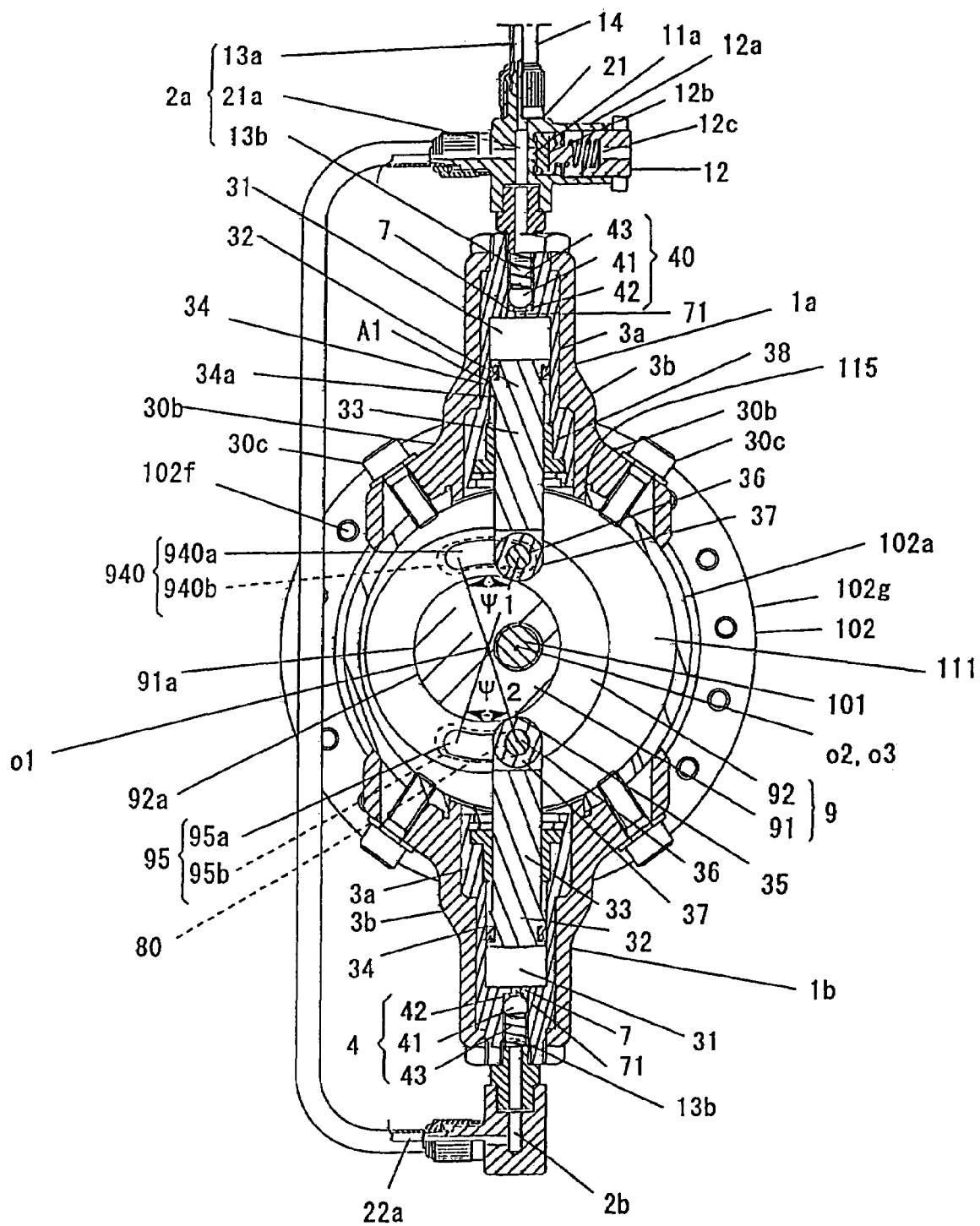
FIG. 26 is a cross-sectional explanatory view of an embodiment in which both first and second pin insertion holes have a sliding groove.

When a first pin insertion hole 940 and a second pin insertion hole 95 have sliding grooves 940a and 95a, respectively, as shown in FIG. 26, the total of the angle $\Psi$1 through the sliding groove 940a of the first pin insertion hole 940 extends and the angle $\Psi$2 through which the pin insertion hole of the second pin insertion hole 95 extends ($\Psi$1+$\Psi$2) has to be at least $4 \sin^{-1}\{e/r \cdot \sin(\theta/2)\}$.

In FIG. 26, an example is shown in which the angle $\Psi$1 through which the sliding groove 940a of the first pin insertion hole 940 extends and the angle $\Psi$2 through which the pin insertion hole 95a of the second pin insertion hole 95 extends are generally the same. In FIG. 26, designated as 940b is a seat part of the first pin insertion hole 940a formed around the sliding groove 940a. When more than two compressed air producing sections are provided, the pin insertion holes have to be formed such that the retention pins of two of the compressed air producing sections can be relatively moved through at least an angle of $4 \sin^{-1}\{(e/r) \cdot \sin(\theta/2)\}$ in total about the center O1 of the cam face 91a.

When two compressed air producing sections are provided, the compressed air producing sections does not necessarily positioned at generally equal intervals in the circumferential direction of the cam so that one of the sliding parts is slid in the compression chamber from the lowermost position to the uppermost position when the other sliding part is slid in the compression chamber from the uppermost position to the lowermost position and modifications may be made as needed. However, it is advantageous to position the compressed air producing sections such that one of the sliding parts is slid in the compression chamber from the lowermost position to the uppermost position when the other sliding parts is slid in the compression chamber from the uppermost position to the lowermost position since compressed air can be produced efficiently.

Although the retention pin 36 is moved in the second pin insertion hole 95 together with the slider 80 in the above embodiments, the retention pin 36 may be directly received in the second pin insertion hole 95 and moved therein without the slider 80 when the piston member 32 is received in the compression chamber 31 in a non-rotatable manner in the second compressed air producing section 1*b*.

When more than three compressed air producing sections are provided, the compressed air producing sections may or may not positioned at generally equal interval in the circumferential direction of the cam.

Although the compressed air produced in a compressed air producing section is supplied to the saddle or brake device of the bicycle as a part other than the pneumatic tire through the another part compressed air supply passage in the above embodiments, the part other than the pneumatic tire is not limited to the saddle or brake device of the bicycle.

Although a pneumatic tire compressed air supply passage is provided in the above embodiments, modifications may be made as needed. For example, the compressed air producing sections and the pneumatic tire may be connected without the pneumatic tire compressed air supply passage so that compressed air produced in the compressed air producing sections can be directly supplied to the pneumatic tire.

The automatic air-feeding mechanism of the present invention can be provided on any vehicle having a wheel body rotatable about an axle. For example, the automatic air-feeding mechanism of the present invention is applicable to one-wheeled vehicles, two-wheeled vehicles such as motorcycles and rear cars, three- or four-wheeled vehicles of various types and elevators having wheels.

Although the compressing element is the piston member 32 in the above embodiments, the present invention is not limited thereto and may be modified as needed. For example, each compression chamber 31 may be extended into the interior of the hub 102 and provided with an elastic part as a compressing element which forms the entire peripheral wall of the compression chamber 31 or a part of the peripheral wall of the compression chamber 31 in the axial direction thereof and which can be expanded and contracted, and a cam contact part formed at its proximal end and in contact with the cam face 91*a* of the cam 9. When the hub 102 is rotated, the cam contact part is slid on the cam face 91*a* and pressed by the cam face 91*a*, whereby the capacity of the compression chamber 31 is brought into compressed state from an expanded state to compress the air therein.

An automatic air-feeding mechanism for a pneumatic tire according to the present invention comprises a compressed air producing section which produces compressed air when a wheel body is rotated about an axle, and the compressed air produced in the compressed air producing section is supplied to a pneumatic tire.

When the wheel body is rotated about the axle, compressed air is produced in the compressed air producing section and the produced compressed air is supplied to the pneumatic tire. Thus, when the wheel body is rotated about the axle by, for example, riding the bicycle, the compressing section automatically compresses air to a specific pressure and the compressed air is supplied to the pneumatic tire to keep the air pressure in the pneumatic tire constant.

The automatic air-feeding mechanism for a pneumatic tire according to the present invention has a plurality of compressed air producing sections, each one of which has a compression chamber, a compressing element for compressing the air in the compression chamber. The compressing elements are pressed by a cam mounted on the axle to compress the air in the compression chamber when the wheel body is rotated about the axle. The compressed air producing sections are arranged such that the compressing elements of the compressed air producing sections are pressed in sequence by the cam to perform the compression of air when the wheel body is rotated about the axle.

When the wheel body is rotated about the axle, the plurality of compressed air producing sections can produce compressed air in an amount a plurality of times greater than the amount of compressed air that can be produced by one compressed air producing section. For example, when a wheelchair is normally used, its travel distance is not large and the wheel is not rotated many times. Thus, when a wheelchair is driven for a short period of time, a sufficient amount of compressed air may not be supplied to the pneumatic tire. According to the present invention, however, a sufficient amount of compressed air can be produced and supplied to the pneumatic tire until the air pressure in the pneumatic tire reaches a specific level by the plurality of compressed air producing sections within a short period of time after the start of running even if the number of rotations of the wheel is still low.

Also, since the compressing elements of the compressed air producing sections are pressed in sequence by the cam to perform the compression of air when the wheel body is rotated about the axis, the force required to produce compressed air and the resistance applied to the rotation of the wheel body about the axle are smaller than those required and applied when the air in the compression chambers are compressed simultaneously.

For example, when a plurality of compressed air producing sections are arranged in different positions along the circumference of a cam, the compressing elements of the compressed air producing sections are pressed in sequence by the cam when the wheel body is rotated about the axle. That is, such a mechanism can be produced easily. Also, when the plurality of compressed air producing sections are arranged in the circumferential direction of the cam, the axial length of the mechanism can be short as a whole. Thus, since the automatic air-feeding mechanism can be easily attached to the hub of a wheel body of a bicycle or wheelchair, it is suitable for a bicycle or wheelchair.

The automatic air-feeding mechanism for a pneumatic tire according to the present invention further comprises an another part compressed air supply passage for introducing compressed air produced in a compression air producing section to a part of the vehicle other than the pneumatic tire.

For example, compressed air produced in one of the compressed air producing sections can be supplied to the pneumatic tire through a pneumatic tire compressed air supply passage and compressed air produced in another compressed air producing section can be supplied to the air holding part of the saddle of the bicycle as the another part through the another part compressed air supply passage to provide the seat of the saddle with good cushion. Alternatively, compressed air can be supplied to a brake device of the bicycle through the another part compressed air supply passage to prevent overheating of the brake device.

In the automatic air-feeding mechanism for a pneumatic tire according to the present invention, the compressed air producing sections have first and second compressed air producing sections, each one of which has the compressing element provided with a sliding part slidable in the compression chamber and a cam contact part in contact with the cam. Each sliding part is slidable in a range between a lowermost position to make the capacity of the compression chamber maximum and an uppermost position to make the capacity of the compression chamber minimum. When the wheel body is rotated about the axle, each cam contact part is pressed by the cam, whereby each sliding part is slid in the compression chamber from the lowermost position to the uppermost position to compress the air in the compression chamber. The first and second compressed air producing sections are arranged such that when the sliding part is slid in the compression chamber from the lowermost position to the uppermost position in one of the first and second compressed air producing sections, the sliding part is slid in the compression chamber from the uppermost position to the lowermost position in the other compressed air producing section.

Then, the first and second compressed air producing sections alternately compress the air in their compression chambers, and when one of them compresses air in its compression chamber, the other is not compresses the air in its compression chamber. Thus, compressed air can be produced in an amount twice as much as the amount of compressed air that can be produced in one compressed air producing section with generally the same force as the force necessary to produce compressed air in one compressed air producing section.

In an automatic air-feeding mechanism for a pneumatic tire according to the present invention, the compressed air producing section has a compression chamber, a compressing element for compressing the air in the compression chamber, and an air intake port for introducing outside air into the compression chamber. The compressing element has a sliding part slidable in the compression chamber in a range between a lowermost position to make the capacity of the compression chamber maximum and an uppermost position to make the capacity of the compression chamber minimum. While the wheel body is being rotated about the axle, the air in the compression chamber is compressed when the sliding part is slid in the compression chamber from the lowermost position to the uppermost position. The air intake port is provided in the vicinity of the lowermost position in the movable range of the sliding part slidable in the compression chamber between the lowermost position and the uppermost position.

Then, when the sliding part is slid in the compression chamber from the lowermost position to the uppermost position to compress the air in the compression chamber, the air in the compression chamber can be compressed without being allowed to escape through the air intake port while the sliding part is slid from a position just beyond the air intake port to the uppermost position. Thus, since there is no need for a check valve for preventing air from escaping from the compression chamber through the air intake port when the sliding part is slid in the compression chamber to compress the air in the compression chamber, the automatic air-feeding mechanism is simple in construction and hence can be produced at low costs.

In the automatic air-feeding mechanism for a pneumatic tire according to the present invention, the compressed air producing section is attached to a hub of the wheel body, and can take in air into the compression chamber from the interior of the hub and compress the air.

Since air can be introduced into the compression chamber from the interior of the hub, where rainwater or the like can hardly enter, there is little possibility of water entering the compression chamber together with air.

In an automatic air feeding mechanism for a pneumatic tire according to the present invention, the compressed air producing section has a compression chamber for compressing the air therein, an air intake port for introducing outside air into the compression chamber, and a waterproof mechanism for preventing water from entering the compression chamber through the air intake port.

Since the waterproof mechanism prevents rainwater or the like from entering the compression chamber through the air intake-port together with air even if the vehicle is used in rainy days, rainwater or the like can be prevented from being fed from the compression chamber into the pneumatic tire together with air.

In the automatic air-feeding mechanism for a pneumatic tire according to the present invention, the wheel body has a hub rotatably supported by the axle, and the compressed air producing section is attached to the hub of the wheel body. The waterproof mechanism has a first air passage connecting the air intake port in air flow communication with the interior of the hub so that air can be taken in from the interior of the hub into the compression chamber through the first air passage in order to prevent water from entering the compressed air producing section. Since air can be introduced into the compression chamber from the interior of the hub, where rainwater or the like can hardly enter, there is little possibility of water entering the compression chamber together with air. Thus, the waterproof mechanism can be easily constructed at low costs.

In the automatic air-feeding mechanism for a pneumatic tire according to the present invention, the hub has a cylindrical hub drum, and supporting parts for supporting the hub drum from both sides. The supporting parts are rotatably supported on the axle, whereby the hub is rotatable about the axle and a partitioned space is defined in the hub by the hub drum and the supporting parts. The waterproof mechanism has a second air passage formed through the supporting parts and communicating the partitioned space in the hub with the outside.

Then, rainwater or the like can hardly enter the partitioned space through the second air passage. Thus, when air is fed from the partitioned space toward the air intake port, water can be reliably prevented from being fed together with the air.

In the automatic air-feeding mechanism for a pneumatic tire according to the present invention, each one of the supporting parts of the hub has a steel ball receiving part for rotatably receiving a plurality of steel balls, and an axle hole formed radially inside the steel ball receiving part for rotatably receiving the axle. The steel ball receiving parts are rotatably supported by the axle extending through the axle hole via a plurality of steel balls, whereby the hub is rotatable about the axle and an axle-gap air passage extending from the partitioned space through an axle gap formed between the inner surface of the axle hole and the axle and steel ball gaps formed between the steel balls and in air flow communication with the partitioned space is formed through each of the supporting parts of the hub. The second air passage includes at least one of the axle-gap air passages as a constituent element.

The steel balls are usually provided in the steel ball receiving parts together with grease for smooth rotation of the steel balls. Thus, water can hardly pass through the gaps between the steel balls, which means water can hardly pass through the axle-gap air passages. An ordinary hub has such axle-gap air passages. Thus, since the axle-gap air passages formed in the hub can be used and there is no need to form a second air passage separately, the waterproof mechanism can be constructed at low costs.

In the automatic air-feeding mechanism for a pneumatic tire according to the present invention, one of the axle-gap air passages is generally sealed from the outside of the hub by a seal member and the other axle-gap air passage forms a part or the whole of the second air passage. The waterproof mechanism has a third air passage communicating the other axle-gap air passage forming the second air passage with the outside so that the air outside the hub can be introduced into the hub through the third air passage and the other axle-gap air passage.

Then, even if it costs much to form such a third air passage, a large increase in cost can be avoided since only one third air passage has to be formed.

In the automatic air-feeding mechanism for a pneumatic tire according to the present invention, the third air passage is defined between an inner surface of a cylindrical member which is attached to the hub and through which the axle extends and an outer periphery of the axle, and the inner surface of the cylindrical member having a taper part which is tapered such that the inside diameter gradually increases toward the outside.

Then, even if water enters the third air passage, the water can be moved to the large-diameter side of the taper part and discharged out of the third air passage by a centrifugal force created by the rotation of the hub. Also, the water can be moved outward on the taper part discharged out of the third air passage by its own weight. Thus, water can hardly pass through the third air passage.

In an automatic air-feeding mechanism for a pneumatic tire according to the present invention, the compressed air producing section has a compression chamber, and a compressing element for compressing the air in the compression chamber. The compressing element has a first end slidably received in the compression chamber and a second end retained by a cam mounted on the axle, whereby, while the wheel body is being rotated about the axle, the compressing element follows the cam and is slid in the compression chamber to compress the air in the compression chamber.

When the compressing element is urged by a compressing element urging coil spring so that the second end of the compressing element can be kept in contact with the cam, for example, the compressing element has to be slid against the urging force of the coil spring, causing a resistance to the rotation of the wheel body about the axle. In this embodiment, however, the compressing element is retained by the cam and an urging coil spring is not provided, the compressing element can be smoothly slid with a small force. Thus, the resistance to the rotation of the wheel body about the axle is small.

In the automatic air-feeding mechanism for a pneumatic tire according to the present invention, the compressing element is removably retained by the cam.

Then, the compressed air producing section can be easily removed from the cam, and the compressed air producing section having removed from the cam can be easily assembled to the cam. Thus, since the parts can be easily disassembled and replaced, maintenance can be made easily.

In the automatic air-feeding mechanism for a pneumatic tire according to the present invention, the cam has a cam body having a cam face in contact with the compressing element on its outer periphery, and an operation element retaining part located on one side of the cam face of the cam. The compressing element has a rod-like operation element, a cam contact part in contact with the cam face of the cam, and a cam retention part retained by the operation element retaining part of the cam. The operation element is radially movably disposed radially outside the cam face of the cam body, the cam contact part is disposed between the cam face of the cam body and the operation element, and the cam retention part is removably retained by the operation element retaining part.

Then, when the compressing element is pressed by the cam to perform compression of air, the operation element of the compressing element can be pressed in a direction from inside to outside in a radial direction of the cam by the cam via the cam contact part. Thus, the operation element can be moved in a radial direction of the cam smoothly and efficiently.

Also, the compressing element can be assembled to the cam by placing the cam retention part in the operation element retaining part located on one side of the cam face of the cam body and removed from the cam by removing the cam retention part from the operation element retaining part. Thus, the compressing element can be easily removed from the cam. When the cam retention part is retained by the operation element retaining part located on one side of the cam face of the cam body, the compressing element is pulled at one side when it is pulled by the cam. However, when the compressing element is pulled by the cam, a large force is not applied to the operation element since compression of air is not performed. Thus, the operation element can be smoothly pulled without difficulty.

In the automatic air-feeding mechanism for a pneumatic tire according to the present invention, the cam contact part is constituted of a part of the outer periphery of a roller rotatably attached to the operation element, and the cam retention part is constituted of a retention pin rotatably supporting the roller on the operation element and retained by the operation element retaining part of the cam.

Then, the force in a tangential direction of the cam face which is applied to the cam contact part when the compressing element is pressed can be small, and the operation element of the compressing element can be moved in a radial direction of the cam more efficiently and more smoothly.

Also, since the retention pin for rotatably supporting the roller on the operation element is used as a cam retention part retained by the operation element retaining part of the cam, there is no need to form a cam retention part separately. Thus, the automatic air-feeding mechanism can be easily produced at low costs.

Description has been made of the preferred embodiments of the present invention. The terminology employed herein is for the purpose of illustration but not of limitation. It should be understood that many changes and modifications can be made within the scope of the appended claims without departing from the scope and spirit of the present invention.

The invention claimed is:

1. An automatic air-feeding mechanism for a pneumatic tire for automatically supplying air to a pneumatic tire mounted on a wheel body rotatable about an axle of a vehicle, comprising:

a compressed air producing section for producing compressed air when the wheel body is rotated about the axle, wherein the compressed air produced in the compressed air producing section is supplied to the pneumatic tire, wherein the compressed air producing section has a compression chamber for compressing the air therein, an air intake port for introducing outside air into the compression chamber, and a waterproof mechanism for preventing water from entering the compression chamber through the air intake port, wherein the wheel body has a hub rotatably supported by the axle and the compressed air producing section is attached to the hub of the wheel body, wherein the waterproof mechanism has a first air passage connecting the air intake port in air flow communication with the interior of the hub so that air can be taken in from the interior of the hub into the compression chamber through the first air passage in order to prevent water from entering the compressed air producing section, wherein the hub has a cylindrical hub drum, and supporting parts for supporting the hub drum from both sides, the supporting parts being rotatably supported on the axle, whereby the hub is rotatable about the axle and a partitioned space is defined in the hub by the hub drum and the supporting parts; and the waterproof mechanism has a second air passage formed through the supporting parts and communicating the partitioned space in the hub with the outside, wherein each one of the supporting parts of the hub has a steel ball receiving part for rotatably receiving a plurality of steel balls, and an axle hole formed radially inside the steel ball receiving part for rotatably receiving the axle, and the steel ball receiving parts are rotatably supported by the axle extending through the axle hole via a plurality of steel balls, whereby the hub is rotatable about the axle and an axle-gap air passage extending from the partitioned space through an axle gap formed between the inner surface of the axle hole and the axle and steel ball gaps formed between the steel balls and in air flow communication with the partitioned space is formed through each of the supporting parts of the hub; and the second air passage includes at least one of the axle-gap air passages as a constituent element.

2. The automatic air-feeding mechanism for a pneumatic tire as set forth in claim 1, wherein one of the axle-gap air passages is generally sealed from the outside of the hub by a seal member and the other axle-gap air passage forms a part or the whole of the second air passage; and the waterproof mechanism has a third air passage communicating the other axle-gap air passage forming the second air passage with the outside so that the air outside the hub can be introduced into the hub through the third air passage and the other axle-gap air passage.

3. The automatic air-feeding mechanism for a pneumatic tire as set forth in claim 2, wherein the third air passage is defined between an inner surface of a cylindrical member which is attached to the hub and through which the axle extends and an outer periphery of the axle;

the inner surface of the cylindrical member has a taper part which is tapered such that the inside diameter gradually increases toward the outside.

4. The automatic air-feeding mechanism for a pneumatic tire as set forth in claim 1, wherein a plurality of the compressed air producing sections are provided;

each one of the compressed air producing sections has a compression chamber, and a compressing element for compressing the air in the compression chamber;

wherein the compressing elements are pressed by a cam mounted on the axle to compress the air in the compression chamber when the wheel body is rotated about the axle; and the compressed air producing sections are arranged such that the compressing elements of the compressed air producing sections are pressed in sequence by the cam to perform the compression of air when the wheel body is rotated about the axle.

5. The automatic air-feeding mechanism for a pneumatic tire as set forth in claim 1, further comprising a compressed air supply passage for introducing compressed air produced in the compression air producing section to a part of the vehicle other than the pneumatic tire.

6. The automatic air-feeding mechanism for a pneumatic tire as set forth in claim 4, wherein the compressed air producing sections have first and second compressed air producing sections;

each one of the first and second compressed air producing sections has the compressing element provided with a sliding part slidable in the compression chamber and a cam contact part in contact with the cam;

each sliding part is slidable in a range between a lowermost position to make the capacity of the compression chamber maximum and an uppermost position to make the capacity of the compression chamber minimum;

when the wheel body is rotated about the axle, each cam contact part is pressed by the cam, whereby each sliding part is slid in the compression chamber from the lowermost position to the uppermost position to compress the air in the compression chamber; and the first and second compressed air producing sections are arranged such that when the sliding part is slid in the compression chamber from the lowermost position to the uppermost position in one of the first and second compressed air producing sections, the sliding part is slid in the compression chamber from the uppermost position to the lowermost position in the other compressed air producing section.

7. The automatic air-feeding mechanism for a pneumatic tire as set forth in claim 1, wherein the compressed air producing section has a compression chamber, a compressing element for compressing the air in the compression chamber, and an air intake port for introducing outside air into the compression chamber, the compressing element has a sliding part slidable in the compression chamber in a range between a lowermost position to make the capacity of the compression chamber maximum and an uppermost position to make the capacity of the compression chamber minimum, and while the wheel body is being rotated about the axle, the air in the compression chamber is compressed when the sliding part is slid in the compression chamber from the lowermost position to the uppermost position; and the air intake port is provided in the vicinity of the lowermost position in the movable range of the sliding part slidable in the compression chamber between the lowermost position and the uppermost position.

8. The automatic air-feeding mechanism for a pneumatic tire as set forth in claim 1, wherein the compressed air producing section is attached to a hub of the wheel body, and capable of taking air into the compression chamber from the interior of the hub and compressing the air.

9. The automatic air-feeding mechanism for a pneumatic tire as set forth in claim 1, wherein the compressed air producing section has a compression chamber, and a compressing element for compressing the air in the compression chamber; and the compressing element has a first end slidably received in the compression chamber and a second end retained by a cam mounted on the axle, whereby, while the wheel body is being rotated about the axle, the compressing element follows the cam and is slid in the compression chamber to compress the air in the compression chamber.

10. The automatic air-feeding mechanism for a pneumatic tire as set forth in claim 9, wherein the compressing element is removably retained by the cam.

11. The automatic air-feeding mechanism for a pneumatic tire as set forth in claim 9, wherein the cam has a cam body having a cam face in contact with the compressing element on its outer periphery, and an operation element retaining part located on one side of the cam face of the cam body; and the compressing element has a rod-like operation element, a cam contact part in contact with the cam face of the cam, and a cam retention part retained by the operation element retaining part of the cam, the operation element being radially movably disposed radially outside the cam face of the cam body, the cam contact part being disposed between the cam face of the cam body and the operation element, the cam retention part being removably retained by the operation element retaining part.

12. The automatic air-feeding mechanism for a pneumatic tire as set forth in claim 11, wherein the cam contact part is constituted of a part of the outer periphery of a roller rotatably attached to the operation element; and the cam retention part is constituted of a retention pin rotatably supporting the roller on the operation element and retained by the operation element retaining part of the cam.

* * * * *